US006872243B2

(12) United States Patent
Breton et al.

(10) Patent No.: US 6,872,243 B2
(45) Date of Patent: Mar. 29, 2005

(54) PHASE CHANGE INKS CONTAINING GELATOR ADDITIVES

(75) Inventors: Marcel P. Breton, Mississauga (CA); Danielle C. Boils-Boissier, Mississauga (CA); Donald R. Titterington, Newberg, OR (US); Jule W. Thomas, Jr., West Linn, OR (US); Jeffrey H. Banning, Hillsboro, OR (US); Christine E. Bedford, Toronto (CA); James D. Wuest, Montreal (CA)

(73) Assignee: Xerox Corporation, Stamford, CT (US)

( * ) Notice: Subject to any disclaimer, the term of this patent is extended or adjusted under 35 U.S.C. 154(b) by 228 days.

(21) Appl. No.: 10/235,125

(22) Filed: Sep. 4, 2002

(65) Prior Publication Data

US 2004/0065227 A1 Apr. 8, 2004

(51) Int. Cl.[7] ............................................. C09D 11/00

(52) U.S. Cl. ............................... 106/31.29; 106/31.61; 106/31.47; 106/31.77; 106/31.58; 106/31.86; 106/31.43; 106/31.75; 106/31.51; 106/31.8; 106/31.46; 106/31.76; 106/31.57; 106/31.87

(58) Field of Search .......................... 106/31.29, 31.61, 106/31.47, 31.77, 31.58, 31.86, 31.43, 31.75, 31.51, 31.8, 31.46, 31.76, 31.57, 31.87; 347/100

(56) References Cited

U.S. PATENT DOCUMENTS

| | | | |
|---|---|---|---|
| 2,703,808 A | 3/1955 | Buchman | 260/456 |
| 3,653,932 A | 4/1972 | Berry et al. | 106/22 |
| 4,390,369 A | 6/1983 | Merritt et al. | 106/31 |
| 4,484,948 A | 11/1984 | Merritt et al. | 106/31 |
| 4,538,156 A | 8/1985 | Durkee et al. | 346/21 |
| 4,684,956 A | 8/1987 | Ball | 346/1.1 |
| 4,745,420 A | 5/1988 | Gerstenmaier | 346/1.1 |
| 4,790,961 A | 12/1988 | Weiss et al. | 260/376 |
| 4,889,560 A | 12/1989 | Jaeger et al. | 106/27 |
| 4,889,761 A | 12/1989 | Titterington et al. | 428/195 |
| 5,006,170 A | 4/1991 | Schwarz et al. | 106/20 |
| 5,021,802 A | 6/1991 | Allred | 346/1.1 |
| 5,099,256 A | 3/1992 | Anderson | 346/1.1 |
| 5,122,187 A | 6/1992 | Schwarz et al. | 106/25 |
| 5,151,120 A | 9/1992 | You et al. | 106/27 |
| 5,180,425 A | 1/1993 | Matrick et al. | 106/22 |
| 5,195,430 A | 3/1993 | Rise | 100/168 |
| 5,221,335 A | 6/1993 | Williams et al. | 106/23 A |
| 5,298,618 A | 3/1994 | Speranza et al. | 540/454 |
| 5,372,852 A | 12/1994 | Titterington et al. | 427/288 |
| 5,389,958 A | 2/1995 | Bui et al. | 347/103 |
| 5,462,591 A | 10/1995 | Karandikar et al. | 106/20 |
| 5,476,540 A | 12/1995 | Shields et al. | 106/20 |
| 5,496,879 A | 3/1996 | Griebel et al. | 524/320 |
| 5,531,817 A | 7/1996 | Shields et al. | 106/22 |
| 5,554,212 A | 9/1996 | Bui et al. | 106/20 |
| 5,621,022 A | 4/1997 | Jaeger et al. | 523/161 |
| 5,761,597 A | 6/1998 | Smith et al. | 399/339 |
| 5,892,116 A | 4/1999 | Weiss et al. | 564/281 |
| 6,320,018 B1 | 11/2001 | Sijbesma et al. | 528/310 |
| 6,461,417 B1 * | 10/2002 | Malhotra et al. | 106/31.58 |

FOREIGN PATENT DOCUMENTS

| | | |
|---|---|---|
| CA | 941377 | 2/1974 |
| EP | 0 187 352 | 7/1986 |
| EP | 0 206 286 | 12/1986 |
| WO | WO 90/11283 | 10/1990 |
| WO | WO 94/04619 | 3/1994 |
| WO | WO 97/24364 | 7/1997 |

OTHER PUBLICATIONS

Marion Lescanne et al., "Flow–Induced Alignment of Fiber-like Supramolecular Self–Assemblies During Organogel Formation with Various Low Molecular Mass Organogelator—Solvent Systems," *Am. Chem. Soc.*, vol. 18, (2002), pp. 7151–7153, no month available.

G.M. Clavier et al., "Organogelators for Making Porous Sol–Gel Derived Silica at Two Different Length Scales," *J. Mater Chem.*, (2000), 10, pp. 1725–1730, no month available.

Saleh, A. Ahmed et al., "Multiaddressable Self–Assembling Organogelators Based on 2H–Chromene and N–Acyl–1, ω–amino Acid Units," *Am. Chem. Soc.*, (2002), 18, pp. 7096–7101, no month available.

English abstract by SciFinder for Franz Alfred Neugebauer et al., "Tetrakis[4–(3–tert–butyl–5–phenylverdazyl–1–yl) phenyl]methan, in Tetraradikal," *Chem. Ber.*, (1976), 109 (7), pp. 2389–2394, no month available.

(Continued)

*Primary Examiner*—Mark L. Bell
*Assistant Examiner*—Veronica F. Faison
(74) *Attorney, Agent, or Firm*—Judith L. Byorick

(57) ABSTRACT

Disclosed is a phase change ink composition comprising an ink vehicle, a colorant, and a nonpolymeric organic gelator selected from the group consisting of anthracene-based compounds, steroid compounds, partially fluorinated high molecular weight alkanes, high molecular weight alkanes with exactly one hetero atom, chiral tartrate compounds, chiral butenolide-based compounds, bis-urea compounds, guanines, barbiturates, oxamide compounds, ureidopyrimidone compounds, and mixtures thereof, said organic gelator being present in the ink in an amount of no more than about 20 percent by weight of the ink, said ink having a melting point at or below which the ink is a solid, said ink having a gel point at or above which the ink is a liquid, and said ink exhibiting a gel state between the melting point and the gel point, said ink exhibiting reversible transitions between the solid state and the gel state upon heating and cooling, said ink exhibiting reversible transitions between the gel state and the liquid state upon heating and cooling, said melting point being greater than about 35° C., said gel point being greater than said melting point. Also disclosed are imaging processes employing phase change inks containing gelator additives.

109 Claims, No Drawings

OTHER PUBLICATIONS

Copending U.S. Appl. No. 09/949,315, filed Sep. 7, 2001, entitled "Aqueous Ink Compositions," by Thomas W. Smith et al.

Copending U.S. Appl. No. 09/948,958, filed Sep. 7, 2001, entitled "Phase Change Ink Compositions," by H. Bruce Goodbrand et al.

Copending U.S. Serial No. (not yet assigned;), filed concurrently herewith, entitled "Alkylated Tetrakis(triaminotriazine) Compounds and Phase Change Inks Containing Same," by Danielle C. Boils–Boissier et al.

Copending U.S. Serial No. (not yet assigned;), filed concurrently herewith, entitled "Alkylated Urea and Triaminotriazine Compounds and Phase Change Inks Containing Same," by Marcel P. Breton et al.

Copending U.S. Serial No. (not yet assigned;), filed concurrently herewith, entitled "Guanidinopyrimidinone Compounds and Phase Change Inks Containing Same," by Danielle C. Boils–Boissier et al.

English Abstract for German Patent Publication DE 4205713AL.

English Abstract for German Patent Publication DE 4205636.

R. P. Sijbesma et al., "Reversible Polymers Formed from Self–Complementary Monomers Using Quadruple Hydrogen Bonding," *Science*, vol. 278, p. 1601 (1997).

H. Dagani, "Supramolecular Polymers," *Chemical and Engineering News*, p. 4 (Dec. 1997).

J.H.K. Hirschberg et al., "Supramolecular Polymers from Linear Telechelic Siloxanes with Quadrupole–Hydrogen–Bonded Units," *Macromolecules*, vol. 32, p. 2696 (1999), no month available.

A.C. Griffin et al., "Design and Synthesis of 'Smart' Supramolecular Liquid Crystalline Polymers via Hydrogen–Bond Associations," *PMSE Proceedings*, vol. 72, p. 172 (1995), no month available.

Andrew J. Carr et al., "The Design of Organic Gelators: Solution and Solid State Properties of a Family of Bis–Ureas," *Tetrahedron Letters*, vol. 39, p. 7447 (1998), no month available.

Ronald F.M. Lange et al., "Hydrogen–Bonded Supramolecular Polymer Networks," *Journal of Polymer Science, Part A: Polymer Chemistry*, vol. 37, p. 3657 (1999), no month available.

Arno Kraft et al., "Combining Self–Assembly and Self–Association—Towards Columnar Supramolecular Structures in Solution and in Liquid–Crystalline Mesophase," *Polym. Mater. Sci. Eng.*, vol. 80, p. 18 (1999), no month available.

Y. Yuasa et al., "Facile Synthesis of β–Keto Esters from Methyl Acetoacetate and Acid Chloride: The Barium Oxide/Methanol System," *Organic Process Research and Development*, vol. 2, p. 412 (1998) no month available.

F. Hoogesteger et al., "Self–Complementary Hydrogen Bonding of 1,1'–Bicyclohexylidene–4,4'–dione Dioxime. Formation of a Non–Covalent Polymer," *Tetrahedron*, vol. 52, No. 5, p. 1773 (1996), no month available.

X. Wang et al., "Molecular Tectonics, Three–Dimensional Organic Networks with Zeolite Properties," *J. Am. Chem. Soc.*, vol. 116, p. 12119 (1994), no month available.

J. H. K. Ky Hirschberg et al., "Helical Self–Assembled Polymers from Cooperative Stacking of Hydrogen–Bonded Pairs," *Nature*, vol. 407, p. 167 (2000), no month available.

Abdullah Zafar et al., "New Supramolecular Arrays based on Interactions between Carboxylate and Urea Groups: Solid–State and Solution Behavior," *New J. Chem.*, 1998, 137–141, no month available.

J–L. Pozzo et al., "The Unusual Molecular Organization of 2,3–Bis(n–hexyloxy)–anthracene in the Crystal. A Hint to the Origin of the Gelifying Properties of 2,3–Bis(n–alkyloxy)anthracenes?", *J. Chem. Soc., Perkin Trans.*, 2, 824–826 (2001), no month available.

D. Abdallah et al., "The Quest for the Simplest Possible Organogelators and Some Properties of their Organogels," *J. Braz. Chem. Soc.*, vol. 11, No. 3, 209–218 (2000), no month available.

F. Placin et al., "Organogel Electrolytes Based on a Low Molecular Weight Gelator: 2,3–Bis(n–decyloxy)anthracene," *Chem. Mater.* 13, 117–121 (2001), no month available.

J. Jung et al., "Novel Vesicular Aggregates of Crown–Appended Cholesterol Derivatives Which Act as Gelators of Organic Solvents and as Templates for Silica Transcription," *J. Am. Chem. Soc.*, vol. 122, No. 36, 8648–8653 (2000), no month available.

D. Abdallah et al., "n–Alkanes Gel n–Alkanes (and Many Other Organic Liquids)," *Langmuir*, 16, 352–355 (2000), no month available.

P. Terech et al., "Low Molecular Mass Gelators of Organic Liquids and the Properties of their Gels," *Chem. Rev.*, 97, 3133–3159 (1997), no month available.

D. Abdallah et al., "Organogels and Low Molecular Mass Organic Gelators," *Adv. Mater.*, 12, No. 17, 1237 (2000), no month available.

F. Schoonbeek, "Making it All Stick Together: the Gelation of Organic Liquids by Small Organic Molecules," Doctoral Thesis, U. of Groningen, Netherlands, Apr. 2001.

Twieg et al., "Observations of a "Gel" Phase in Binary Mixtures of Semifluorinated n–Alkanes with Hydrocarbon Liquids," *Macromolecules*, vol. 18, p. 1361 (1985), no month available.

M.F. Shostakovskii et al., "Synthesis and Reactions of Polyhydric Alcohols I. Synthesis and Reactions of p–Toluenesulfonates of Polyhydric Alcohols," *Zhurnal Obshchei Khimii*, vol. 35, No. 5, p. 804–807 (1965), no month available.

J. Ashley et al., "The Chemotherapy of Schistosomiasis. Part I. Derivatives and Analogs of αω–Di–(p–aminophenoxy)alkanes," *J. Chem. Soc.* 1958, 3293, no month available.

G. Clavier et al., "Remarkably Simple Small Organogelators: Di–n–alkoxy–benzene Derivatives," *Tetrahedron Letters*, 40, 9021–9024 (1999), no month available.

G. Mieden–Gundert et al., "Rational Design of Low Molecular Mass Organogelators: Toward A Library of Functional N–Acyl–1–ω–Amino Acid Derivatives," *Angew. Chem. Int. Ed.*, 40, No. 17, 3164–3166 (2001), no month available.

J.–L. Pozzo et al., "Rational Design of New Acid–Sensitive Organogelators," *J. Mater. Chem.*, vol. 8, pp. 2575–2577 (1998), no month available.

J. T. Thurston et al., "Cyanuric Chloride Derivatives. I. Aminochloro–s–triazines," *J. Am. Chem. Soc.*, vol. 73, pp. 2981–3008 (1951), Jul.

Huckin et al., "Alkylation of Dianions of β–Keto Esters," *J. Am. Chem. Soc.*, vol. 96, pp. 1082–1087 (1974), no month available.

J-L. Pozzo et al., "Photochromic Guests in Organogels," *Mol. Cryst. Liq. Cryst.*, vol. 344, pp. 101–106 (2000), no month available.

Murata et al, "Thermal and Light Control of the Sol–Gel Phase Transition in Cholesterol–Based Organic Gels. Novel Helical Aggregation Modes as Detected by Circular Dichroism and Electron Microscopic Observation," *J. Am. Chem. Soc.*, vol. 116, No. 15, pp. 6664–6676 (1994), no month available.

Rabolt et al., *Macromolecules*, vol. 17, p. 2786 (1984), no month available.

L. Lu et al., "New lyotrophic Phases (thermally–reversible organogels) of simple tertiary amines and related tertiary and quaternary ammonium halide salts," *Chem. Commun.*, 1996, p. 2029, no month available.

B.L. Feringa et al., *J. Org. Chem.*, vol. 53, p. 1125 (1988), no month available.

U. Zehavi et al., :The Reactions of Carbobenzoxyamino Acid Amides with Carbonyl Compounds, *J. Org. Chem.*, vol. 26, pp. 1097–1101 (1961), no month available.

Tabushi et al., Lipophilic Diammonium Cation Having a Rigid Structure Complementary to Pyrophosphate Dianions of Nucleotides. Selective Extraction and Transport of Nucleotides, *J. Am. Chem. Soc.*, vol. 103, pp. 6152–6157 (1981), no month available.

English Abstract of Japanese Patent Publication JP 62181279, Oct. 1987.

English abstract for Japanese Patent Publication JP 06157529, Jun. 1994.

English abstract for Japanese Patent Publication JP 3217541, Sep. 1991.

J-L. Pozzo et al., *Tetrahedron*, vol. 53, No. 18, pp. 6377–6390 (1997), no month available.

Y.C. Lin et al., *Macromolecules*, vol. 20, p. 414 (1987), no month available.

D.J. Abdallah et al., *Chem. Mater.*, vol. 11, p. 2907 (1999), no month available.

Ralston et al., *J. Org. Chem.*, vol. 9, p. 259 (1944), no month available.

J.C. Dejong et al., *Tetrahedron Lett.*, vol. 30, p. 7239 (1989), no month available.

J.C. Dejong, Ph.D. thesis, University of Groningen, The Netherlands, 1991, no month available.

J. March, *Advanced Organic Chemistry*, 4th Edition, pp. 903 and 1091–1092, Wiley Interscience (New York 1992), no month available.

J. Crossley Maxwell, *Aust. J. Chem.*, vol. 47, pp. 723–738 (1994), no month available.

V.J. Wotring et al., *Analytical Chemistry*, vol. 62, No. 14, pp. 1506–1510 (1990), no month available.

T. Giorgi et al., "Gel–like lyomesophases formed in organic solvents by self–assembled guanine ribbons." *Chemistry—A European Journal*(2002), 8(9), 2143–2152, no month available.

C.S. Snijder et al., *Chem. Eur. J.*, vol. 1, No. 9, pp. 594–597 (1995), no month available.

S. Senda et al., Gifu Coll. Pharm., Gifu, Japan. *Yakugaku Zasshi* (1969), 89 (2), 254–259, no month available.

B. Gluncic et al., *Acta Pharm. Jugosl.* (1986), 36(4), 393–404, no month available.

M. Klein, Recent Dev. Mass Spectrom. Biochem. Med., [Proc. Int. Symp.], 4th (1978), Meeting Date 1977, 1, 471–82, no month available.

T. Wada et al., "A New Boranophosphorylation Reaction for the Synthesis of Deoxyribonucleoside Boranophosphates," *Tetrahedron Letters*, vol. 43, No. 23, pp. 4137–4140 (2002), no month available.

R. Schirrmacher et al., "Dimethylpyridin– 4–ylamine–catalysed alcoholysis of 2–amino–N,N,N–trimethyl–9H–purine–6–ylammonium chloride: An effective route to O6–substituted guanine derivatives from alcohols with poor nucleophilicity," *Synthesis*, vol. 4, pp. 538–542 (2002), no month available.

S. Bailey et al., "Synthesis and Antiviral Activity of 9–Alkoxypurines: New 9–(Hydroxyalkoxy) Derivatives of Guanine and 8–Methylguanine," *Antiviral Chem. Chemother.*, vol. 5, No. 1, pp. 21–33, (1994), no month available.

M. R. Harnden et al., "Synthesis, Oral Bioavailability and In Vivo Activity of Acetal Derivatives of the Selective Antiherpesvirus Agent 9–(3–Hydroxypropoxy)Guanine (BRL44385)," *Antiviral Chem. Chemother.*, vol. 5, No. 3, pp. 147–154 (1994), no month available.

B. K. Bhattacharya et al., "Synthesis of Certain N– and C–alkyl Purine Analogs," *J. Heterocycl. Chem.*, vol. 30, No. 5, pp. 1341–1349 (1993), no month available.

* cited by examiner

PHASE CHANGE INKS CONTAINING GELATOR ADDITIVES

Cross-reference is made to the following applications:

Copending application U.S. Ser. No. 09/949,315, filed Sep. 7, 2001, entitled "Aqueous Ink Compositions," with the named inventors Thomas W. Smith, David J. Luca, and Kathleen M. McGrane, the disclosure of which is totally incorporated herein by reference, discloses an aqueous ink composition comprising an aqueous liquid vehicle, a colorant, and an additive wherein, when the ink has been applied to a recording substrate in an image pattern and a substantial amount of the aqueous liquid vehicle has either evaporated from the ink image, hydrogen bonds of sufficient strength exist between the additive molecules so that the additive forms hydrogen-bonded oligomers or polymers.

Copending application U.S. Ser. No. 09/948,958, filed Sep. 7, 2001, entitled "Phase Change Ink Compositions," with the named inventors H. Bruce Goodbrand, Thomas W. Smith, Dina Popovic, Daniel A. Foucher, and Kathleen M. McGrane, the disclosure of which is totally incorporated herein by reference, discloses a phase change ink composition comprising a colorant and an ink vehicle, the ink being a solid at temperatures less than about 50° C. and exhibiting a viscosity of no more than about 20 centipoise at a jetting temperature of no more than about 160° C., wherein at a first temperature hydrogen bonds of sufficient strength exist between the ink vehicle molecules so that the ink vehicle forms hydrogen-bonded dimers, oligomers, or polymers, and wherein at a second temperature which is higher than the first temperature the hydrogen bonds between the ink vehicle molecules are sufficiently broken that fewer hydrogen-bonded dimers, oligomers, or polymers are present in the ink at the second temperature than are present in the ink at the first temperature, so that the viscosity of the ink at the second temperature is lower than the viscosity of the ink at the first temperature.

Copending Application U.S. Ser. No. 10/235,514, filed Sep. 4, 2002, entitled "Alkylated Tetrakis(triaminotriazine) Compounds and Phase Change Inks Containing Same," with the named inventors Danielle C. Boils-Boissier, Marcel P. Breton, Jule W. Thomas, Jr., Donald R. Titterington, Jeffery H. Banning, H. Bruce Goodbrand, James D. Wuest, Marle-Ève Perron, Francis Monchamp, and Hugues Duval, the disclosure of which is totally incorporated herein by reference, discloses compounds of the formula

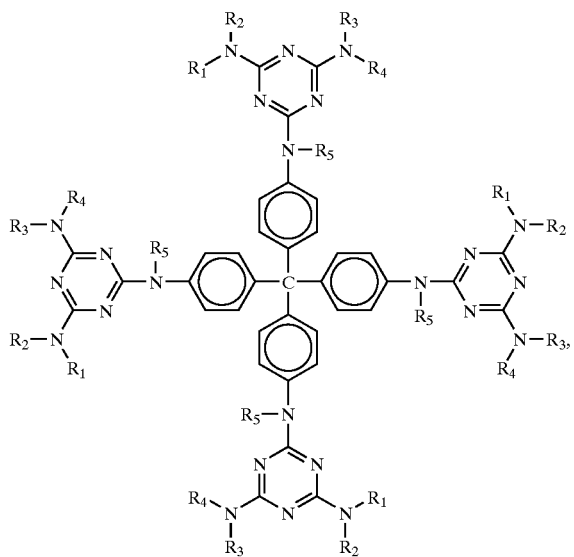

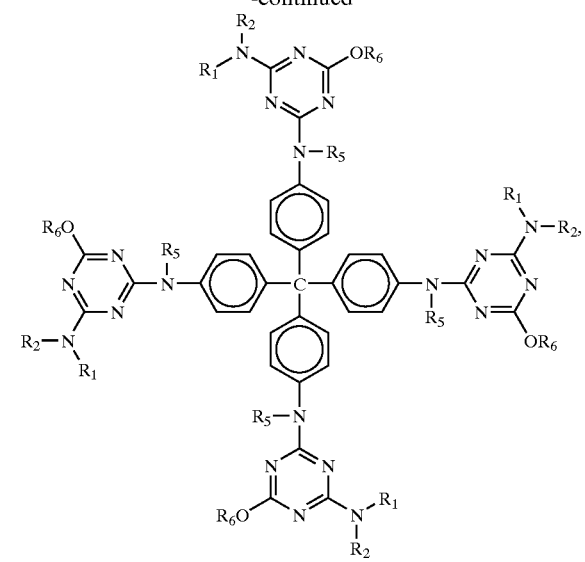

and

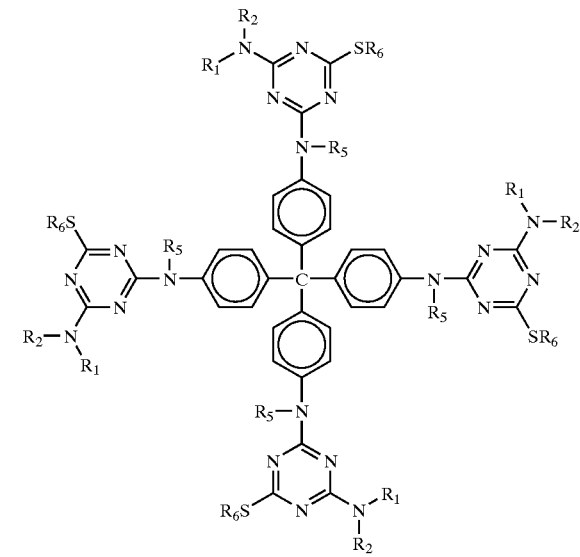

wherein, provided that at least one of $R_1$, $R_2$, $R_3$, $R_4$, $R_5$, and $R_6$ is a hydrogen atom, and provided That at least one of $R_1$, $R_2$, $R_3$, $R_4$, $R_5$, and $R_6$ is not a hydrogen atom, $R_1$, $R_2$, $R_3$, $R_4$, $R_5$, and $R_6$ each, independently of the others, is (i) a hydrogen atom, (ii) an alkyl group, (iii) an aryl group, (iv) an arylalkyl group, or (v) an alkylaryl group. Also disclosed are phase change ink compositions comprising a colorant and a phase change ink carrier comprising a material of this formula.

Copending Application U.S. Ser. No. 10/235,061, filed Sep. 4, 2002, entitled "Guanidinopyrimidinone Compounds and Phase Change Inks Containing Same," with the named Inventors Danielle C. Bolls-Boissier, Marcel P. Breton, Jule W. Thomas. Jr., Donald R. Titterington, Jeffery H. Banning, H. Bruce Goodbrand, James D. Wuest, Marie-Éve Perron, and Hugues Duval, the disclosure of which is totally incorporated herein by reference, discloses compounds of the formulae

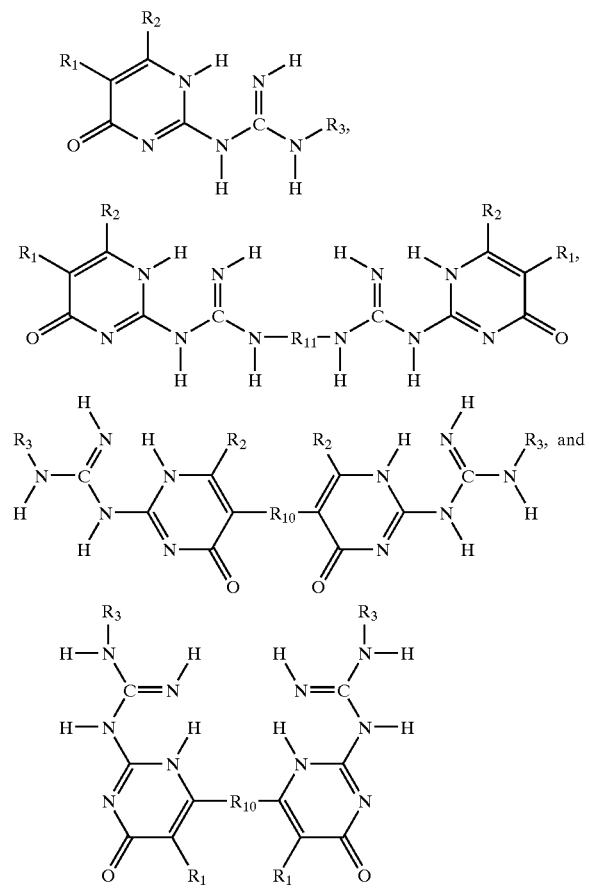

wherein, provided that at least one of $R_1$, $R_2$, and $R_3$ is not a hydrogen atom, $R_1$, $R_2$, and $R_3$ each, independently of the other, is (i) a hydrogen atom, (ii) an alkyl group, (iii) on aryl group, (iv) an arylalkyl group, or (v) an alkylaryl group, and wherein $R_1$ and $R_2$ can also be (vi) an alkoxy group, (vii) an aryloxy group, (viii) an arylalkyloxy group, (ix) on alkylaryloxy group, (x) a polyalkyleneoxy group, (xi) a polyaryleneoxy group, (xii) a polyarylalkyleneoxy group, (xiii) a polyalkylaryleneoxy group, (xiv) a silyl group, (xv) a siloxane group, (xvi) a polysilylene group, (xvii) a polysiloxane group, or (xviii) a group of the formula

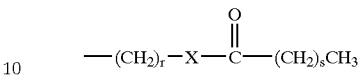

wherein r is an integer representing a number of repeat —$CH_2$— groups, wherein s is an integer representing a number of repealing —$CH_2$— groups, and wherein X is (a) a direct bond, (b) an oxygen atom, (c) a sulfur atom, (d) a group of the formula —$NR_{40}$— wherein $R_{40}$ is a hydrogen atom, an alkyl group, an aryl group, an arylalkyl group, or an alkylaryl group, or (e) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and $R_{10}$ and $R_{11}$ each, independently of the other, is (i) an alkylene group, (ii) an arylene group, (ii) an arylalkylene group, or (iv) an alkylarylene group, and wherein $R_{10}$ can also be (v) a polyalkyleneoxy group, (vi) a polyaryleneoxy group, (vii) a polyarylalkyleneoxy group, (viii) a polyalkylaryleneoxy group, (ix) a silylene group, (x) a siloxane group, (xi) a polysilylene group, or (xii) a polysiloxane group. Also disclosed are phase change ink compositions comprising a colorant and a phase change ink carrier comprising a material of this formula.

Copending Application U.S. Ser. No. 10/235,109, filed Sep. 4, 2002, entitled "Alkylated Urea and Triaminotriazine Compounds and Phase Change Inks Containing Same," with the named inventors Marcel P. Breton, Danielle C. Bolls-Boissier, Jule W. Thomas. Jr., Donald R. Titterington, H. Bruce Goodbrand, Jeffery H. Banning, James D. Wuest, Dominic Laliberté, and Marie-Ève Perron, the disclosure of which is totally incorporated herein by reference, discloses compounds of the formulae

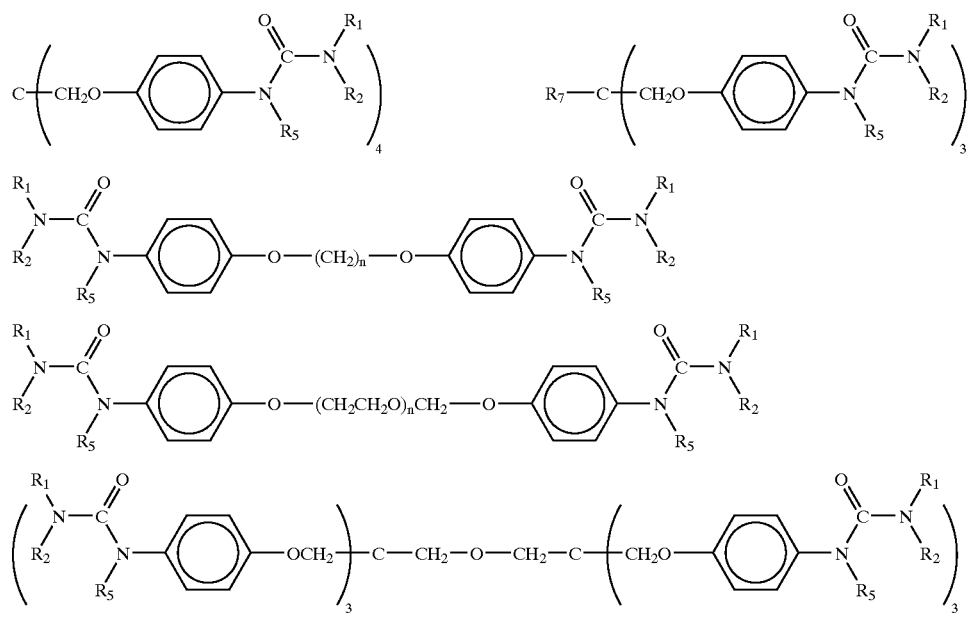

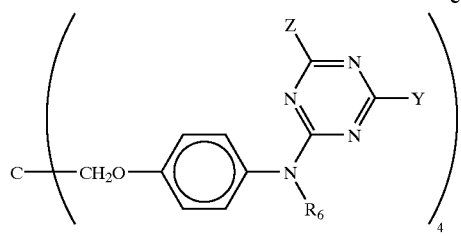
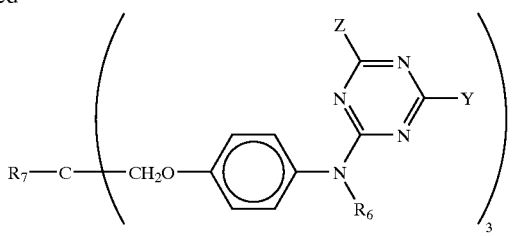
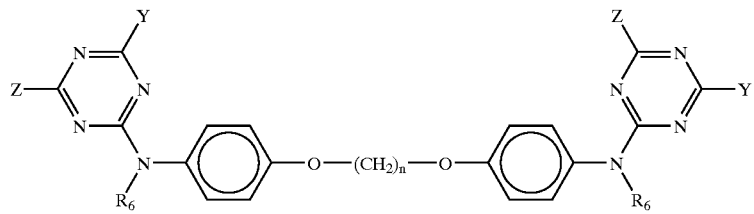
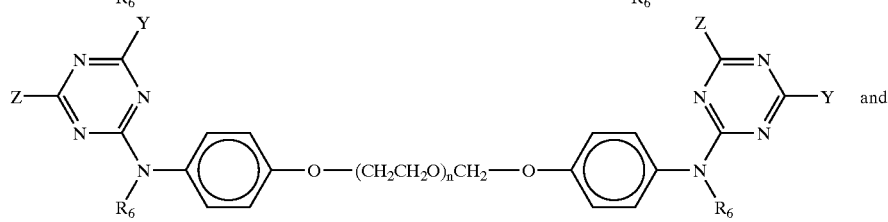
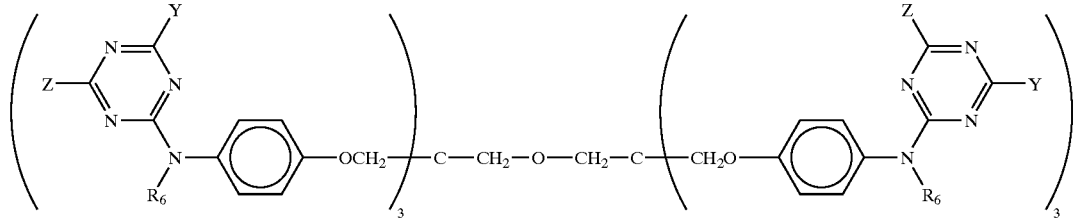

wherein Z is a group of the formula —$OR_1$, a group of the formula —$SR_1$, or a group of the formula —$NR_1R_2$, Y is a group of the formula —$OR_3$, a group of the formula —$SR_3$, or a group of the formula —$NR_3R_4$, n is an integer representing the number of repeat —($CH_2$)— or —($CH_2CH_2O$)— units, wherein, provided that at least one of $R_1$, $R_2$, $R_3$, $R_4$, $R_5$, and $R_6$ is a hydrogen atom, provided that at least one of $R_1$, $R_2$, $R_3$, $R_4$, $R_5$, and $R_6$ is other than a hydrogen atom, and provided that at least one Z or V within the compound is a group of the formula —$NR_1R_2$ or a group of the formula —$NR_3R_4$, $R_1$, $R_2$, $R_3$, $R_4$, $R_5$, $R_6$, and $R_7$ each, independently of the others, is (i) a hydrogen atom, (ii) an alkyl group, (iii) an aryl group, (iv) an arylalkyl group, or (v) an alkylaryl group, and wherein $R_7$ can also be (vi) an alkoxy group, (vii) an aryloxy group, (viii) an arylalkyloxy group, (ix) an alkylaryloxy group, (x) a polyalkyleneoxy group, (xi) a polyaryleneoxy group, (xii) a polyarylalkyleneoxy group, (xiii) a polyalkylaryleneoxy group, (xiv) a silyl group, (xv) a siloxane group, (xvi) a polysilylene group, (xvii) a polysiloxane group, or (xviii) a group of the formula

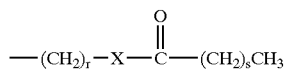

wherein r is an integer representing a number of repeat —$CH_2$— groups, wherein s is an integer representing a number of repealing —$CH_2$— groups, and wherein X is (a) a direct bond, (b) an oxygen atom, (c) a sulfur atom, (d) a group of the formula —$NR_{40}$— wherein $R_{40}$ is a hydrogen atom, an alkyl group, an aryl group, an arylalkyl group, or an alkylaryl group, or (e) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and wherein $R_6$ can also be

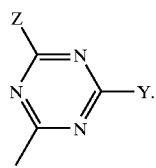

Also disclosed are phase change ink compositions comprising a colorant and a phase change ink carrier comprising a material of this formula.

BACKGROUND OF THE INVENTION

The present invention is directed to phase change (hot melt) ink compositions. More specifically, the present invention is directed to phase change ink compositions suitable for use in ink jet printing processes. One embodiment of the present invention is directed to a phase change ink composition comprising an ink vehicle, a colorant, and a nonpolymeric organic gelator selected from the group consisting of anthracene-based compounds, steroid compounds, partially fluorinated high molecular weight alkanes, high molecular weight alkanes with exactly one hetero atom, chiral tartrate compounds, chiral butenolide-based compounds, bis-urea compounds, guanines, barbiturates, oxamide compounds, ureidopyrimidone compounds, and mixtures thereof, said organic gelator being present in the ink in an amount of no more than about 20 percent by weight of the ink, said ink having a melting point at or below which the ink is a solid, said ink having a gel point at or above which the ink is a liquid, and said ink exhibiting a gel state between the melting point and the gel point, said ink exhibiting reversible transitions between the solid state and the gel state upon heating and cooling, said ink exhibiting reversible transitions between the gel state and the liquid state upon heating and cooling, said melting point being greater than about 35° C., said gel point being greater than said melting point.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfines; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,021,802 (Allred), the disclosure of which is totally incorporated herein by reference, discloses impulse ink or bubble jet inks which comprise 90 to 99.9 percent by weight of aqueous sol-gel medium and 0.1 to 10 percent by weight colorant. The inks are thermally reversible sol-gels which are gels at ambient temperatures and sols at temperatures between about 400 to 100° C.

U.S. Pat. No. 5,180,425 (Matrick et al.), the disclosure of which is totally incorporated herein by reference, discloses an ink for ink jet printers which comprises an aqueous carrier medium, pigment dispersion or dye, and a polyol/alkylene oxide condensate cosolvent which eliminates film formation on thermal ink jet resistor surfaces thereby eliminating non-uniformity in optical density. The cosolvent present at least 5 percent has a solubility in water of at least 4.5 parts in 100 parts of water at 25° C. and a general formula:

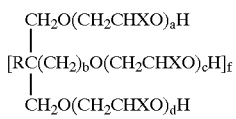

wherein X=—H or —CH$_3$; R=—H, —CH$_3$, —C$_2$H$_5$, —C$_3$H$_7$, —C$_4$H$_9$, or —CH$_2$O(CH$_2$CH$_2$O)$_a$H; b=0 or 1, a+d+f(c+e)=2 to 100; and f=1 to 6, the cosolvent being present in the amount of at least 4.5 percent based on the total weight of the ink jet ink composition. These inks exhibit freedom from thermal resistor film formation, have excellent decap performance, are storage stable and give images having excellent print quality.

U.S. Pat. No. 5,531,817 (Shields et al.), the disclosure of which is totally incorporated herein by reference, discloses the control of color bleed (the invasion of one color into another on the surface of the print medium) using ink-jet inks by employing either high molecular weight polymers that exhibit a reversible gelling nature with heat or certain amine oxide surfactants that undergo sol-gel transitions. The inks of the invention further include a vehicle and a dye. The vehicle typically comprises a low viscosity, high boiling point solvent and water. Certain high molecular weight polymers, under the correct solution conditions, can form gels which can be subsequently melted by heating of the gel. When the melted gel is cooled, it will then reform into a gel. The viscosity of an ink employing such a gel can be reduced to a viscosity low enough to permit jetting from the print cartridge. After leaving the print cartridge, the melted gel will again reform into a highly viscous gel to immobilize the droplet of ink and prevent its migration on the media. Therefore, two drops of different colors, when printed next to one another will thus be inhibited from migrating or bleeding into one another.

U.S. Pat. No. 5,476,540 (Shields et al.), the disclosure of which is totally incorporated herein by reference, discloses a method for controlling color bleed between adjacent multi-color ink regions on a print medium. Color bleed involves the migration of color agents between adjacent zones in a multicolored printed image on a print medium. A first composition containing a gel-forming species and a color agent is brought into contact on a region of the print medium with a second composition having a color agent and a gel-initiating species or chemical conditions which bring about gelation. In alternative embodiments, the print medium may be pretreated with either a gel-initiating species or a gel-forming species (with no colorant), followed by treatment with a gel-forming species or gel-initiating species (with colorant), respectively. The formation of the gel upon the print medium impedes the movement of the color agent or agents and thus reduces the color bleed between adjacent zones.

U.S. Pat. No. 5,389,958 (Bui et al.), the disclosure of which is totally incorporated herein by reference, discloses a method and apparatus whereby an intermediate transfer surface of a layer of sacrificial liquid is applied to a supporting surface and a phase change ink is deposited on the liquid layer. The inked image is then contact transferred to a final receiving substrate.

U.S. Pat. No. 5,554,212 (Bui et al.), the disclosure of which is totally incorporated herein by reference, discloses an aqueous phase change ink containing a water dispersible sulfonated polyester gloss agent and a selected concentration of hyperthermogelling component that causes the ink to gel when its temperature is increased to its thermo-inversion point or when the concentration of the hyperthermogelling component is increased by evaporation, or substrate absorption, of water from the ink. The ink may be jetted directly onto a heated and/or absorptive substrate or jetted onto a cooler and/or hydrophobic surface before being transferred to the substrate. The thermo-inversion point is preferably about ambient temperature, and the preferred hyperthermogelling component is a nonionic surfactant, such as an ethylene oxide propylene oxide block copolymer surfactant.

U.S. Pat. No. 5,462,591 (Karandikar et al.), the disclosure of which is totally incorporated herein by reference, discloses an aqueous phase change ink that contains a selected concentration of hyperthermogelling component that causes the ink to gel when its temperature is increased to its thermo-inversion point or when the concentration of the hyperthermogelling component is increased by evaporation, or substrate absorption, of water from the ink. The ink may be jetted directly onto a heated and/or absorptive substrate or jetted onto a cooler and/or hydrophobic surface before being transferred to the substrate. The thermo-inversion point is preferably about ambient temperature, and the preferred hyperthermogelling component is a nonionic surfactant, such as an ethylene oxide propylene oxide block copolymer surfactant.

U.S. Pat. No. 5,099,256 (Anderson), the disclosure of which is totally incorporated herein by reference, discloses an ink jet printer having a rotatable intermediate drum having a thermally conductive surface on which the ink droplets are printed from the printhead. The drum surface material is a suitable film forming silicone polymer having a high surface energy and surface roughness to prevent movement of the droplets after impact thereon. The printhead is located relative to the intermediate drum surface so that the ink droplets impact the drum surface with a large contact angle and the ink droplet image is transferred at a second location spaced from the printhead to minimize contaminating particles from the recording medium from reaching the printhead nozzles. The intermediate drum surface is heated to dehydrate the ink droplets prior to transfer from the intermediate drum to the recording medium. The silicone polymer coating enables substantially complete transfer of the dehydrated droplets to the recording medium, so that subsequent removal of the residual ink from the drum by a cleaning system is eliminated.

U.S. Pat. No. 4,538,156 (Durkee et al.), the disclosure of which is totally incorporated herein by reference, discloses an ink jet printer utilizing a smooth surfaced transfer drum as an illustrative embodiment of the invention. The transfer drum and the print head assembly are mounted between a pair of side plates. A print head assembly, which comprises a number of ink jet nozzles, is also mounted between the side plates. The print head assembly is spaced apart from the drum and the nozzles thereof are spaced at equal distances along a line which is parallel to the axis of the drum. The print head assembly is movable in fine steps from left to right so that on successive rotations of the drum each nozzle is directed to a new track of a succession of tracks. After all tracks of the transfer drum have been served by a nozzle assembly, a printing medium, e.g., paper is brought in rolling contact with the drum to transfer the indicia on the drum to the printing medium while the print head assembly is returned to its starting position; and thereafter, if required, the drum is wiped clean in preparation for receiving the next page of information.

U.S. Pat. No. 5,761,597 (Smith et al.), the disclosure of which is totally incorporated herein by reference, discloses an improved fusing apparatus for fixing or fusing images on print media wherein a relatively small pressure applying surface, such as the surface of a rotatable pressure wheel, is lubricated with a lubricating medium such as silicone oil, and engages the printed image to apply pressure and fuse the image to the image receiving substrate. The fusing apparatus is mounted for reciprocal back and forth movement across the printed image on the image receiving substrate or medium to fuse the image into the substrate and flatten or smooth the upper exposed surface of the ink image. The pressure wheel is passed in multiple overlapping passes over the printed image to uniformly fuse the image into the media.

U.S. Pat. No. 5,195,430 (Rise), the disclosure of which is totally incorporated herein by reference, discloses a fixing and developing apparatus in which sheet material to be treated is passed through a high pressure nip defined by a pair of rollers. At least one of the rollers may have a composite construction. The composite roller includes an elongated tubular shell with a pressure applying external surface, an elongated core positioned within the tubular shell, and an elastomeric material disposed between the core and shell to support the shell on the core. The core may be of a number of configurations and may increase in transverse cross-sectional dimension from the respective ends of the core toward the center of the core. The core may taper continuously or in discrete steps from its center toward its first and second ends. In addition, the core may have a longitudinal cross-section with a crown in the shape of a beam deflection curve for a simply supported, uniformly constant cross-section beam. The shell may be similarly configured along its interior surface. Also, the elastomer may be compressed at the center of the roller relative to the ends of the roller to preload its center portion.

U.S. Pat. No. 4,889,761 (Titterington et al.), the disclosure of which is totally incorporated herein by reference, discloses a method for producing a light-transmissive phase change ink printed substrate which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path. In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

U.S. Pat. No. 4,745,420 (Gerstenmaier), the disclosure of which is totally incorporated herein by reference, discloses a method of ejecting droplets of phase change or hot melt ink jet ink upon a target such as paper which includes a step of applying pressure to the droplets after they have cooled upon the paper in order to increase their coverage and, thus, minimize the volume of ink required to produce a high quality print with a high degree of resolution. Including a means for applying pressure to the cooled droplets, a suitable apparatus increases the area of the target covered by a particular droplet after spreading by at least five percent and preferably by twenty percent.

U.S. Pat. No. 6,320,018 (Sijbesma et al.), the disclosure of which is totally incorporated herein by reference, discloses a polymer comprising monomeric units linked via four H-bridges and bound within said polymer via a different bond. The bond via the H-bridges is much stronger than with known supramolecular polymers.

U.S. Pat. No. 5,892,116 (Weiss et al.) and PCT Patent Publication WO 97/24364 (Weiss et al.), the disclosures of each of which are totally incorporated herein by reference, disclose gelators that gel a variety of nonpolar and polar liquids. Moreover, gelation of various monomers with subsequent polymerization of the gelled monomers forms organic zeolites and membrane materials. An ionic gelator includes salts of compounds of formula (I)

$$[R^1R^2R^3X\text{---}R^4]^+Y^\pm \qquad \text{I}$$

where $R^1$, $R^2$, and $R^3$ are the same or different hydrogen or organic groups including alkyl groups, alkenyl groups, alkynyl groups, aryl groups, arylalkyl groups, alkoxy groups, aryloxy groups; X is a Group IIIA or Group VA element; $R^4$ is a steroidal group, an alkyl group, an alkenyl group, an alkynyl group, an aryl group, an arylalkyl group, an alkoxy group, or an aryloxy group; and Y is a Group IA or Group VIIA element or one-half of a Group IIA or VIA element, that is, a divalent counterion. The gelling agent composition may include a single isomer or mixtures of isomers of the formula (I). A non-ionic gelator also includes compounds of the formula (II):

$$R^1R^2R^3X \qquad \text{II}$$

where $R^1$, $R^2$, $R^3$, and X are defined as above.

Also of interest with respect to the present invention are the following references: "Reversible Polymers Formed from Self-Complementary Monomers Using Quadruple Hydrogen Bonding," R. P. Sijbesma et al., *Science*, Vol. 278, p. 1601 (1997); "Supramolecular Polymers," R. Dagani, *Chemical and Engineering News*, p. 4 (December 1997); "Supramolecular Polymers from Linear Telechelic Siloxanes with Quadruple-Hydrogen-Bonded Units," J. H. K. Hirschberg et al., *Macromolecules*, Vol. 32, p. 2696 (1999); "Design and Synthesis of 'Smart' Supramolecular Liquid Crystalline Polymers via Hydrogen-Bond Associations," A. C. Griffin et al., *PMSE Proceedings*, Vol. 72, p. 172 (1995); "The Design of Organic Gelators: Solution and Solid State Properties of a Family of Bis-Ureas," Andrew J. Carr et al., *Tetrahedron Letters*, Vol. 39, p. 7447 (1998); "Hydrogen-Bonded Supramolecular Polymer Networks," Ronald F. M. Lange et al., *Journal of Polymer Science*, Part A: *Polymer Chemistry*, Vol. 37, p. 3657 (1999); "Combining Self-Assembly and Self-Association—Towards Columnar Supramolecular Structures in Solution and in Liquid-Crystalline Mesophase," Arno Kraft et al., *Polym. Mater. Sci. Eng.*, Vol. 80, p. 18 (1999); "Facile Synthesis of β-Keto Esters from Methyl Acetoacetate and Acid Chloride: The Barium Oxide/Methanol System," Y. Yuasa et al., *Organic Process Research and Development*, Vol. 2, p. 412 (1998); "Self-Complementary Hydrogen Bonding of 1,1'-Bicyclohexylidene-4,4'-dione Dioxime. Formation of a Non-Covalent Polymer," F. Hoogesteger et al., *Tetrahedron*, Vol. 52, No. 5, p. 1773 (1996); "Molecular Tectonics. Three-Dimensional Organic Networks with Zeolite Properties," X. Wang et al., *J. Am. Chem. Soc.*, Vol. 116, p. 12119 (1994); "Helical Self-Assembled Polymers from Cooperative Stacking of Hydrogen-Bonded Pairs," J. H. K. Ky Hirschberg et al., *Nature*, Vol. 407, p. 167 (2000); "New Supramolecular Arrays based on Interactions between Carboxylate and Urea Groups: Solid-State and Solution Behavior," Abdullah Zafar et al., *New J. Chem.*, 1998, 137–141; "The Unusual Molecular Organization of 2,3-Bis (n-hexyloxy)-anthracene in the Crystal. A Hint to the Origin of the Gelifying Properties of 2,3-Bis(n-alkyloxy) anthracenes?", J-L. Pozzo et al., *J. Chem. Soc., Perkin*

Trans., 2, 824–826 (2001); "The Quest for the Simplest Possible Organogelators and Some Properties of their Organogels," D. Abdallah et al., *J. Braz. Chem. Soc.*, Vol. 11, No. 3, 209–218 (2000); "Organogel Electrolytes Based on a Low Molecular Weight Gelator: 2,3-Bis(n-decyloxy) anthracene," F. Placin et al., *Chem. Mater.* 13, 117–121 (2001); "Novel Vesicular Aggregates of Crown-Appended Cholesterol Derivatives Which Act as Gelators of Organic Solvents and as Templates for Silica Transcription," J. Jung et al., *J. Am. Chem. Soc.*, Vol. 122, No. 36, 8648–8653 (2000); "n-Alkanes Gel n-Alkanes (and Many Other Organic Liquids)," D. Abdallah et al., *Langmuir*, 16, 352–355 (2000); "Low Molecular Mass Gelators of Organic Liquids and the Properties of their Gels," P. Terech et al., *Chem. Rev.*, 97, 3133–3159 (1997); "Organogels and Low Molecular Mass Organic Gelators," D. Abdallah et al., *Adv. Mater.*, 12, No. 17, 1237 (2000); "Making it All Stick Together: the Gelation of Organic Liquids by Small Organic Molecules," F. Schoonbeek, Doctoral Thesis, U. of Groningen, Netherlands, April 2001; Twieg et al., *Macromolecules*, Vol. 18, p. 1361 (1985); "Synthesis and Reactions of Polyhydric Alcohols I. Synthesis and Reactions of p-Toluenesulfonates of Polyhydric Alcohols," *Zhurnal Obshchei Khimii*, Vol. 35, No. 5, p. 804–807 (1965); "The Chemotherapy of Schistosomiasis. Part I. Derivatives and Analogs of αω-Di-(p-aminophenoxy)alkanes," J. Ashley et al., *J. Chem. Soc.* 1958, 3293; "Remarkably Simple Small Organogelators: Di-n-alkoxy-benzene Derivatives," G. Clavier et al., *Tetrahedron Letters*, 40, 9021–9024 (1999); "Rational Design of Low Molecular Mass Organogelators: Toward a Library of Functional N-Acyl-1-ω-Amino Acid Derivatives," G. Mieden-Gundert et al., *Angew. Chem. Int. Ed.*, 40, No. 17, 3164–3166 (2001); U.S. Pat. No. 2,703,808 (Buchman); "Rational Design of New Acid-Sensitive Organogelators," J-L. Pozzo et al., *J. Mater. Chem.*, Vol. 8, pp. 2575–2577 (1998); J. T. Thurston et al., *J. Am. Chem. Soc.*, Vol. 73, pp. 2981–3008 (1951); *J. Am. Chem. Soc.*, Vol. 96, pp. 1082–1087 (1974); J-L. Pozzo et al., *Tetrahedron*, Vol. 53, No. 18, pp. 6377–6390 (1997); J-L. Pozzo et al., *Mol. Cryst. Liq. Cryst.*, Vol. 344, pp. 101–106 (2000); Y. C. Lin, R. G. Weiss, *Macromolecules*, Vol. 20, p. 414 (1987); Weiss et al., U.S. Pat. No. 4,790,961; Murata et al, *J. Am. Chem. Soc.*, Vol. 116, No 15, pp. 6664–6676 (1994); A. Ikeda et al., *Rep. Asahi Glass Found. Ind. Technol.*, Vol. 61, p. 115, (1992); Rabolt et al., *Macromolecules*, Vol. 17, p. 2786 (1984); D. J. Abdallah et al., *Chem. Mater.*, Vol. 11, p. 2907 (1999); Ralston et al., *J. Org. Chem.*, Vol. 9, p. 259 (1944); L. Lu et al., *Chem. Commun.*, 1996, p. 2029; *J. Prakt. Chem.*, Vol. 327 (3), pp. 383–98 (1985); B. L. Feringa et al., *J. Org. Chem.*, Vol. 53, p. 1125 (1988); J. C. DeJong et al., *Tetrahedron Lett.*, Vol. 30, p. 7239 (1989); J. C. DeJong, Ph.D. thesis, University of Groningen, The Netherlands, 1991; F. A. Neugebauer et al., *Chem. Ber.*, 1976, 109, 2389; U. Zehavi et al., *J. Org. Chem.*, Vol. 26, pp. 1097–1101 (1961); J. March, *Advanced Organic Chemistry*, 4th Edition, pp. 903 and 1091–1092, Wiley Interscience (New York 1992); J. Crossley Maxwell, *Aust. J. Chem.*, Vol. 47, pp. 723–738 (1994); V. J. Wotring et al., *Analytical Chemistry*, Vol. 62, No.14, pp.1506–1510 (1990); Tabushi et al., *J. Am. Chem. Soc.*, Vol. 103, pp. 6152–6157 (1981); T. Giorgi et al., "Gel-like lyomesophases formed in organic solvents by self-assembled guanine ribbons," *Chemistry—A European Journal* (2002), 8(9), 2143–2152; T. Suyamaet al., "A method for the preparation of substituted biguanides," *Nippon Kagaku Kaishi* (1989), (5), 884–7; Polish Patent Publication PL 148060 B1; Polish Patent Publication PL 134682 B1; C. S. Snijder et al., *Chem. Eur. J.*, Vol. 1, No. 9, pp. 594–597 (1995); S. Senda et al., Gifu Coll. Pharm., Gifu, Japan. *Yakugaku Zasshi* (1969), 89 (2), 254–259; B. Gluncic et al, *Acta Pharm. Jugosl.* (1986), 36(4), 393–404; Canadian Patent Publication CA 941377; M. Klein, Recent Dev. Mass Spectrom. Biochem. Med., [Proc. Int. Symp.], 4th (1978), Meeting Date 1977, 1, 471–82; PCT Patent Publication WO/9011283; Japanese Patent Publication JP 62181279; T. Wada et al., "A New Boranophosphorylation Reaction for the Synthesis of Deoxyribonucleoside Boranophosphates," *Tetrahedron Letters*, Vol. 43, No. 23, pp. 4137–4140 (2002); R. Schirrmacher et al., "Dimethylpyridin-4-ylamine-catalysed alcoholysis of 2-amino-N,N,N-trimethyl-9H-purine-6-ylammonium chloride: An effective route to O6-substituted guanine derivatives from alcohols with poor nucleophilicity," *Synthesis*, Vol. 4, pp. 538–542 (2002); Z. Situ, "Synthesis of Tricyclic Derivatives of Guanine Analogue Catalyzed by KF—Al$_2$O$_3$," *Huaxue Shiji*, Vol. 24, No. 1, p. 57 (2002); Korean Patent 2000003081 (Korean Patent Application KR 1998-24185); S. Bailey et al., "Synthesis and Antiviral Activity of 9-Alkoxypurines: New 9-(Hydroxyalkoxy) Derivatives of Guanine and 8-Methylguanine," *Antiviral Chem. Chemother.*, Vol. 5, No. 1, pp. 21–33 (1994); Japanese Patent Publication JP 06157529; Japanese Patent Publication JP 3217541; M. R. Harnden et al., "Synthesis, Oral Bioavailability and In Vivo Activity of Acetal Derivatives of the Selective Antiherpesvirus Agent 9-(3-Hydroxypropoxy)Guanine (BRL44385)," *Antiviral Chem. Chemother.*, Vol. 5, No. 3, pp. 147–54 (1994); Spanish Patent Publication ES 2047457; B. K. Bhattacharya et al., "Synthesis of Certain N- and C-alkyl Purine Analogs," *J. Heterocycl. Chem.*, Vol. 30, No. 5, pp. 1341–9 (1993); Polish Patent Publication PL 148969; PCT Patent Publication WO/9011283; U.S. Pat. No. 5,298,618 (Speranza et al.); and Japanese Patent Publication JP 62181279, the disclosures of each of which are totally incorporated herein by reference.

While known compositions and processes are suitable for their intended purposes, a need remains for phase change inks that are suitable for hot melt ink jet printing processes, such as hot melt piezoelectric ink jet printing processes and the like. In addition, a need remains for phase change inks that can be jetted at lower temperatures than currently known phase change inks, thereby enabling reduced energy use and improved thermal stability of the ink. Further, a need remains for phase change inks that exhibit desirably low viscosity values at jetting temperatures, thereby enabling increased jetting frequency. Additionally, a need remains for phase change inks which generate images having a desirably low coefficient of friction, thereby improving performance when substrates having the inks printed thereon are passed through automatic document handlers in copiers and also improving feel of the image and in some cases improving dry smear characteristics. There is also a need for phase change inks that generate images with reduced pile height. In addition, there is a need for phase change inks that generate images with improved scratch resistance. Further, there is a need for phase change inks that generate images with improved look and feel characteristics. Additionally, there is a need for phase change inks that generate images with improved hardness and toughness characteristics. A need also remains for phase change inks that are suitable for high speed printing, thereby enabling transaction and production printing applications.

SUMMARY OF THE INVENTION

The present invention is directed to a phase change ink composition comprising an ink vehicle, a colorant, and a nonpolymeric organic gelator selected from the group consisting of anthracene-based compounds, steroid compounds, partially fluorinated high molecular weight alkanes, high molecular weight alkanes with exactly one hetero atom, chiral tartrate compounds, chiral butenolide-based compounds, bis-urea compounds, guanines, barbiturates, oxamide compounds, ureidopyrimidone compounds, and mixtures thereof, said organic gelator being present in the ink in an amount of no more than about 20 percent by weight of the ink, said ink having a melting point at or below which the ink is a solid, said ink having a gel point at or above which the ink is a liquid, and said ink exhibiting a gel state between the melting point and the gel point, said ink exhibiting reversible transitions between the solid state and the gel state upon heating and cooling, said ink exhibiting reversible transitions between the gel state and the liquid state upon heating and cooling, said melting point being greater than about 35° C., said gel point being greater than said melting point.

DETAILED DESCRIPTION OF THE INVENTION

Phase change inks of the present invention contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958, the disclosure of which is totally incorporated herein by reference.

Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

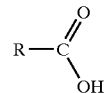

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO97/33943, and PCT Publication WO95/04760, the disclosures of each of which are totally incorporated herein by reference.

Mixtures of fatty amide materials and isocyanate-derived materials can also be employed as the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises the ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a carboxylic acid derivative of a long chain alcohol having greater than thirty six carbon atoms, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions of the present invention also contain a colorant. Any desired or effective colorant can be employed in the inks of the present invention, including dyes, pigments, mixtures thereof, and the like, provided that the colorant can be dissolved or dispersed in the ink vehicle. The phase change carrier compositions of the current invention can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, and uncut Reactant Violet X-80.

Pigments are also suitable colorants for the phase change inks of the present invention. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991 K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Also suitable are the colorants disclosed in Copending application U.S. Ser. No. 10/072,241, filed Feb. 8, 2002, entitled "Phthalocyanine Compositions," Copending application U.S. Ser. No. 10/072,210, Feb. 8, 2002, entitled "Ink Compositions Containing Phthalocyanines," Copending application U.S. Ser. No. 10/072,237, filed Feb. 8, 2002, entitled "Methods For Preparing Phthalocyanine Compositions," Copending application U.S. Ser. No. 10/185,261, filed Jun. 27, 2002, entitled "Processes for Preparing Dianthranilate Compounds and Diazopyridone Colorants," Copending application U.S. Ser. No. 10/185,994, filed Jun. 27, 2002, entitled "Dimeric Azo Pyridone Colorants," Copending application U.S. Ser. No. 10/184,269, filed Jun. 27, 2002, entitled "Phase Change Inks Containing Dimeric Azo Pyridone Colorants," Copending application U.S. Ser. No. 10/185,264, filed Jun. 27, 2002, entitled "Phase Change Inks Containing Azo Pyridone Colorants," Copending application U.S. Ser. No. 10/186,024, filed Jun. 27, 2002, entitled "Azo Pyridone Colorants," Copending application U.S. Ser. No. 10/185,597, filed Jun. 27, 2002, entitled "Process for Preparing Substituted Pyridone Compounds," Copending application U.S. Ser. No. 10/185,828, filed Jun. 27, 2002, entitled "Method for Making Dimeric Azo Pyridone Colorants," Copending application U.S. Ser. No. 10/186,023, filed Jun. 27, 2002, entitled "Dimeric Azo Pyridone Colorants," and Copending application U.S. Ser. No. 10/184,266, filed Jun. 27, 2002, entitled "Phase Change Inks Containing Dimeric Azo Pyridone Colorants," the disclosures of each of which are totally incorporated herein by reference.

Other ink colors besides the subtractive primary colors can be desirable for applications such as postal marking or industrial marking and labeling using phase change printing, and the present invention is applicable to these needs. Further, infrared (IR) or ultraviolet (UV) absorbing dyes can also be incorporated into the inks of the present invention for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

The colorant is present in the phase change ink of the present invention in any desired or effective amount to obtain the desired color or hue, typically at least about 0.1 percent by weight of the ink, preferably at least about 0.2 percent by weight of the ink, and more preferably at least about 0.5 percent by weight of the ink, and typically no more than about 50 percent by weight of the ink, preferably no more than about 20 percent by weight of the ink, and more preferably no more than about 10 percent by weight of the ink, although the amount can be outside of these ranges.

The inks of the present invention also contain a nonpolymeric organic gelator additive. The organic gelator forms a solid-like gel in the ink vehicle at temperatures above the melting point of the ink and below the temperature at which the ink is jetted. The gel phase typically comprises a solid-like phase and a liquid phase in coexistence, wherein the solid-like phase forms a three-dimensional network structure throughout the liquid phase and prevents the liquid phase from flowing at a macroscopic level. The inks of the present invention exhibit a thermally reversible transition between the gel state and the liquid state when the temperature is varied above or below the gel point of the ink. This cycle of gel reformation can be repeated a number of times, since the gel is formed by physical, non-covalent interactions between the gelator molecules, such as hydrogen bonding, aromatic interactions, ionic bonding, coordination bonding, London dispersion interactions, or the like.

One example of a suitable class of organic gelators is that of anthracene-based compounds, including anthracenes, anthraquinones, phenazines, and the like. Examples of these classes of materials include those of the general formula

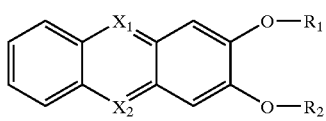

wherein $X_1$ and $X_2$ each, independently of the other, is a nitrogen atom, a —CH— group, or a

group; accordingly, this class includes (but is not limited to) materials of the general formulae

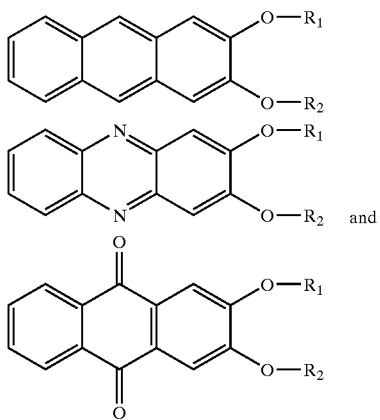

$R_1$ and $R_2$ each, independently of the other, can be (but is not limited to) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 5 carbon atoms, and in yet another embodiment with at least about 9 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, an aryl group (including unsubstituted and substituted aryl groups, and wherein hetero atoms, such as oxygen, sulfur, nitrogen, silicon, phosphorus, or the like, either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 5 carbon atoms, in another embodiment with at least about 9 carbon atoms, and in yet another embodiment with at least about 12 carbon atoms, and in one embodiment with no more than about 50 carbon atoms, in another embodiment with no more than about 30 carbon atoms, in yet another embodiment with no more than about 20 carbon atoms, and in still another embodiment with no more than about 14 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 5 carbon atoms, in another embodiment with at least about 9 carbon atoms, and in yet another embodiment with at least about 12 carbon atoms, and in one embodiment with no more than about 50 carbon atoms, in another embodiment with no more than about 30 carbon atoms, in yet another embodiment with no more than about 20 carbon atoms, and in still another embodiment with no more than about 14 carbon atoms, although the number of carbon atoms can be outside of these ranges, and wherein $R_2$ can also be a hydrogen atom, wherein the substituents on the substituted alkyl, aryl, arylalkyl, and alkylaryl groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like. In a specific embodiment, $R_1$ is the same as $R_2$. Some specific examples of suitable anthracene compounds, anthraquinone compounds, and phenazine compounds include (but are not limited to) those of the formulae

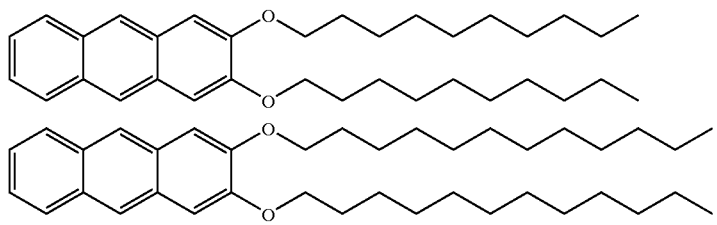

-continued
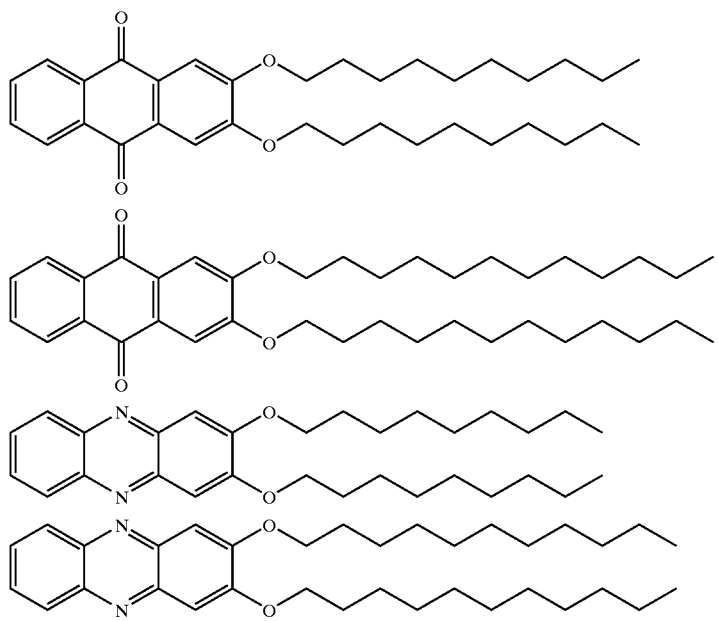
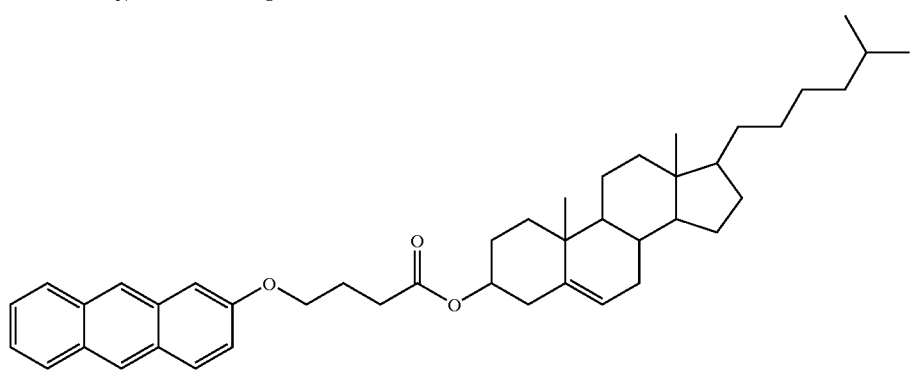
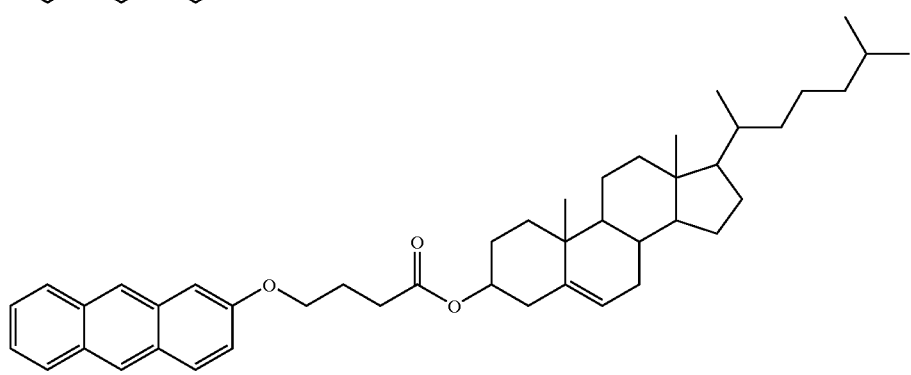
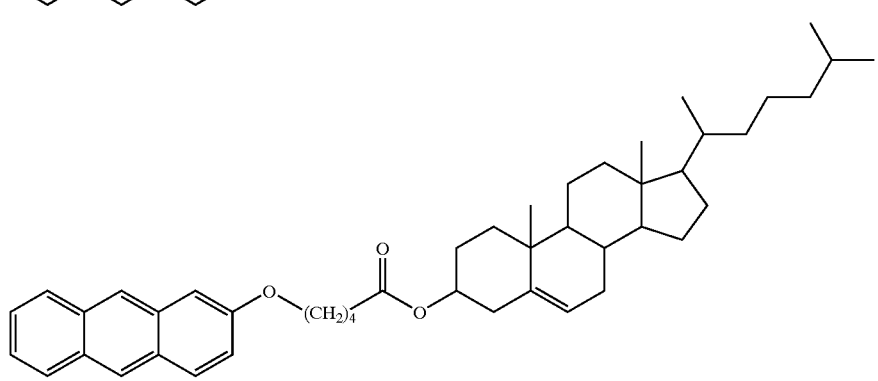

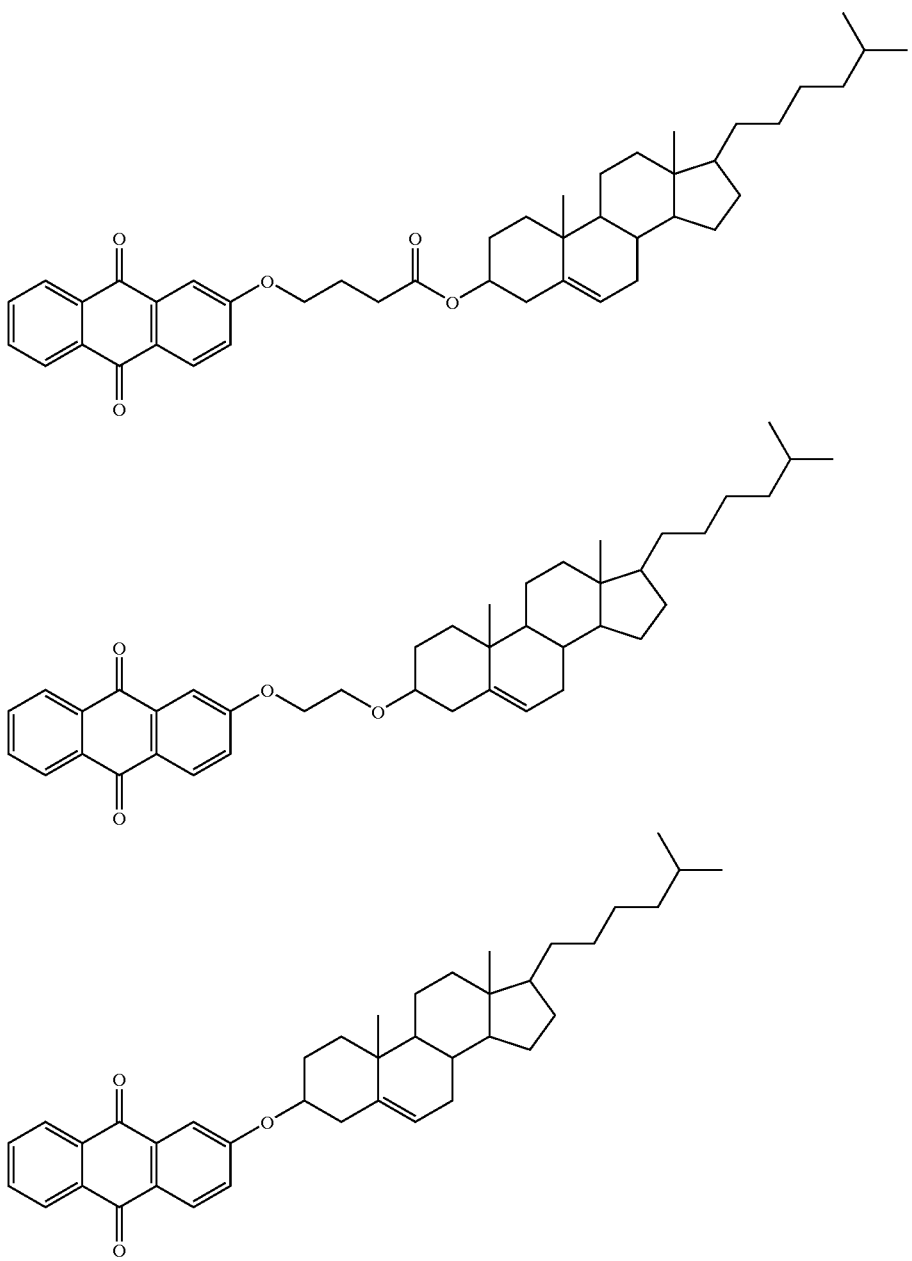

and the like, as well as mixtures thereof. Materials of this class can be prepared by any desired or effective method, such as those disclosed in, for example, J-L. Pozzo et al., *J. Chem. Soc., Perkin Trans.*, Vol. 2, pp. 824–826 (2001); J-L. Pozzo et al., *Tetrahedron*, Vol. 53, No. 18, pp. 63776390 (1997); J-L. Pozzo et al., *Mol. Cryst. Liq. Cryst.*, Vol. 344, pp. 101–106 (2000); D. J. Abdallah and R. G. Weiss, "Organogels and Low Molecular Mass Organic Gelators," *Adv. Mater.*, Vol. 12, No. 17, pp. 1237–1247 (2000); Y. C. Lin, R. G. Weiss, *Macromolecules*, Vol. 20, p. 414 (1987); and R. G. Weiss, Y. C. Lin, U.S. Pat. No. 4,790,961 (1988), the disclosures of each of which are totally incorporated herein by reference.

Another example of a suitable class of organic gelators is that of steroid compounds, including (but not limited to) those of the general formulae

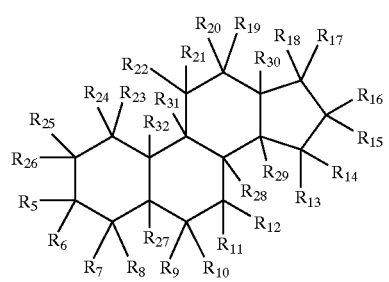

-continued

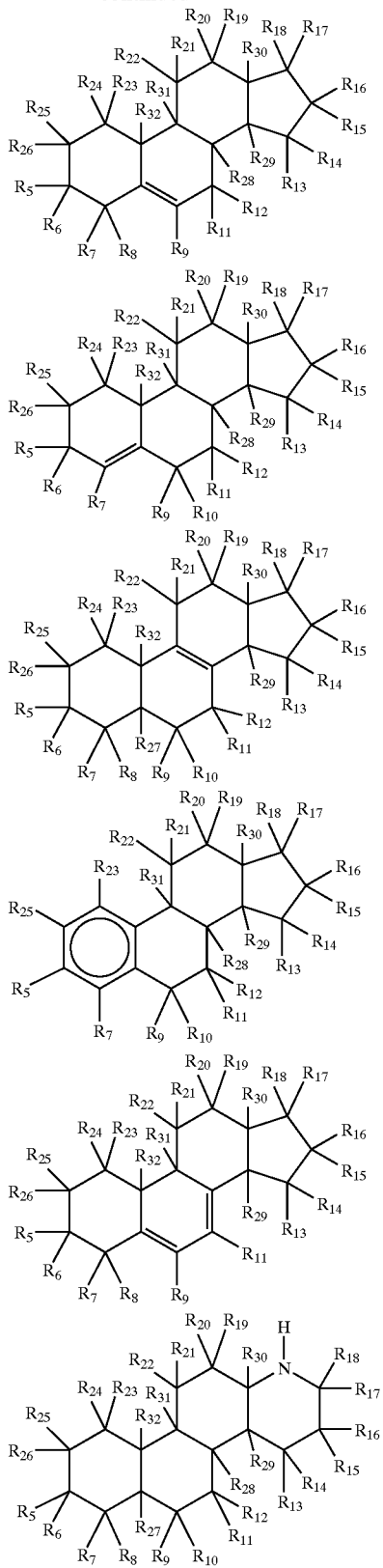

wherein $R_5$ through $R_{32}$ each, independently of the others, is a hydrogen atom, a hydroxy group, a carbonyl group, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, sulfur, nitrogen, silicon, phosphorus, or the like, either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryloxy group (including unsubstituted and substituted aryloxy groups, and wherein hetero atoms, such as oxygen, sulfur, nitrogen, silicon, phosphorus, or the like, either may or may not be present in the aryl portion of the aryloxy group), in one embodiment with at least about 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyloxy group (including unsubstituted and substituted arylalkyloxy groups, and wherein hetero atoms, such as oxygen, sulfur, nitrogen, silicon, phosphorus, or the like, either may or may not be present in either or both of the alkyl portion and the aryl portion of the arylalkyloxy group), in one embodiment with at least about 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an ester group of the formula

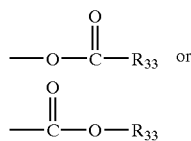

wherein $R_{33}$ is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, sulfur, nitrogen, silicon, phosphorus, or the like, either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryloxy group (including unsubstituted and substituted aryloxy groups, and wherein hetero atoms, such as oxygen, sulfur, nitrogen, silicon, phosphorus, or the like, either may or may not be present in the aryl portion of the aryloxy group), in one embodiment with at least about 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyloxy group (including unsubstituted and substituted arylalkyloxy groups, and wherein hetero atoms, such as oxygen, sulfur, nitrogen, silicon, phosphorus, or the like, either may or may not be present in either or both of the alkyl portion and the aryl portion of the arylalkyloxy group), in one embodiment with at least about 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, or an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, amine groups and ammonium groups of the formulae

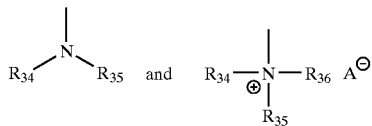

wherein $R_{34}$, $R_{35}$, and $R_{36}$ each, independently of the others, is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, sulfur, nitrogen, silicon, phosphorus, or the like, either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryloxy group (including unsubstituted and substituted aryloxy groups, and wherein hetero atoms, such as oxygen, sulfur, nitrogen, silicon, phosphorus, or the like, either may or may not be present in the aryl portion of the aryloxy group), in one embodiment with at least about 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyloxy group (including unsubstituted and substituted arylalkyloxy groups, and wherein hetero atoms, such as oxygen, sulfur, nitrogen, silicon, phosphorus, or the like, either may or may not be present in either or both of the alkyl portion and the aryl portion of the arylalkyloxy group), in one embodiment with at least about 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, or an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, and A is an anion. Any desired or suitable anion can be employed, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, as well as mixtures thereof. The substituents on the substituted alkyl, aryl, arylalkyl, alkylaryl, alkoxy, aryloxy, arylalkyloxy, and alkylaryloxy groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like. It should be noted that when one R group attached to a particular carbon atom on the steroid structure is divalently attached, such as a carbonyl oxygen, a carbon atom double bonded to the steroid structure, or the like, a second R group shown in the generic structure as being attached to the same carbon atom on the steroid structure will be absent. For example, if $R_7$ is a carbonyl group (an oxygen atom double bonded to the steroid structure), $R_8$ will be absent. Some specific examples of suitable steroid compounds include (but are not limited to) those of the formulae
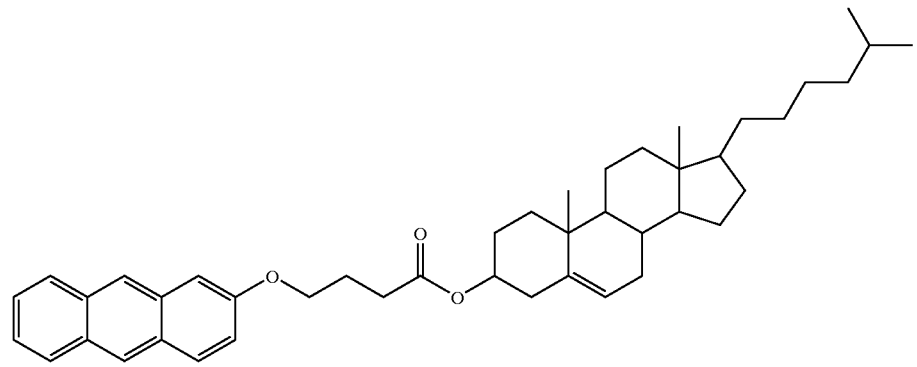
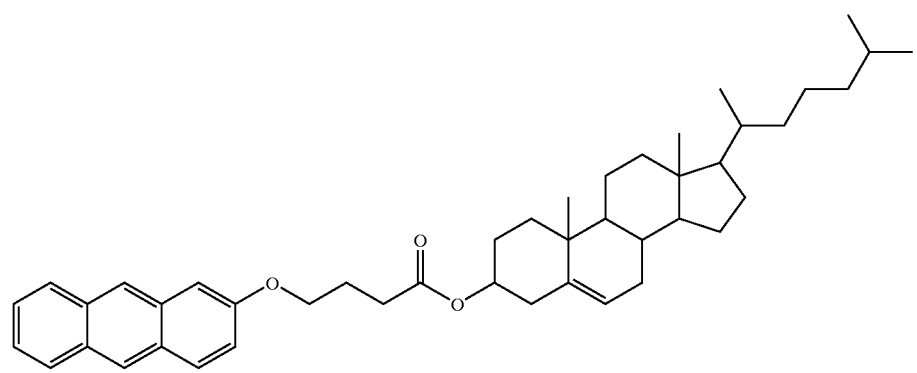
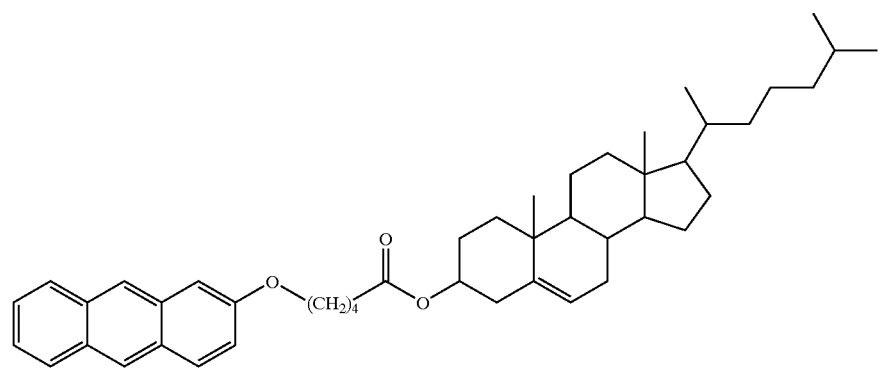
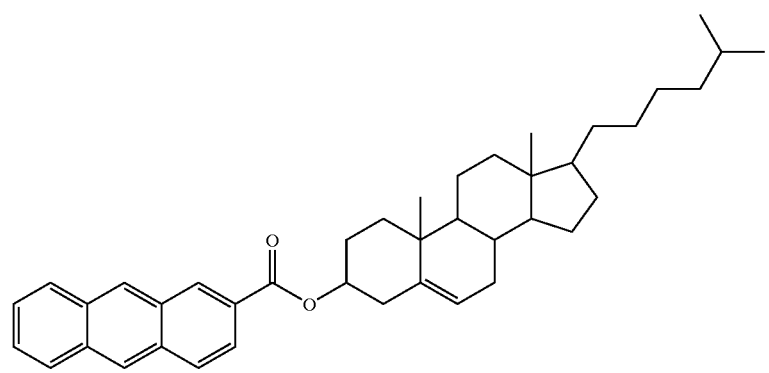

-continued
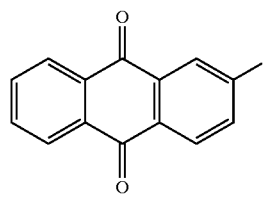
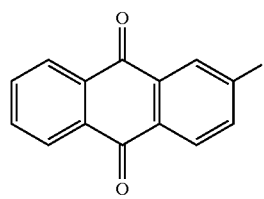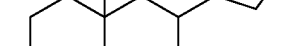
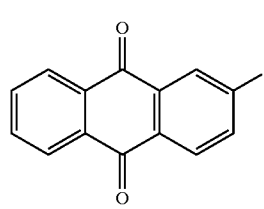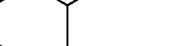
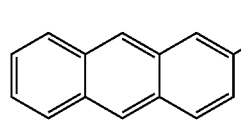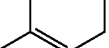

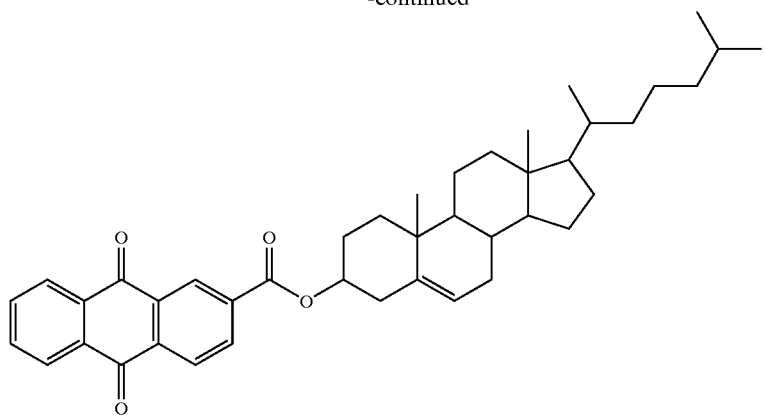
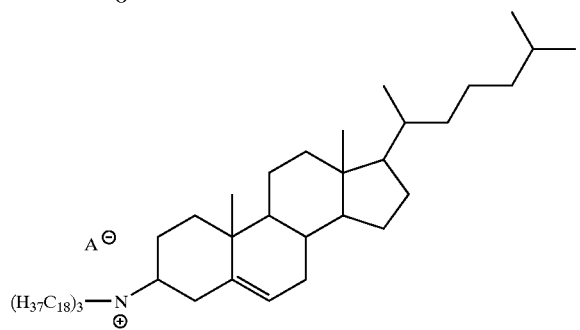
wherein A is Cl⁻, Br⁻, I⁻, ClO$_4^-$, or a mixture thereof,
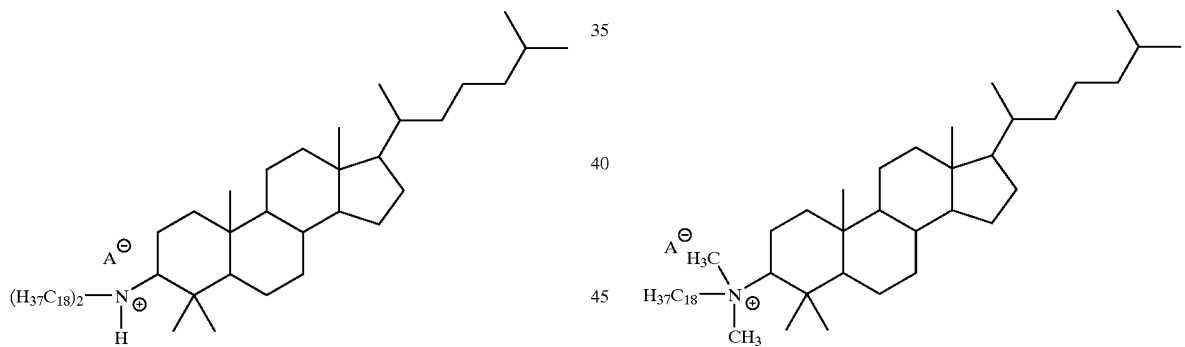
wherein A is Cl⁻, Br⁻, I⁻, ClO$_4^-$, or a mixture thereof,
wherein A is Cl⁻, Br⁻, I⁻, ClO$_4^-$, or a mixture thereof,
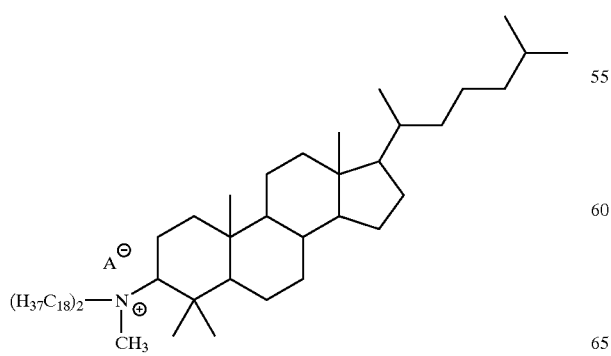

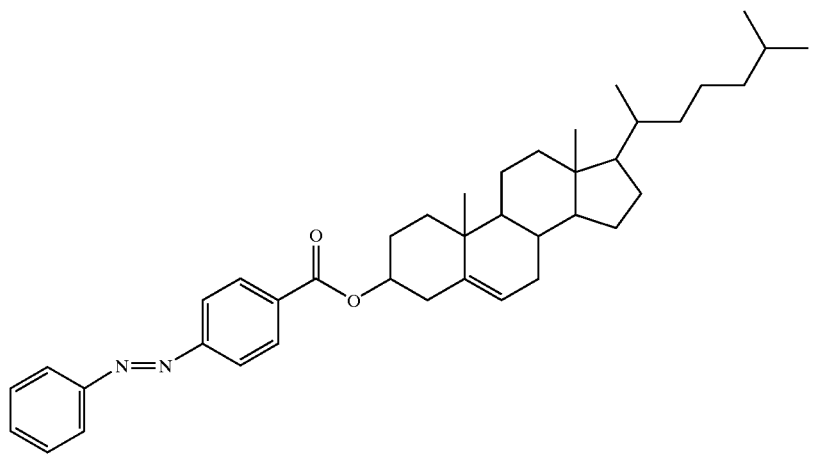
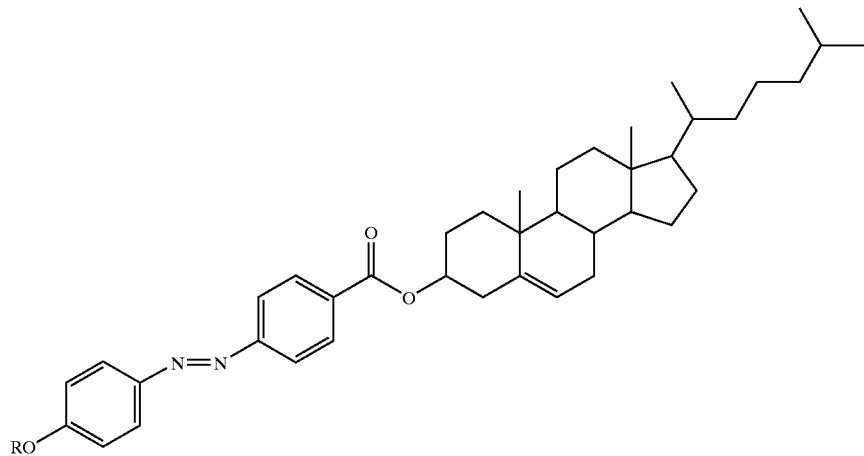
wherein R is a linear or branched alkyl group with from 1 to about 18 carbon atoms,
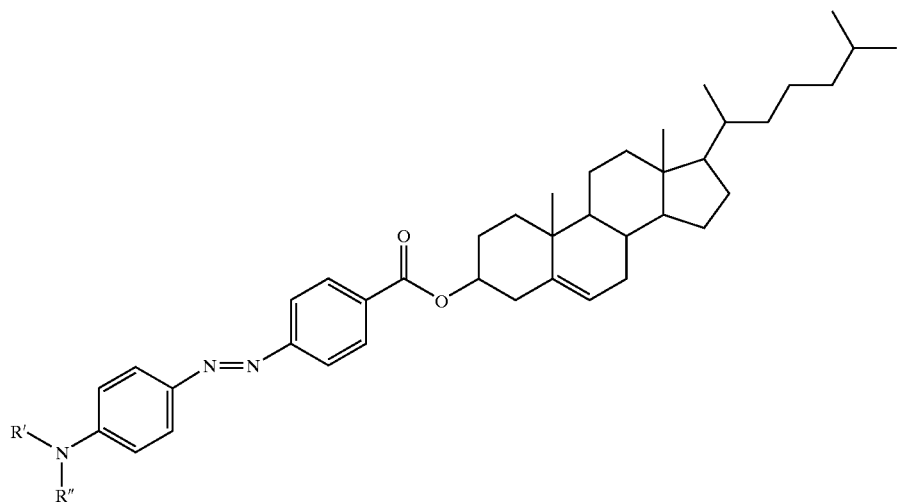

wherein R' and R" each, independently of the other, is a linear or branched alkyl group with from 1 to about 18 carbon atoms,
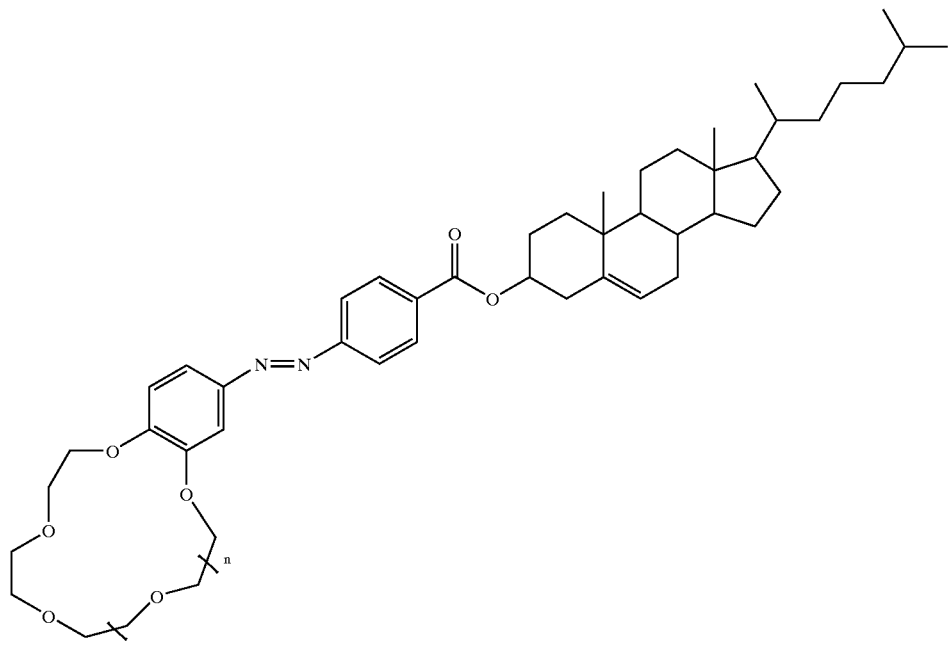
wherein n is an integer of from 1 to about 4,
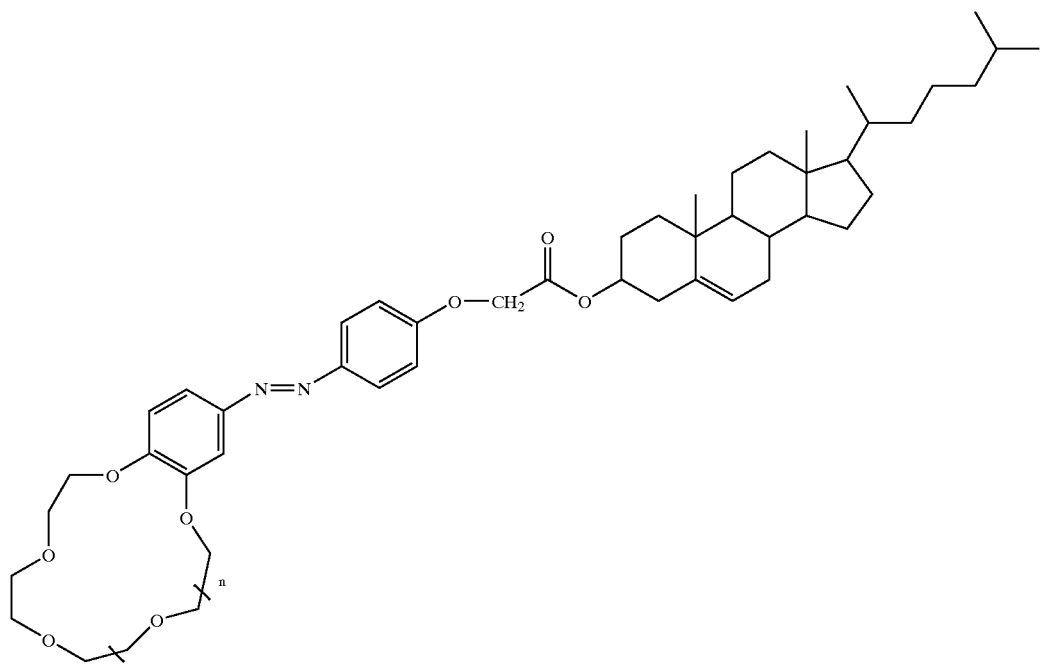

wherein n is an integer of from 1 to about 4,

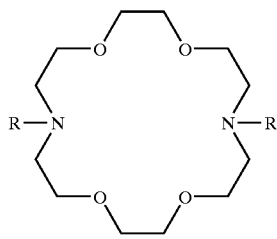

wherein each R is

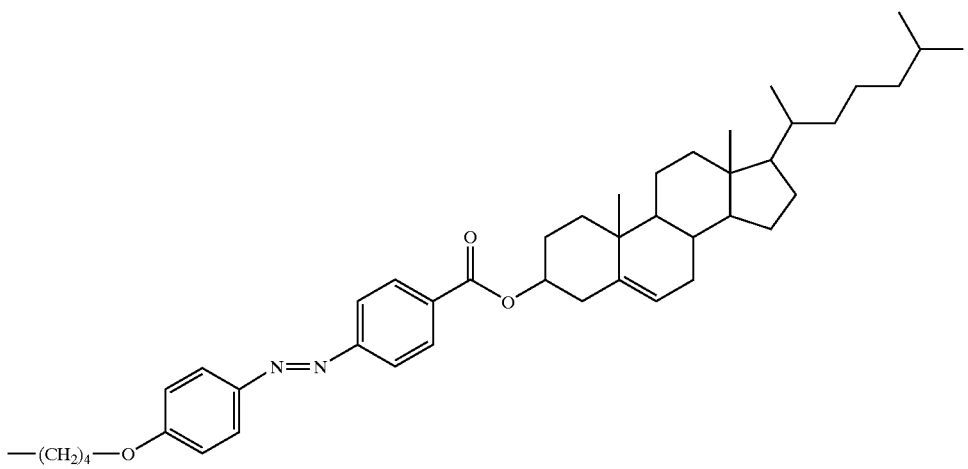

and the like, as well as mixtures thereof. Materials of this class can be prepared by any desired or effective method, such as those disclosed in, for example, Murata et al, *J. Am. Chem. Soc.*, Vol. 116, No 15, pp. 6664–6676 (1994); A. Ikeda et al., *Rep. Asahi Glass Found. Ind. Technol.*, Vol. 61, p. 115, (1992); and Jung et al., *J. Am. Chem. Soc.*, Vol. 122, pp. 8648–8653 (2000), the disclosures of each of which are totally incorporated herein by reference.

Another example of a suitable class of organic gelators is that of partially fluorinated high molecular weight alkanes. By "high molecular weight" is generally meant a molecular weight of at least about 400 grams per mole, and in some instances molecular weights of about 800 grams per mole, 1,500 grams per mole, or the like, although the molecular weight can be outside of these ranges. Suitable partially fluorinated high molecular weight alkanes include those of the general formula $F(CF_2)_n(CH_2)_mH$ wherein n is an integer representing the number of repeat —$CF_2$— units, in one embodiment at least about 6, in another embodiment at least about 8, and in yet another embodiment at least about 10, and in one embodiment no more than about 24, in another embodiment no more than about 16, and in yet another embodiment no more than about 12, although the value of n can be outside of these ranges, and wherein m is an integer representing the number of repeat —$CH_2$— units, in one embodiment at least about 6, in another embodiment at least about 8, and in yet another embodiment at least about 10, and in one embodiment no more than about 20, in another embodiment no more than about 18, and in yet another embodiment no more than about 12, although the value of n can be outside of these ranges. In one specific embodiment, n is about 12 and m is from about 8 to about 20. In another specific embodiment, m is about 12 and n is from about 8 to about 20. These materials can be block copolymers, random copolymers, or alternating copolymers. Some specific examples of suitable partially fluorinated high molecular weight alkanes include (but are not limited to) those of the formulae $F(CF_2)_8(CH_2)_{12}H$ $F(CF_2)_9(CH_2)_{12}H$ $F(CF_2)_{10}(CH_2)_{12}H$ $F(CF_2)_{11}(CH_2)_{12}H$ $F(CF_2)_{12}(CH_2)_{12}H$ $F(CF_2)_{13}(CH_2)_{12}H$ $F(CF_2)_{14}(CH_2)_{12}H$ $F(CF_2)_{15}(CH_2)_{12}H$ $F(CF_2)_{16}(CH_2)_{12}H$ $F(CF_2)_{17}(CH_2)_{12}H$ $F(CF_2)_{18}(CH_2)_{12}H$ $F(CF_2)_{19}(CH_2)_{12}H$ $F(CF_2)_{20}(CH_2)_{12}H$ $F(CF_2)_{12}(CH_2)_8H$ $F(CF_2)_{12}(CH_2)_9H$ $F(CF_2)_{12}(CH_2)_{10}H$ $F(CF_2)_{12}(CH_2)_{11}H$ $F(CF_2)_{12}(CH_2)_{12}H$ $F(CF_2)_{12}(CH_2)_{13}H$ $F(CF_2)_{12}(CH_2)_{14}H$ $F(CF_2)_{12}(CH_2)_{15}H$ $F(CF_2)_{12}(CH_2)_{16}H$ $F(CF_2)_{12}(CH_2)_{17}H$ $F(CF_2)_{12}(CH_2)_{18}H$

F(CF$_2$)$_{12}$(CH$_2$)$_{19}$H

F(CF$_2$)$_{12}$(CH$_2$)$_{20}$H and the like, as well as mixtures thereof. In specific embodiments, gelators of this class are present in the ink compositions of the present invention in amounts of at least about 10 percent by weight, although lesser amounts are also permissible. Materials of this class can be prepared by any desired or effective method, such as those disclosed in, for example, Rabolt et al., *Macromolecules*, Vol.17, p.2786 (1984); Twieg et al., *Macromolecules*, Vol.18, p.1361 (1985), the disclosures of each of which are totally incorporated herein by reference.

Another example of a suitable class of organic gelators is that of high molecular weight alkanes with exactly one hetero atom. By "high molecular weight" is meant containing at least about 10 carbon atoms, and in some instances 14 carbon atoms or more. By "exactly one hetero atom" is meant compounds having one and only one hetero atom (i.e., an atom other than carbon or hydrogen) covalently bonded thereto. A counterion is not considered a hetero atom for purposes of this definition; for example, if the compound is a quaternary ammonium compound having one nitrogen atom, the anion associated with the positively charged nitrogen atom is not considered a hetero atom for purposes of this definition, and the compound is considered to have exactly one hetero atom. Examples of this class of materials include those of the general formulae

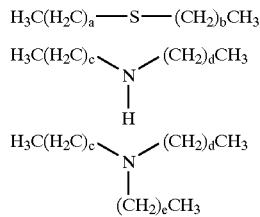

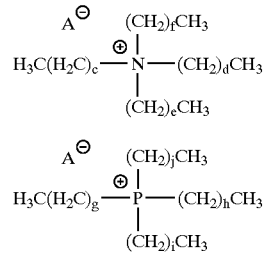

wherein a, b, c, d, e, f, g, h, i, and j each, independently of each other, are integers representing numbers of repeat —CH$_2$— units, and being in one embodiment at least about 1, in another embodiment at least about 8, and in yet another embodiment at least about 14, and being in one embodiment no more than about 30, in another embodiment no more than about 20, and in yet another embodiment no more than about 18, although the values of a, b, c, d, e, f, g, h, i, and j can be outside of these ranges, provided that at least one of a, b, c, d, e, f, g, h, i, and j is equal to at least about 8, and wherein A is an anion. In a specific embodiment, the values of a, b, c, d, e, f, g, h, i, and j are from about 6 to about 17. Any desired or suitable anion can be employed, such as Cl$^-$, Br$^-$, I$^-$, HSO$_4^-$, HSO$_3^-$, SO$_4^{2-}$, SO$_3^{2-}$, CH$_3$SO$_3^-$, CH$_3$C$_6$H$_4$SO$_3^-$, NO$_3^-$, HCOO$^-$, CH$_3$COO$^-$, H$_2$PO$_4^-$, HPO$_4^{2-}$, SCN$^-$, BF$_4^-$, ClO$_4^-$, SSO$_3^-$, PF$_6^-$, SbCl$_6^-$, or the like, as well as mixtures thereof. In a specific embodiment, the anion is Cl$^-$, Br$^-$, I$^-$, ClO$_4^-$, or a mixture thereof. Some specific examples of suitable high molecular weight alkanes with exactly one hetero atom include (but are not limited to) those of the formulae

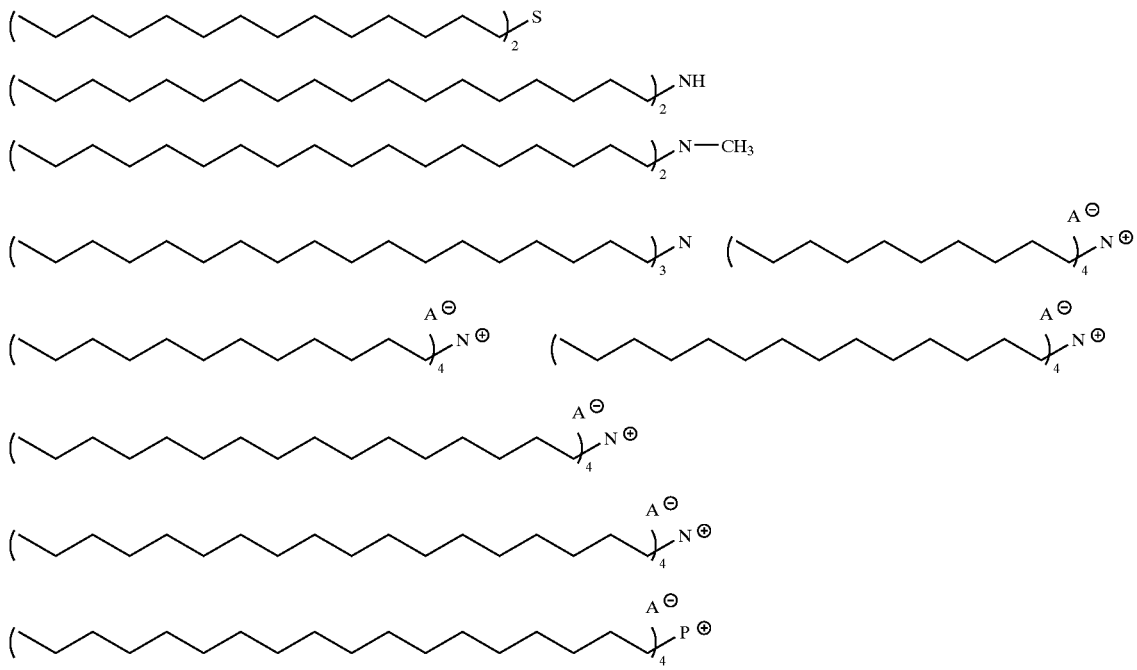

-continued

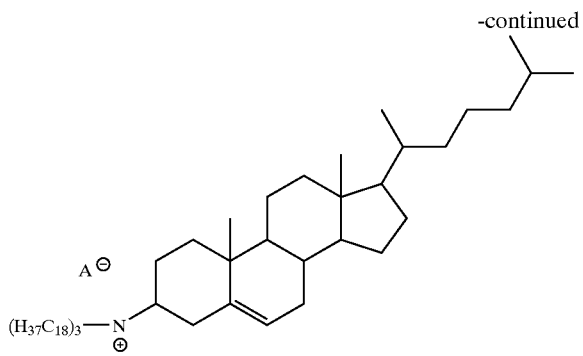

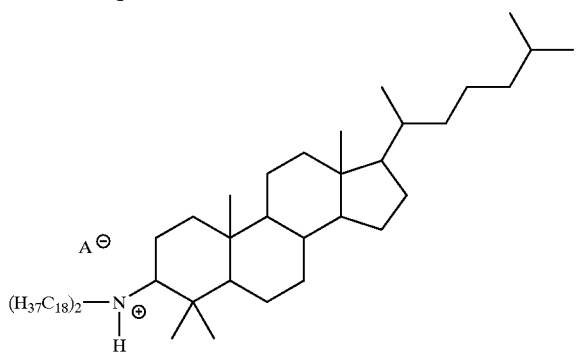

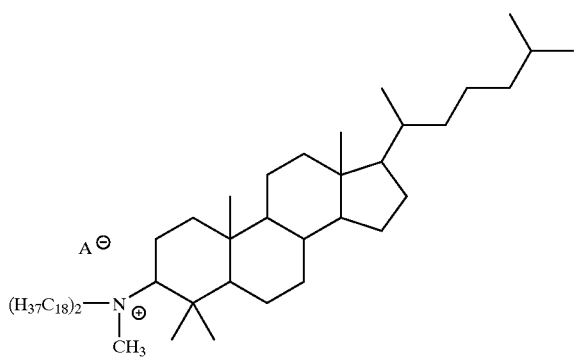

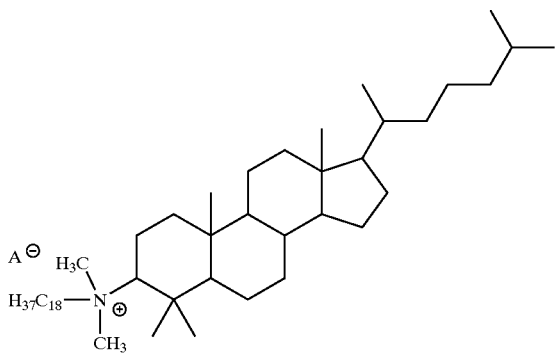

wherein A is Cl⁻, Br⁻, I⁻, $ClO_4^-$, or a mixture thereof, and the like, as well as mixtures thereof. Materials of this class can be prepared by any desired or effective method, such as those disclosed in, for example, R. J. Twieg et al., *Macromolecules*, Vol. 18, p. 1361 (1985); D. J. Abdallah et al., *Chem. Mater.*, Vol. 11, p. 2907 (1999); Ralston et al., *J. Org. Chem.*, Vol. 9, p. 259 (1944); and L. Lu et al., *Chem. Commun.*, 1996, p. 2029, the disclosures of each of which are totally incorporated herein by reference.

Another example of a suitable class of organic gelators is that of chiral tartrate compounds. Examples of this class of materials include those of the general formulae

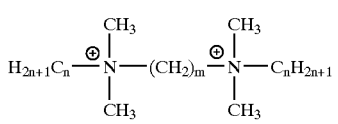

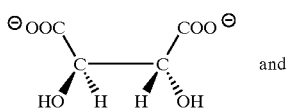

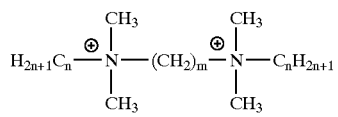

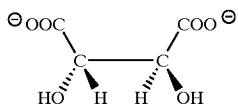

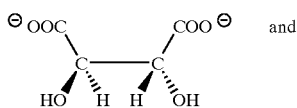

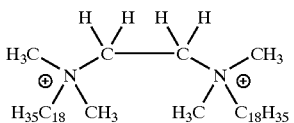

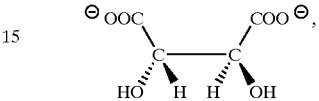

wherein n is an integer in one embodiment of from about 4 to about 20 and in another embodiment of from about 12 to about 18 and m is an integer of from about 2 to about 6, and preferably is 2 or 3, although the values of m and n can be outside of these ranges. Some specific examples of materials of this class are N,N'-dihexadecyl-N,N,N',N'-tetramethyl-1,2-ethanediammonium-L-tartrate and N,N'-dihexadecyl-N,N,N',N'-tetramethyl-1,2-ethanediammonium-D-tartrate, of the formulae

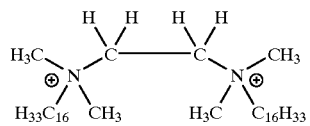

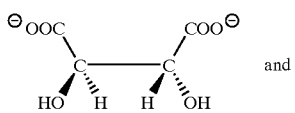

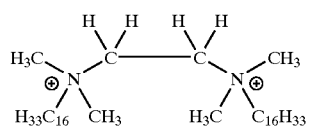

respectively, N,N'-dioctadecyl-N,N,N',N'-tetramethyl-1,2-ethanediammonium-L-tartrate and N,N'-dioctadecyl-N,N,N',N'-tetramethyl-1,2-ethanediammonium-D-tartrate, of the formulae

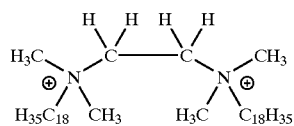

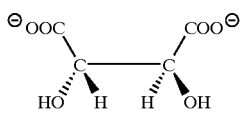

respectively, and the like. Materials of this class can be prepared by any desired or effective method, such as those disclosed in, for example, *J. Prakt. Chem.*, Vol. 327 (3), pp. 383–98 (1985); V. J. Wotring et al., *Analytical Chemistry*, Vol. 62, No. 14, pp. 1506–1510 (1990); and Tabushi et al., *J. Am. Chem. Soc.*, Vol. 103, pp. 6152–6157 (1981), the disclosures of each of which are totally incorporated herein by reference.

Another example of a suitable class of organic gelators is that of chiral butenolide-based compounds. Examples of this class of materials include those of the general formula

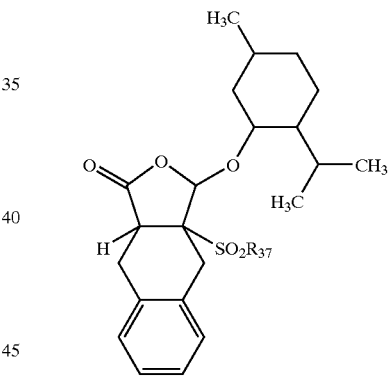

wherein $R_{37}$ is

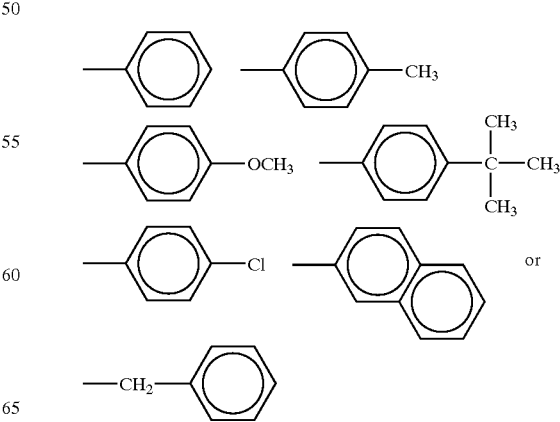

These chiral materials exist in various stereoisomeric forms, such as the following:
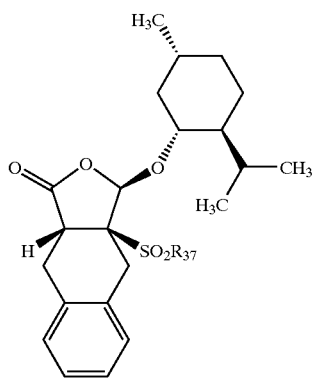
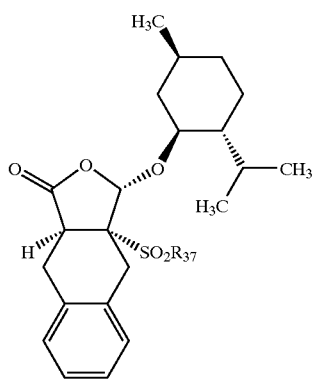
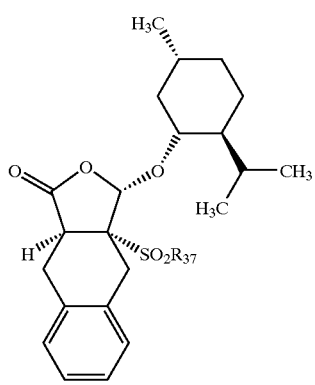
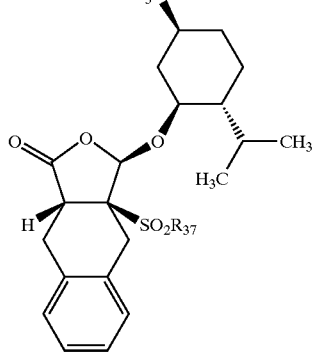
Some specific examples of suitable chiral butenolide-based compounds include (but are not limited to) those of the formulae
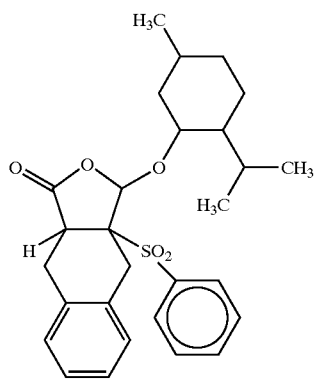
which has the following stereoisomers:
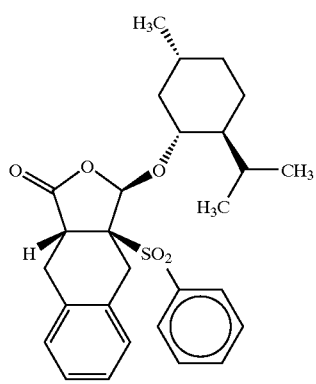
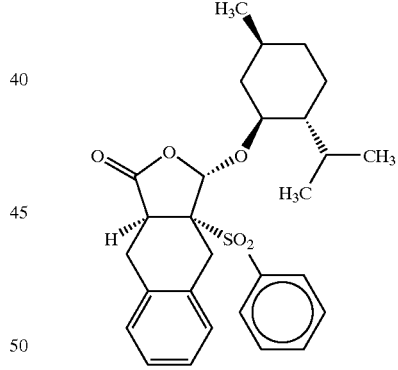
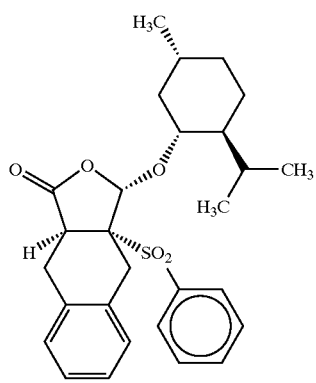

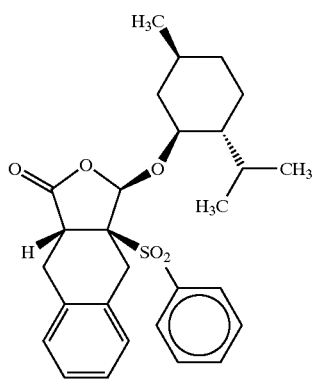
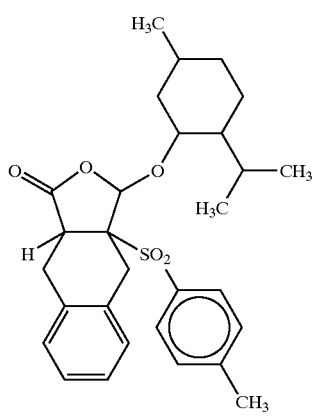
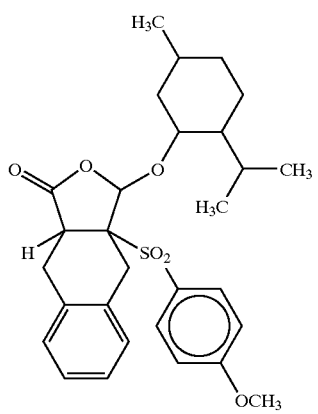
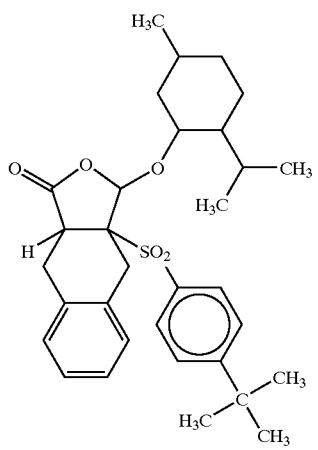
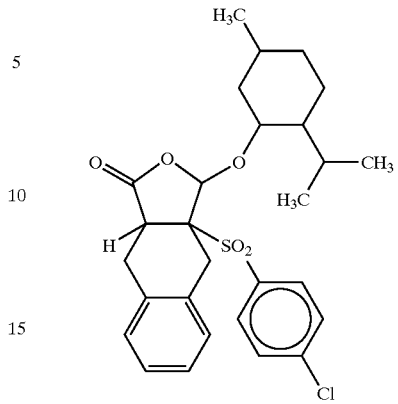
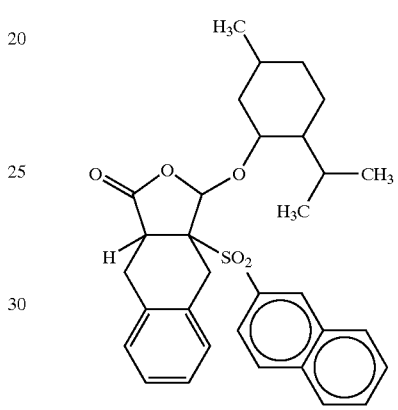
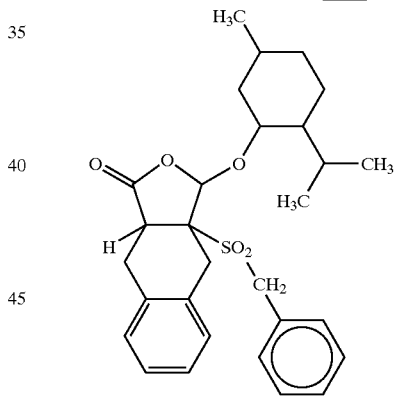

and the like, as well as mixtures thereof. Materials of this class can be prepared by any desired or effective method, such as those disclosed in, for example, "Making it All Stick Together: the Gelation of Organic Liquids by Small Organic Molecules, F. Schoonbeek, Doctoral Thesis, U. of Groningen, Netherlands, April 2001, chap. 2.; B. L. Feringa et al., *J. Org. Chem.*, Vol. 53, p. 1125 (1988); J. C. DeJong et al., *Tetrahedron Lett.*, Vol. 30, p. 7239 (1989); C. S. Snijder et al., *Chem. Eur. J.*, Vol. 1, No. 9, pp. 594–597 (1995); and J. C. DeJong, Ph.D. thesis, University of Groningen, The Netherlands, 1991, the disclosures of each of which are totally incorporated herein by reference.

Another example of a suitable class of organic gelators is that of bis-urea compounds, including cyclic and noncyclic bis-urea compounds. Examples of this class of materials include those of the general formulae

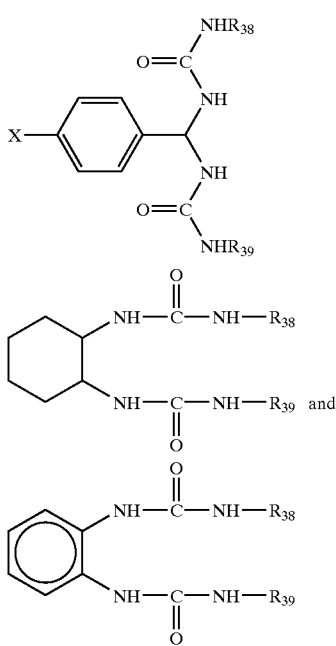

wherein X is a hydrogen atom, a halogen atom (such as fluorine, chlorine, bromine, or iodine), a nitro group (—NO$_2$), an alkoxy group (such as those of the formula —OR$_{90}$), an amino group (such as those of the formula —NR$_{91}$R$_{92}$), or the like, and wherein R$_{38}$, R$_{39}$, R$_{90}$, R$_{91}$, and R$_{92}$ each, independently of the other, can be (but is not limited to) a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the aryl portion or the alkyl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the aryl portion or the alkyl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like. In a specific embodiment, R$_{38}$ is the same as R$_{39}$. Some specific examples of suitable bis-urea compounds include (but are not limited to) those of the formulae

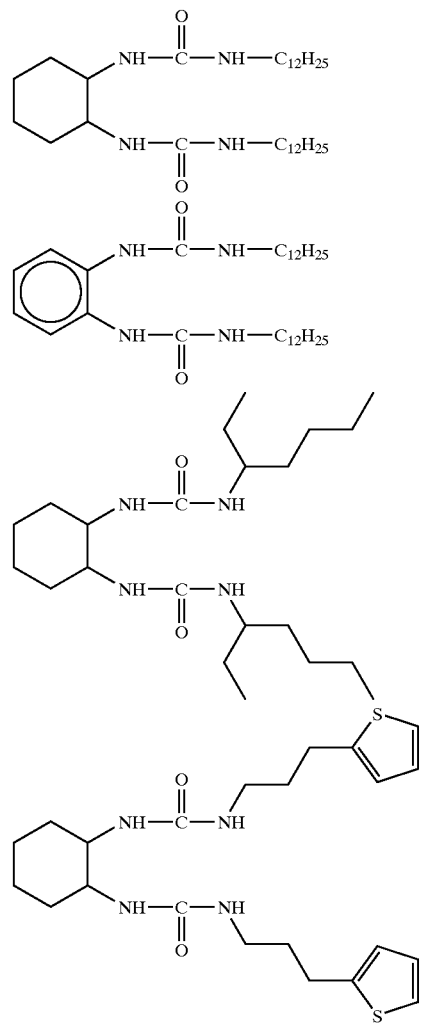

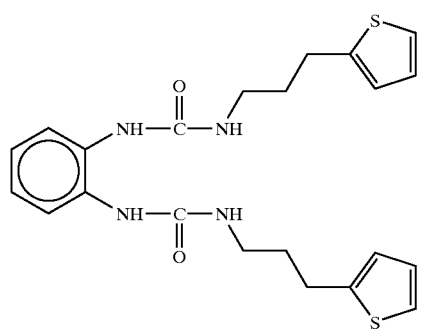
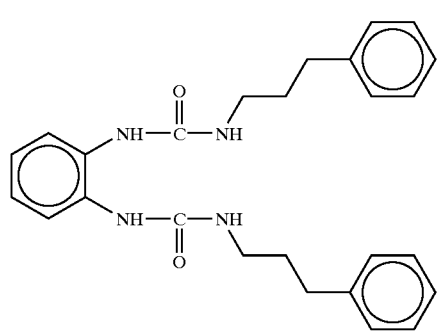
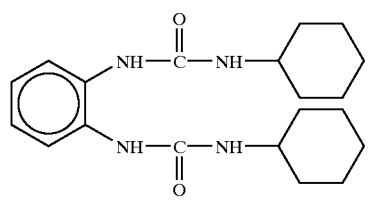
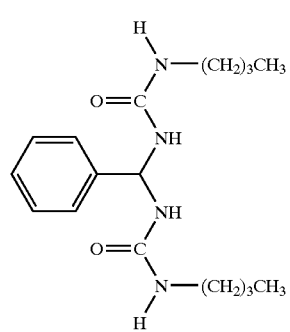
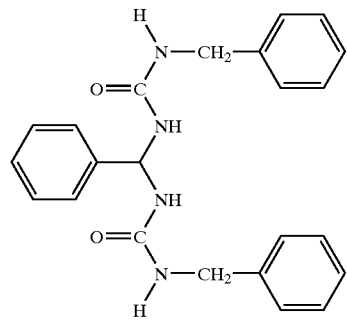
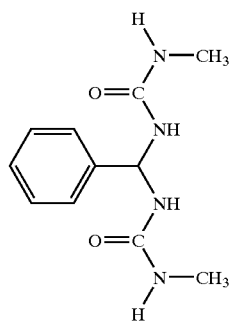
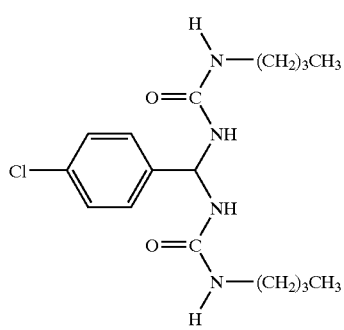
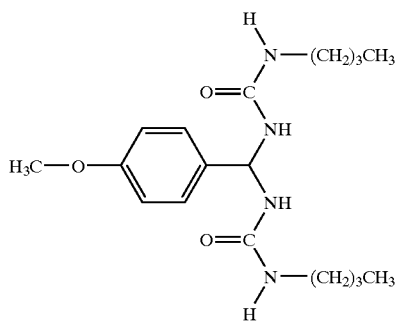
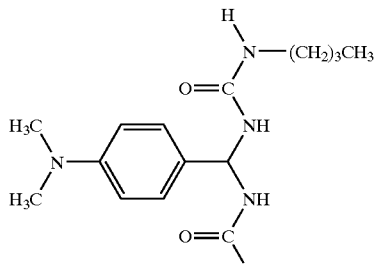
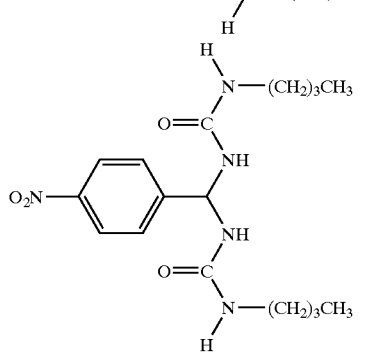

and the like, as well as mixtures thereof. Materials of this class can be prepared by any desired or effective method, such as those disclosed in, for example, U. Zehavi et al., *J. Org. Chem.*, Vol. 26, pp. 1097–1101 (1961); "Making it All Stick Together: the Gelation of Organic Liquids by Small Organic Molecules," F. Schoonbeek, Doctoral Thesis, U. of Groningen, Netherlands, April 2001, chapters 3 and 4; and J. March, *Advanced Organic Chemistry*, 4$^{th}$ Edition, pp. 903 and 1091–1092, Wiley Interscience (New York 1992), the disclosures of each of which are totally incorporated herein by reference.

Another example of a suitable class of organic gelators is that of guanines. Examples of this class of materials include those of the general formulae

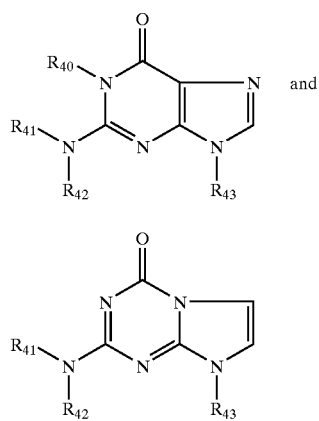

wherein, provided that in compound I at least one of $R_{40}$, $R_{41}$, $R_{42}$, and $R_{43}$ is hydrogen and in compound II at least one of $R_{41}$, $R_{42}$, and $R_{43}$ is hydrogen, $R_{40}$, $R_{41}$, $R_{42}$, and $R_{43}$ each, independently of the others, can be (but is not limited to) a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the aryl portion or the alkyl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an alkylaryl group (including unsubstituted and substituted alkylaryl groups, and wherein hetero atoms, such as oxygen, nitrogen, sulfur, silicon, phosphorus, and the like either may or may not be present in either or both of the aryl portion or the alkyl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like. Some specific examples of suitable guanine compounds include (but are not limited to) those of the formulae

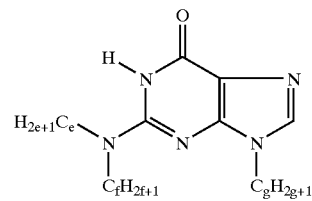

wherein e, f, and g each, independently of the others, are integers of from about 5 to about 22,

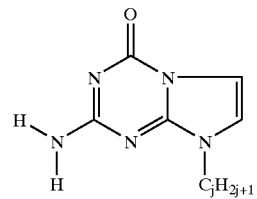

wherein j is an integer of from about 5 to about 22,

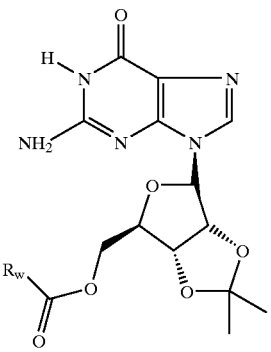

wherein $R_w$ is an alkyl group, in one embodiment with from 1 to about 20 carbon atoms, and in another embodiment with from about 2 to about 12 carbon atoms, or an aryl group having a para-substituent which is an alkyl group or an alkoxy group, in one embodiment with from 1 to about 20 carbon atoms, such as

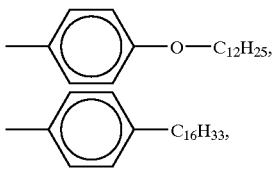

or the like,

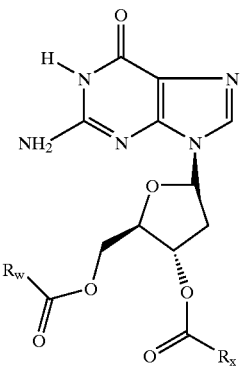

wherein $R_w$ and $R_x$ each, independently of the other, is an alkyl group, in one embodiment with from 1 to about 20 carbon atoms, and in another embodiment with from about 2 to about 12 carbon atoms, or an aryl group having a para-substituent which is an alkyl group or an alkoxy group, in one embodiment with from 1 to about 20 carbon atoms, such as

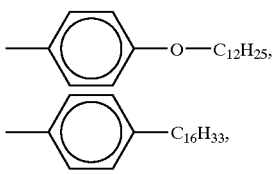

or the like, and the like. Materials of this class can be prepared by any desired or effective method, such as those disclosed in, for example, PCT Patent Publication WO/9011283; Japanese Patent Publication JP 62181279; T. Wada et al., "A New Boranophosphorylation Reaction for the Synthesis of Deoxyribonucleoside Boranophosphates," Tetrahedron Letters, Vol. 43, No. 23, pp. 4137–4140 (2002); R. Schirrmacher et al., "Dimethylpyridin-4-ylamine-catalysed alcoholysis of 2-amino-N,N,N-trimethyl-9H-purine-6-ylammonium chloride: An effective route to O6-substituted guanine derivatives from alcohols with poor nucleophilicity," Synthesis, Vol. 4, pp. 538–542 (2002); Z. Situ, "Synthesis of Tricyclic Derivatives of Guanine Analogue Catalyzed by KF—$Al_2O_3$," Huaxue Shiji, Vol. 24, No. 1, p. 57 (2002); Korean Patent 2000003081 (Korean Patent Application KR 1998–24185); S. Bailey et al., "Synthesis and Antiviral Activity of 9-Alkoxypurines: New 9-(Hydroxyalkoxy) Derivatives of Guanine and 8-Methylguanine," Antiviral Chem. Chemother., Vol. 5, No. 1, pp. 21–33 (1994); Japanese Patent Publication JP 06157529; Japanese Patent Publication JP 3217541; M. R. Harnden et al., "Synthesis, Oral Bioavailability and In Vivo Activity of Acetal Derivatives of the Selective Antiherpesvirus Agent 9-(3-Hydroxypropoxy)Guanine (BRL44385)," Antiviral Chem. Chemother., Vol. 5, No. 3, pp. 147–54 (1994); Spanish Patent Publication ES 2047457; B. K. Bhattacharya et al., "Synthesis of Certain N- and C-alkyl Purine Analogs," J. Heterocycl. Chem., Vol. 30, No. 5, pp. 1341–9 (1993); Polish Patent Publication PL 148969; PCT Patent Publication WO/9011283; Japanese Patent Publication JP 62181279; and T. Giorgi et al., "Gel-like lyomesophases formed in organic solvents by self-assembled guanine ribbons," Chemistry—A European Journal (2002), 8(9), 2143–2152 and references cited therein, the disclosures of each of which are totally incorporated herein by reference.

Another example of a suitable class of organic gelators is that of barbiturates. Examples of this class of materials include those of the general formula

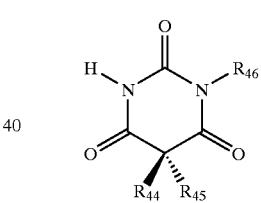

wherein $R_{44}$, $R_{45}$, and $R_{46}$ each, independently of the others, can be (but is not limited to) a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the aryl portion or the alkyl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the aryl portion or the alkyl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like. Some specific examples of suitable barbiturate compounds include (but are not limited to) those of the formulae

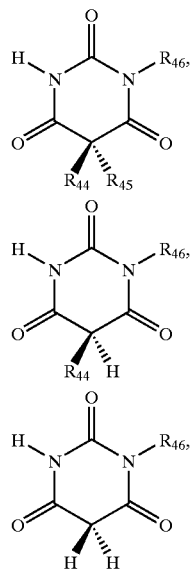
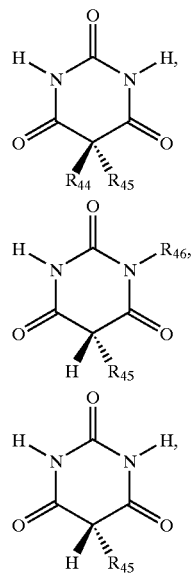
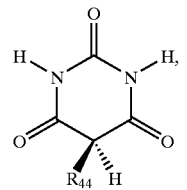

wherein $R_{44}$, $R_{45}$, and $R_{46}$ each, independently of the others, is an alkyl group with from 1 to about 12 carbon atoms,

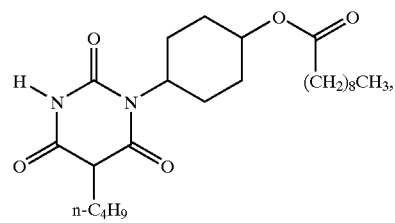
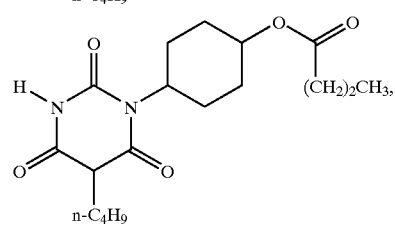
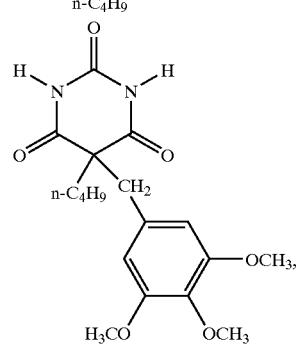
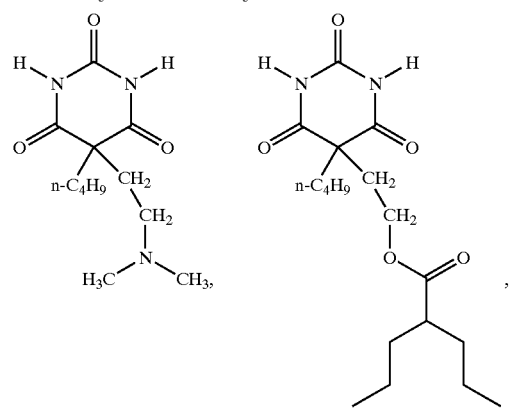

and the like. Materials of this class can be prepared by any desired or effective method, such as those disclosed in, for example, S.-K. Chang and A. D. Hamilton, *J. Am. Chem. Soc.*, Vol. 110, pp. 1318–1319 (1988); S. Senda et al., Gifu Coll. Pharm., Gifu, Japan. *Yakugaku Zasshi*, Vol. 89, No. 2, pp. 254–259 (1969); B. Gluncic et al, *Acta Pharm. Jugosl.*, Vol. 36, No. 4, pp. 393–404 (1986); Canadian Patent Publication CA 941377; and M. Klein, Recent Dev. Mass Spectrom. Biochem. Med., [Proc. Int. Symp.], 4$^{th}$ (1978), Meeting Date 1977, 1, 471–82, the disclosures of each of which are totally incorporated herein by reference.

Another example of a suitable class of organic gelators is that of oxamide compounds. Examples of this class of materials include those of the general formula

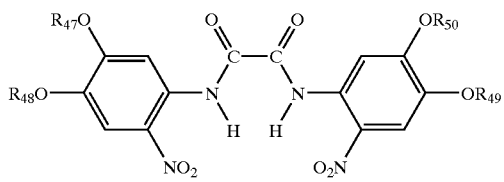

wherein $R_{47}$, $R_{48}$, $R_{49}$, and $R_{50}$ each, independently of the others, can be (but is not limited to) a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 3 carbon atoms, and in yet another embodiment with at least about 9 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 4 carbon atoms, in another embodiment with at least about 5 carbon atoms, and in yet another embodiment with at least about 6 carbon atoms, and in one embodiment with no more than about 24 carbon atoms, in another embodiment with no more than about 18 carbon atoms, and in yet another embodiment with no more than about 10 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the aryl portion or the alkyl portion of the arylalkyl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the aryl portion or the alkyl portion of the alkylaryl group), in one embodiment with at least 5 carbon atoms, in another embodiment with at least about 9 carbon atoms, and in yet another embodiment with at least about 12 carbon atoms, and in one embodiment with no more than about 30 carbon atoms, in another embodiment with no more than about 20 carbon atoms, and in yet another embodiment with no more than about 14 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like.

Also suitable are macrocyclic oxamides, such as those disclosed in U.S. Pat. No. 5,298,618 (Speranza et al.), the disclosure of which is totally incorporated herein by reference.

Some specific examples of suitable oxamide compounds include (but are not limited to) those of the formulae

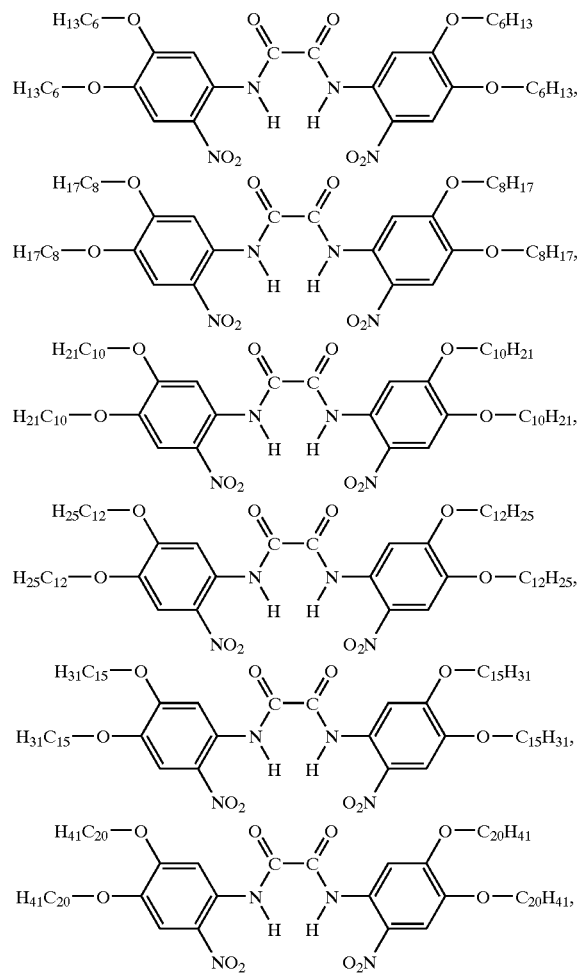

other compounds of the formula

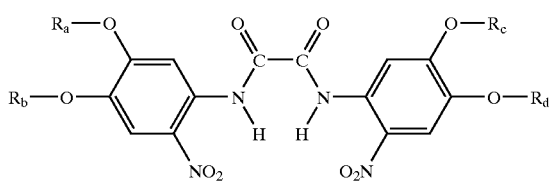

wherein $R_a$, $R_b$, $R_c$, and $R_d$ each, independently of the others, is hexyl, octyl, decyl, dodecyl, pentadecyl, or eicosyl, provided that $R_a$, $R_b$, $R_c$, and $R_d$ are not all the same, and the like. Materials of this class can be prepared by any desired or effective method, such as those disclosed in, for example, J. Crossley, Maxwell, *Aust. J. Chem.*, Vol. 47, pp. 723–738 (1994), the discloser of which is totally incorporated herein by reference.

Another example of a suitable class of organic gelators is that of ureidopyrimidone compounds. Examples of this class of materials include those of the general formulae

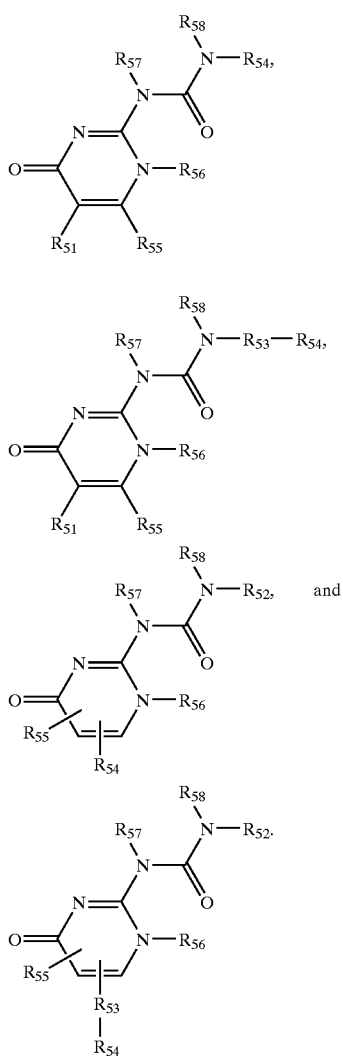

It is to be understood that the above formulae also include compounds wherein more than one ureidopyrimidone group is attached to the $R_{54}$ group, such as those of the formulae

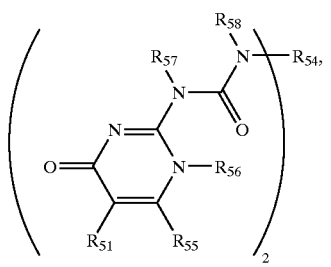

-continued

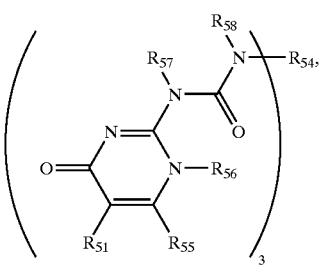

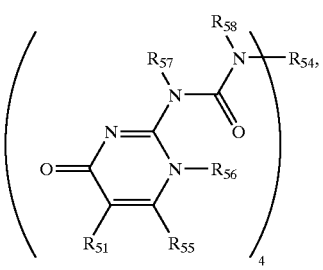

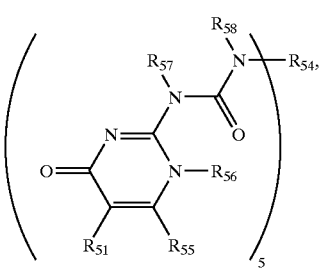

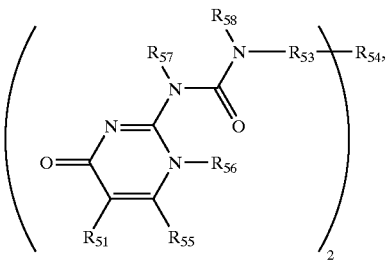

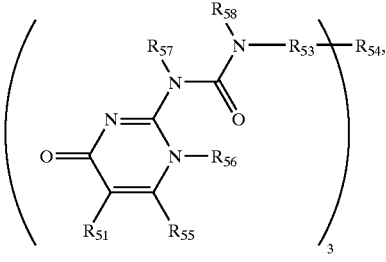

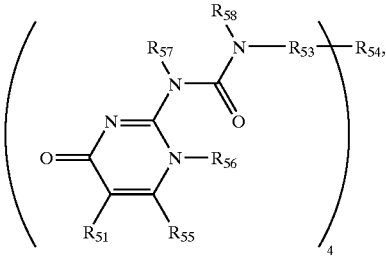

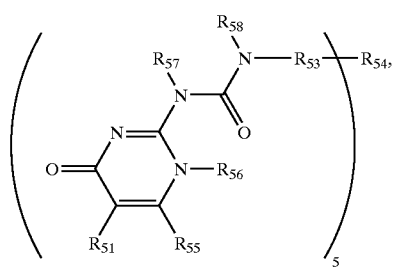
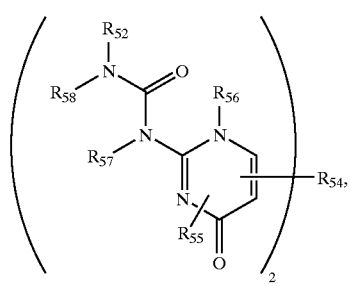
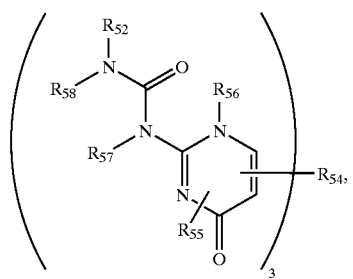
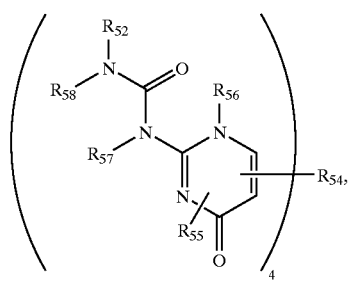
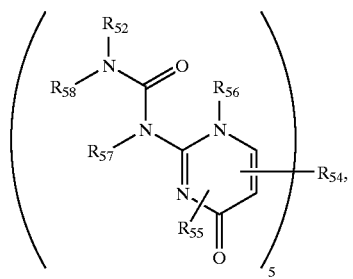
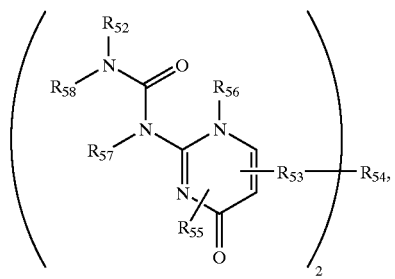

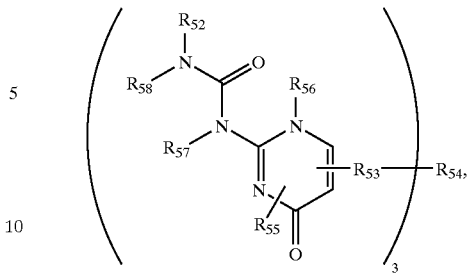
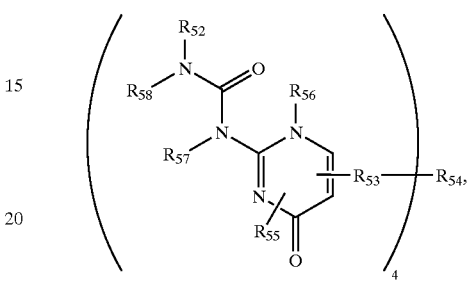
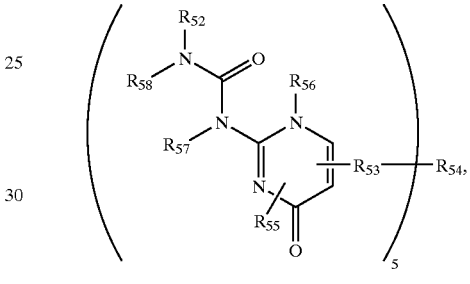

and the like. In these instances, $R_{54}$ is understood to be, instead of monovalent, divalent, trivalent, tetravalent, pentavalent, or the like. In these formulae, provided that at least one of $R_{52}$, $R_{56}$, $R_{57}$, and $R_{58}$ is a hydrogen atom, $R_{51}$, $R_{52}$, $R_{55}$, $R_{56}$, $R_{57}$, and $R_{58}$ each, independently of the other, is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 6 carbon atoms and preferably with from 1 to about 4 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), typically with from 6 to about 10 carbon atoms, although the number of carbon atoms can be outside of this range, an arylalkyl group (including unsubstituted and substituted arylalkyl groups, and wherein hetero atoms, such as oxygen, nitrogen, sulfur, silicon, phosphorus, and the like either may or may not be present in either or both of the aryl portion or the alkyl portion of the arylalkyl group), typically with from 7 to about 12 carbon atoms and preferably with from 7 to about 9 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the aryl portion or the alkyl portion of the alkylaryl group), typically with from 7 to about 12 carbon atoms and preferably with from 7 to about 9 carbon atoms, although the number of carbon atoms can be outside of these ranges, $R_{53}$ is an alkylene group (including linear, branched, saturated, unsaturated, cyclic, unsubstituted, and substituted alkylene groups, and wherein hetero atoms, such as oxygen, nitrogen, sulfur, silicon, phosphorus, and the like either may or may not be present in the alkylene group), typically with from 1 to about 12 carbon atoms and preferably with from 1 to about 6 carbon atoms, although the number of carbon atoms can be outside of these ranges, an arylene group (including unsubstituted and substituted arylene groups, and wherein hetero atoms, such as oxygen, nitrogen, sulfur, silicon, phosphorus, and the like either may or may not be present in the arylene group), typically with from 6 to about 10 carbon atoms, although the number of carbon atoms can be outside of this range, an arylalkylene group (including unsubstituted and substituted arylalkylene groups, and wherein hetero atoms, such as oxygen, nitrogen, sulfur, silicon, phosphorus, and the like either may or may not be present in either or both of the aryl portion or the alkyl portion of the arylalkylene group), typically with from 7 to about 12 carbon atoms and preferably with from 7 to about 9 carbon atoms, although the number of carbon atoms can be outside of these ranges, an alkylarylene group (including unsubstituted and substituted alkylarylene groups, and wherein hetero atoms, such as oxygen, nitrogen, sulfur, silicon, phosphorus, and the like either may or may not be present in either or both of the aryl portion or the alkyl portion of the alkylarylene group), typically with from 7 to about 12 carbon atoms and preferably with from 7 to about 9 carbon atoms, although the number of carbon atoms can be outside of these ranges, an alkyleneoxy group (including linear, branched, saturated, unsaturated, cyclic, unsubstituted, and substituted alkyleneoxy groups, and wherein hetero atoms, such as oxygen, nitrogen, sulfur, silicon, phosphorus, and the like either may or may not be present in the alkyl portion of the alkyleneoxy group), typically with from 1 to about 12 carbon atoms and preferably with from 1 to about 6 carbon atoms, although the number of carbon atoms can be outside of these ranges, an aryleneoxy group (including unsubstituted and substituted aryleneoxy groups, and wherein hetero atoms, such as oxygen, sulfur, nitrogen, silicon, phosphorus, or the like, either may or may not be present in the aryl portion of the aryleneoxy group), typically with from 7 to about 12 carbon atoms and preferably with from 7 to about 9 carbon atoms, although the number of carbon atoms can be outside of these ranges, an arylalkyleneoxy group (including unsubstituted and substituted arylalkyleneoxy groups, and wherein hetero atoms, such as oxygen, sulfur, nitrogen, silicon, phosphorus, or the like, either may or may not be present in either or both of the alkyl portion and the aryl portion of the arylalkyleneoxy group), typically with from 7 to about 12 carbon atoms and preferably with from 7 to about 9 carbon atoms, although the number of carbon atoms can be outside of these ranges, an alkylaryleneoxy group (including unsubstituted and substituted alkylaryleneoxy groups, and wherein hetero atoms, such as oxygen, sulfur, nitrogen, silicon, phosphorus, or the like, either may or may not be present in either or both of the alkyl portion and the aryl portion of the alkylaryleneoxy group), typically with from 7 to about 12 carbon atoms and preferably with from 7 to about 9 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, or a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, and $R_{54}$ is an alkyl or alkylene group (including linear, branched, saturated, unsaturated, cyclic, unsubstituted, and substituted alkyl or alkylene groups, and wherein hetero atoms, such as oxygen, nitrogen, sulfur, silicon, phosphorus, and the like either may or may not be present in the alkyl or alkylene group), typically with from 1 to about 12 carbon atoms and preferably with from 1 to about 6 carbon atoms, although the number of carbon atoms can be outside of these ranges, an aryl or arylene group (including unsubstituted and substituted aryl or arylene groups, and wherein hetero atoms, such as oxygen, nitrogen, sulfur, silicon, phosphorus, and the like either may or may not be present in the aryl or arylene group), typically with from 6 to about 10 carbon atoms, although the number of carbon atoms can be outside of this range, an arylalkyl or arylalkylene group (including unsubstituted and substituted arylalkyl or arylalkylene groups, and wherein hetero atoms, such as oxygen, nitrogen, sulfur, silicon, phosphorus, and the like either may or may not be present in either or both of the aryl portion or the alkyl portion of the arylalkyl or arylalkylene group), typically with from 7 to about 12 carbon atoms and preferably with from 7 to about 9 carbon atoms, although the number of carbon atoms can be outside of these ranges, an alkylaryl or alkylarylene group (including unsubstituted and substituted alkylaryl or alkylarylene groups, and wherein hetero atoms, such as oxygen, nitrogen, sulfur, silicon, phosphorus, and the like either may or may not be present in either or both of the aryl portion or the alkyl portion of the alkylaryl or alkylarylene group), typically with from 7 to about 12 carbon atoms and preferably with from 7 to about 9 carbon atoms, although the number of carbon atoms can be outside of these ranges, an alkoxy or alkyleneoxy group (including linear, branched, saturated, unsaturated, cyclic, unsubstituted, and substituted alkoxy or alkyleneoxy groups, and wherein hetero atoms, such as oxygen, nitrogen, sulfur, silicon, phosphorus, and the like either may or may not be present in the alkyl portion of the alkoxy or alkyleneoxy group), typically with from 1 to about 12 carbon atoms and preferably with from 1 to about 6 carbon atoms, although the number of carbon atoms can be outside of these ranges, an aryloxy or aryleneoxy group (including unsubstituted and substituted aryloxy or aryleneoxy groups, and wherein hetero atoms, such as oxygen, sulfur, nitrogen, silicon, phosphorus, or the like, either may or may not be present in the aryl portion of the aryloxy or aryleneoxy group), typically with from 7 to about 12 carbon atoms and preferably with from 7 to about 9 carbon atoms, although the number of carbon atoms can be outside of these ranges, an arylalkyloxy or arylalkyleneoxy group (including unsubstituted and substituted arylalkyloxy or arylalkyleneoxy groups, and wherein hetero atoms, such as oxygen, sulfur, nitrogen, silicon, phosphorus, or the like, either may or may not be present in either or both of the alkyl portion and the aryl portion of the arylalkyloxy or arylalkyleneoxy group), typically with from 7 to about 12 carbon atoms and preferably with from 7 to about 9 carbon atoms, although the number of carbon atoms can be outside of these ranges, an alkylaryloxy or alkylaryleneoxy group (including unsubstituted and substituted alkylaryloxy or alkylaryleneoxy groups, and wherein hetero atoms, such as oxygen, sulfur, nitrogen, silicon, phosphorus, or the like, either may or may not be present in either or both of the alkyl portion and the aryl portion of the alkylaryloxy or alkylaryleneoxy group), typically with from 7 to about 12 carbon atoms and preferably with from 7 to about 9 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, typically a polyethyleneoxy group or a polypropyleneoxy group, typically with from 2 to about 20 repeat alkyleneoxy units, and preferably with from 2 to about 10 repeat alkyleneoxy units, although the number of repeat alkyleneoxy units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a silyl or silylene group (including unsubstituted and substituted silyl or silylene groups), a siloxane group (including unsubstituted and substituted siloxane groups), a polysilylene group (including unsubstituted and substituted polysilylene groups), typically with from 2 to about 100 repeat silylene units, although the number of repeat silylene units can be outside of this range, or a polysiloxane group (including unsubstituted and substituted polysiloxane groups), typically with from 2 to about 200 repeat siloxane units, although the number of repeat siloxane units can be outside of this range, and wherein the substituents on the substituted alkyl, alkylene, aryl, arylene, alkylaryl, alkylarylene, arylalkyl, arylalkylene, alkoxy, alkyleneoxy, aryloxy, aryleneoxy, arylalkyloxy, arylalkyleneoxy, alkylaryloxy, alkylaryleneoxy, polyalkyleneoxy, polyaryleneoxy, polyarylalkyleneoxy, polyalkylaryleneoxy, silyl, silylene, siloxane, polysilylene, and polysiloxane groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, alkoxy groups wherein the alkyl portion thereof is defined as alkyl is defined for $R_{51}$, aryloxy groups wherein the aryl portion thereof is defined as aryl is defined for $R_{51}$, arylalkyloxy groups wherein the arylalkyl portion thereof is defined as arylalkyl is defined for $R_{51}$, alkylaryloxy groups wherein the alkylaryl portion thereof is defined as alkylaryl is defined for $R_{51}$, polyalkyleneoxy groups, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, polyaryleneoxy groups, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, polyarylalkyleneoxy groups, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, silyl groups, siloxane groups, polysilylene groups, typically with from 2 to about 100 repeat silylene units, although the number of repeat silylene units can be outside of this range, polysiloxane groups, typically with from 2 to about 200 repeat siloxane units, although the number of repeat siloxane units can be outside of this range, mixtures thereof, or the like. Some specific examples of suitable ureidopyrimidone moieties that can be attached to $R_{54}$ include

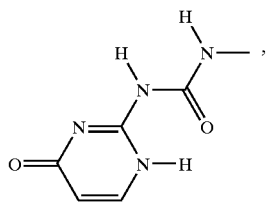

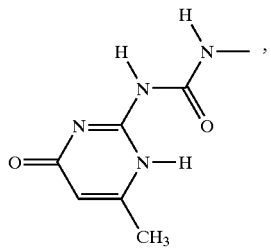

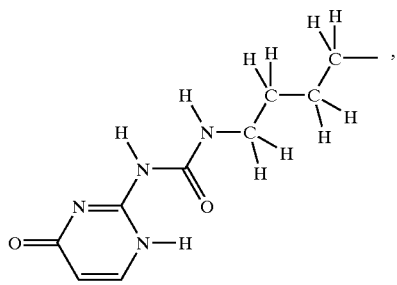

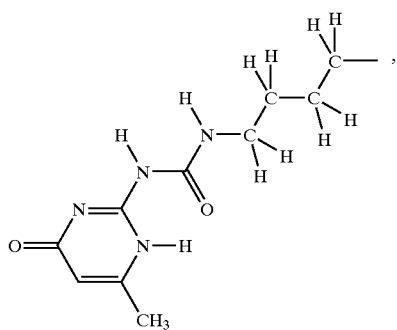

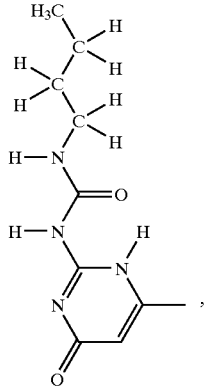

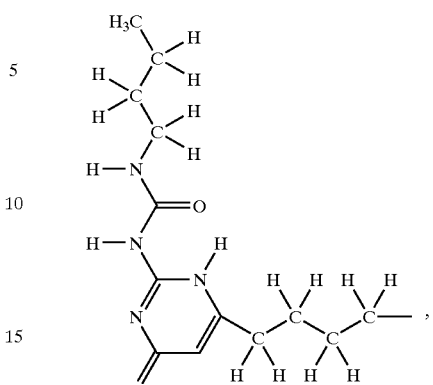

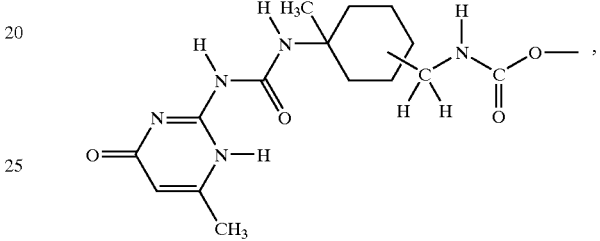

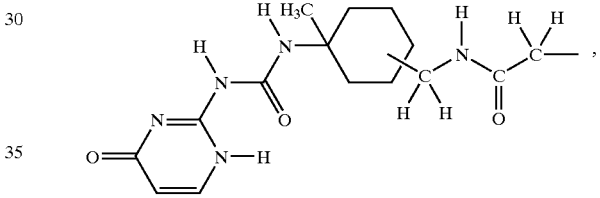

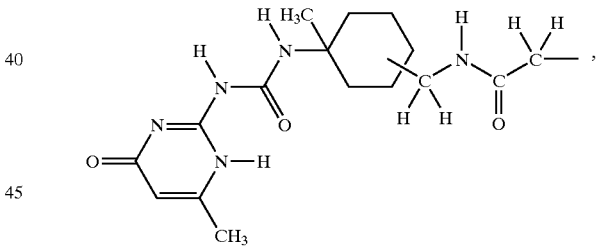

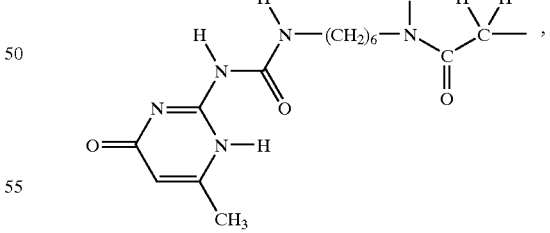

and the like. Some specific examples of suitable $R_{54}$ groups (referred to therein as "W", "X", "Y", and "Z" groups) are disclosed in Copending application U.S. Ser. No. 09/948,958, filed Sep. 7, 2001, the disclosure of which is totally incorporated herein by reference. Some specific examples of suitable ureidopyrimidone compounds include (but are not limited to) those of the formulae

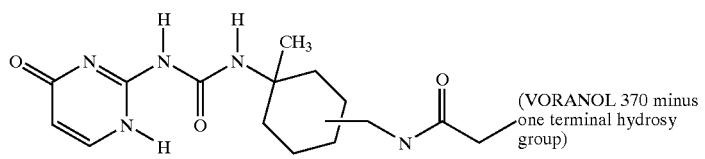
(VORANOL 370 minus one terminal hydrosy group)
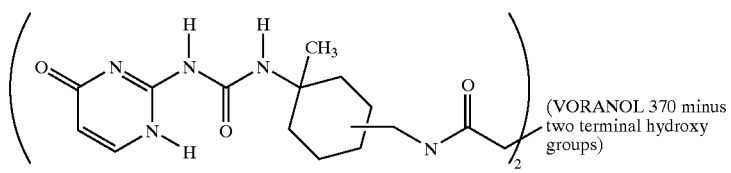
(VORANOL 370 minus two terminal hydroxy groups)
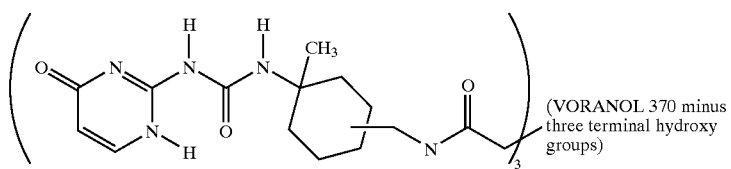
(VORANOL 370 minus three terminal hydroxy groups)
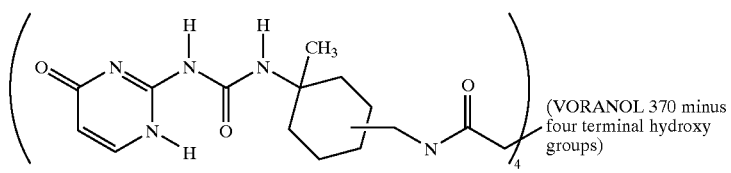
(VORANOL 370 minus four terminal hydroxy groups)
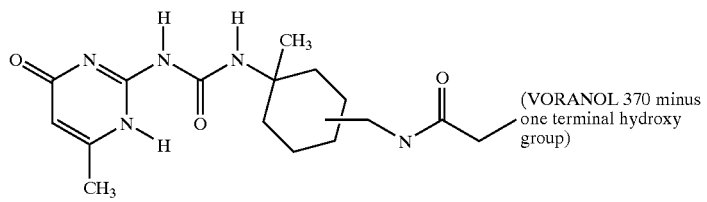
(VORANOL 370 minus one terminal hydroxy group)
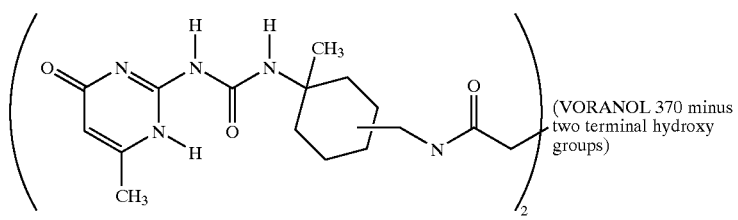
(VORANOL 370 minus two terminal hydroxy groups)
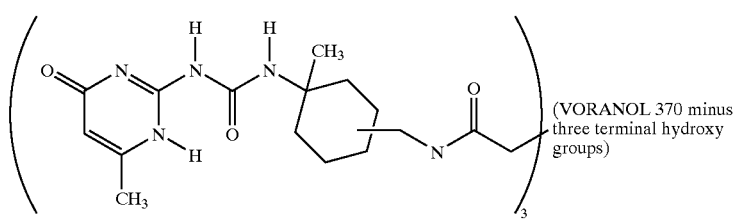
(VORANOL 370 minus three terminal hydroxy groups)
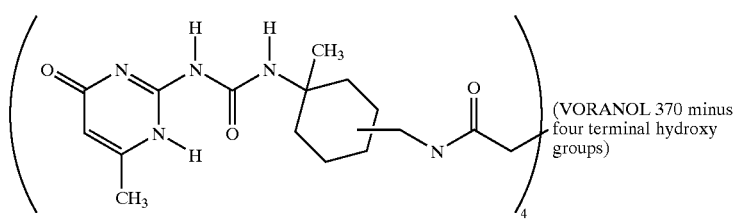
(VORANOL 370 minus four terminal hydroxy groups)

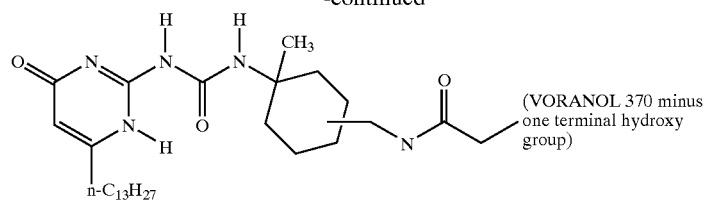
(VORANOL 370 minus one terminal hydroxy group)

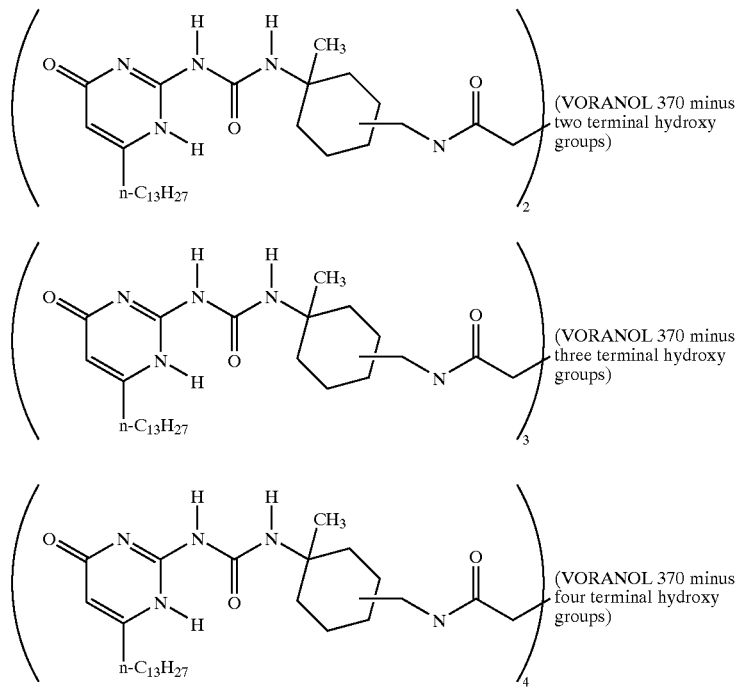

(VORANOL 370 minus two terminal hydroxy groups)

(VORANOL 370 minus three terminal hydroxy groups)

(VORANOL 370 minus four terminal hydroxy groups)

in all of which "VORANOL 370" is

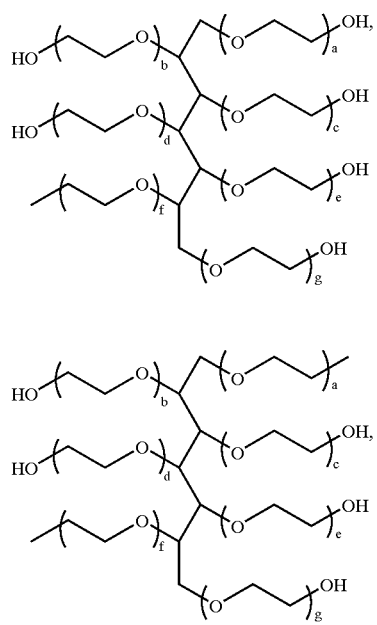

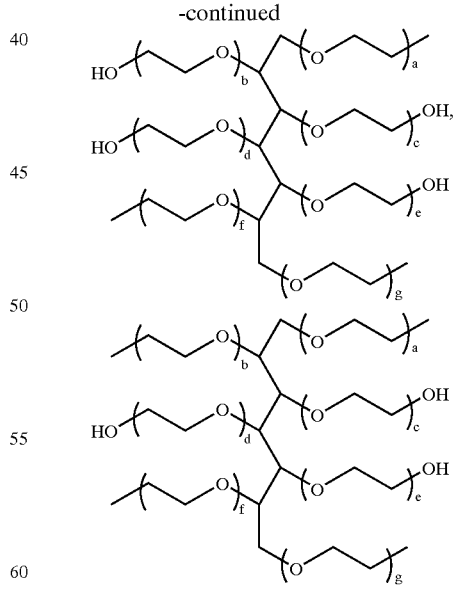

and any other possible mono-, di-, tri-, and tetravalent groups based on this VORANOL® (available from Dow Chemical Co., Midland, Mich.) central group, wherein a, b, c, d, e, f, and g are each integers representing the number of ethylene oxide repeat units and the molecular weight of the starting material (wherein all end groups are terminated by hydroxy groups) is about 1,040,

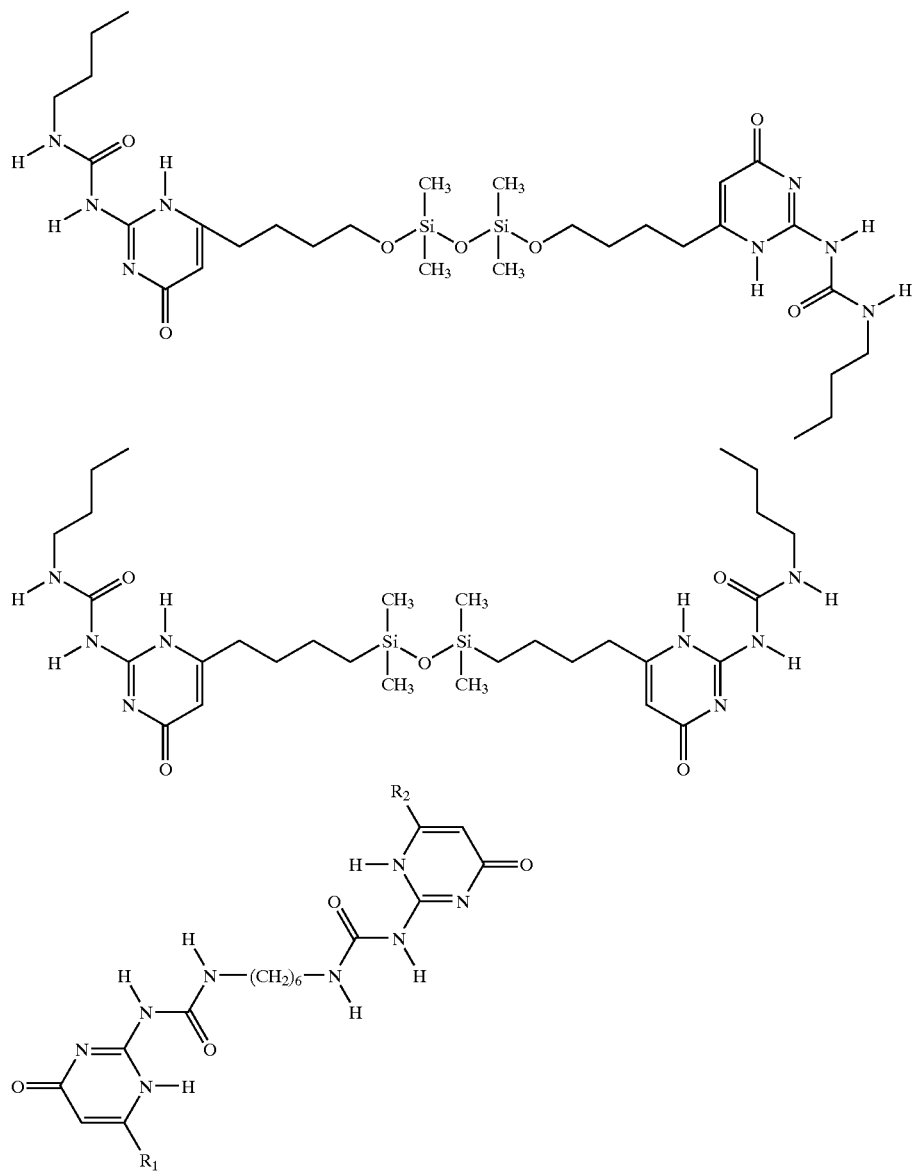

wherein $R_1$ and $R_2$ each, independently of the other, is an alkyl group with from 1 to about 18 carbon atoms,

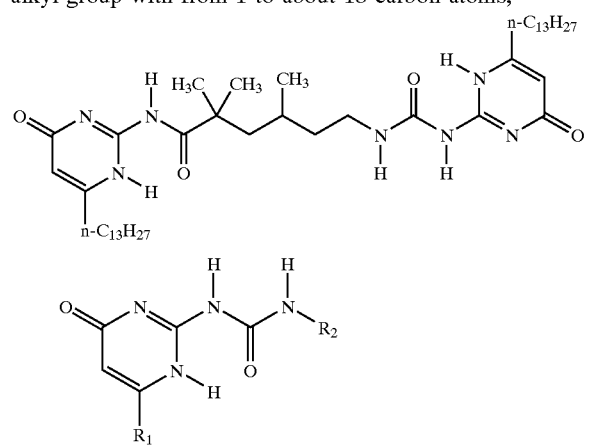

wherein $R_1$ and $R_2$ each, independently of the other, is an alkyl group with from 1 to about 18 carbon atoms, and the like. Materials of this class can be prepared by any desired or effective method, such as those disclosed in, for example, "Reversible Polymers Formed from Self-Complementary Monomers Using Quadruple Hydrogen Bonding," R. P. Sijbesma et al., *Science*, Vol. 278, p. 1601 (1997); "Supramolecular Polymers," R. Dagani, Chemical and Engineering News, p. 4 (December 1997); "Supramolecular Polymers from Linear Telechelic Siloxanes with Quadruple-Hydrogen-Bonded Units," J. H. K. Hirschberg et al., *Macromolecules*, Vol. 32, p. 2696 (1999); "Hydrogen-Bonded Supramolecular Polymer Networks," Ronald F. M. Lange et al., *Journal of Polymer Science*, Part A: *Polymer Chemistry*, Vol. 37, p. 3657 (1999); and "Helical Self-Assembled Polymers from Cooperative Stacking of Hydrogen-Bonded Pairs," J. H. K. Ky Hirschberg et al., *Nature*, Vol. 407, p. 167 (2000), the disclosures of each of which are totally incorporated herein by reference.

Any other desired or effective organic gelator can also be employed in the printing processes of the present invention. For example, compounds of the formulae
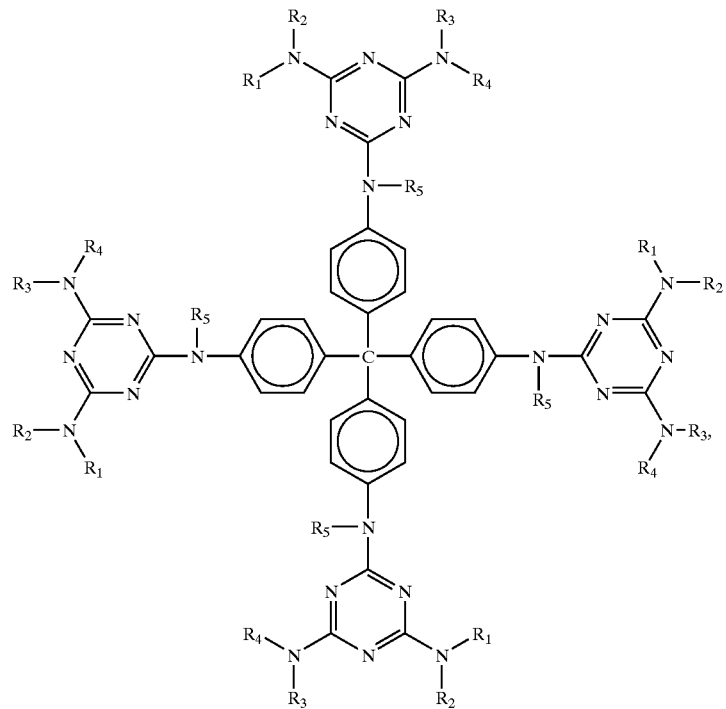
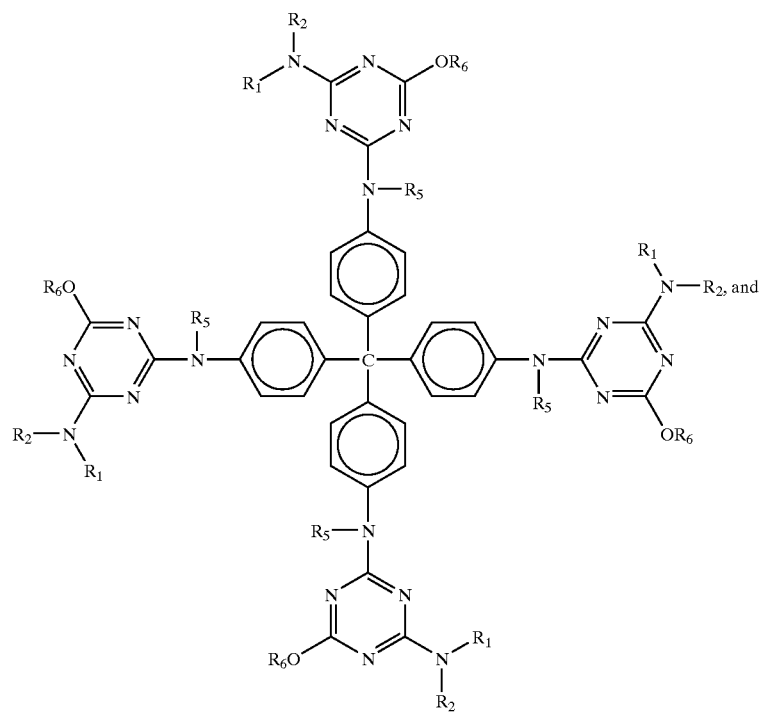

-continued

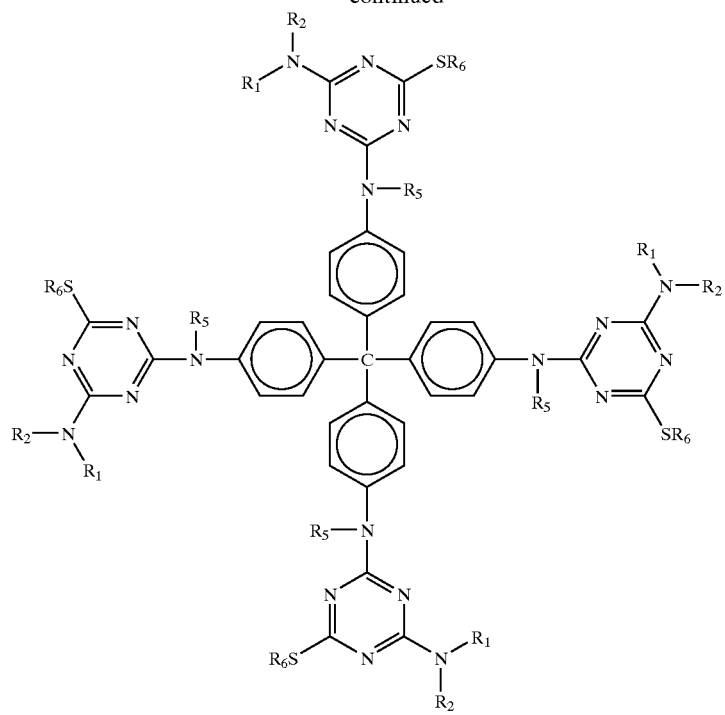

wherein, provided that at least one of $R_1$, $R_2$, $R_3$, $R_4$, $R_5$, and $R_6$ is a hydrogen atom, and provided that at least one of $R_1$, $R_2$, $R_3$, $R_4$, $R_5$, and $R_6$ is not a hydrogen atom, $R_1$, $R_2$, $R_3$, $R_4$, $R_5$, and $R_6$ each, independently of the others, is (i) a hydrogen atom, (ii) an alkyl group, (iii) an aryl group, (iv) an arylalkyl group, or (v) an alkylaryl group, can be employed in these processes. These compounds and inks containing them can be prepared as disclosed in Copending Application U.S. Ser. No. (not yet assigned; Attorney Docket No. D/A1722), filed concurrently herewith, entitled "Alkylated Tetrakis(triaminotriazine) Compounds and Phase Change Inks Containing Same," with the named inventors Danielle C. Boils-Boissier, Marcel P. Breton, Jule W. Thomas, Jr., Donald R. Titterington, Jeffery H. Banning, H. Bruce Goodbrand, James D. Wuest, Marie-Ève Perron, Francis Monchamp, and Hugues Duval, the disclosure of which is totally incorporated herein by reference.

In addition, compounds of the formulae

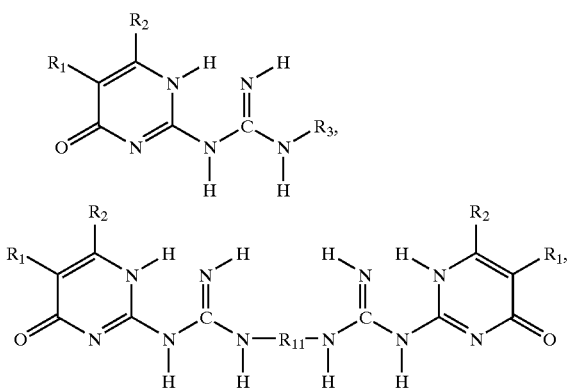

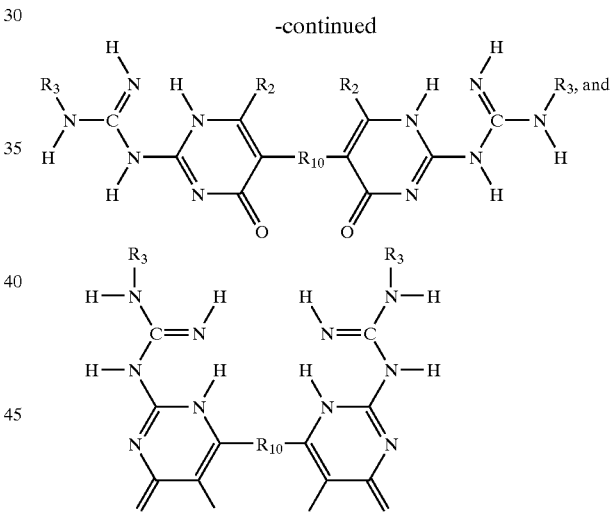

wherein, provided that at least one of $R_1$, $R_2$, and $R_3$ is not a hydrogen atom, $R_1$, $R_2$, and $R_3$ each, independently of the other, is (i) a hydrogen atom, (ii) an alkyl group, (iii) an aryl group, (iv) an arylalkyl group, or (v) an alkylaryl group, and wherein $R_1$ and $R_2$ can also be (vi) an alkoxy group, (vii) an aryloxy group, (viii) an arylalkyloxy group, (ix) an alkylaryloxy group, (x) a polyalkyleneoxy group, (xi) a polyaryleneoxy group, (xii) a polyarylalkyleneoxy group, (xiii) a polyalkylaryleneoxy group, (xiv) a silyl group, (xv) a siloxane group, (xvi) a polysilylene group, (xvii) a polysiloxane group, or (xviii) a group of the formula

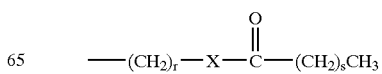

wherein r is an integer representing a number of repeat —$CH_2$— groups, wherein s is an integer representing a number of repeating —$CH_2$— groups, and wherein X is (a) a direct bond, (b) an oxygen atom, (c) a sulfur atom, (d) a group of the formula —$NR_{40}$— wherein $R_{40}$ is a hydrogen atom, an alkyl group, an aryl group, an arylalkyl group, or an alkylaryl group, or (e) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and $R_{10}$ and $R_{11}$ each, independently of the other, is (i) an alkylene group, (ii) an arylene group, (iii) an arylalkylene group, or (iv) an alkylarylene group, and wherein $R_{10}$ can also be (v) a polyalkyleneoxy group, (vi) a polyaryleneoxy group, (vii) a polyarylalkyleneoxy group, (viii) a polyalkylaryleneoxy group, (ix) a silylene group, (x) a siloxane group, (xi) a polysilylene group, or (xii) a polysiloxane group, can be employed in these processes. These compounds and inks containing them can be prepared as disclosed in Copending Application U.S. Ser. No. (not yet assigned; Attorney Docket No. D/A2176), filed concurrently herewith, entitled "Guanidinopyrimidinone Compounds and Phase Change Inks Containing Same," with the named inventors Danielle C. Boils-Boissier, Marcel P. Breton, Jule W. Thomas, Jr., Donald R. Titterington, Jeffery H. Banning, H. Bruce Goodbrand, James D. Wuest, Marie-Ève Perron, and Hugues Duval, the disclosure of which is totally incorporated herein by reference.

Further, compounds of the formulae

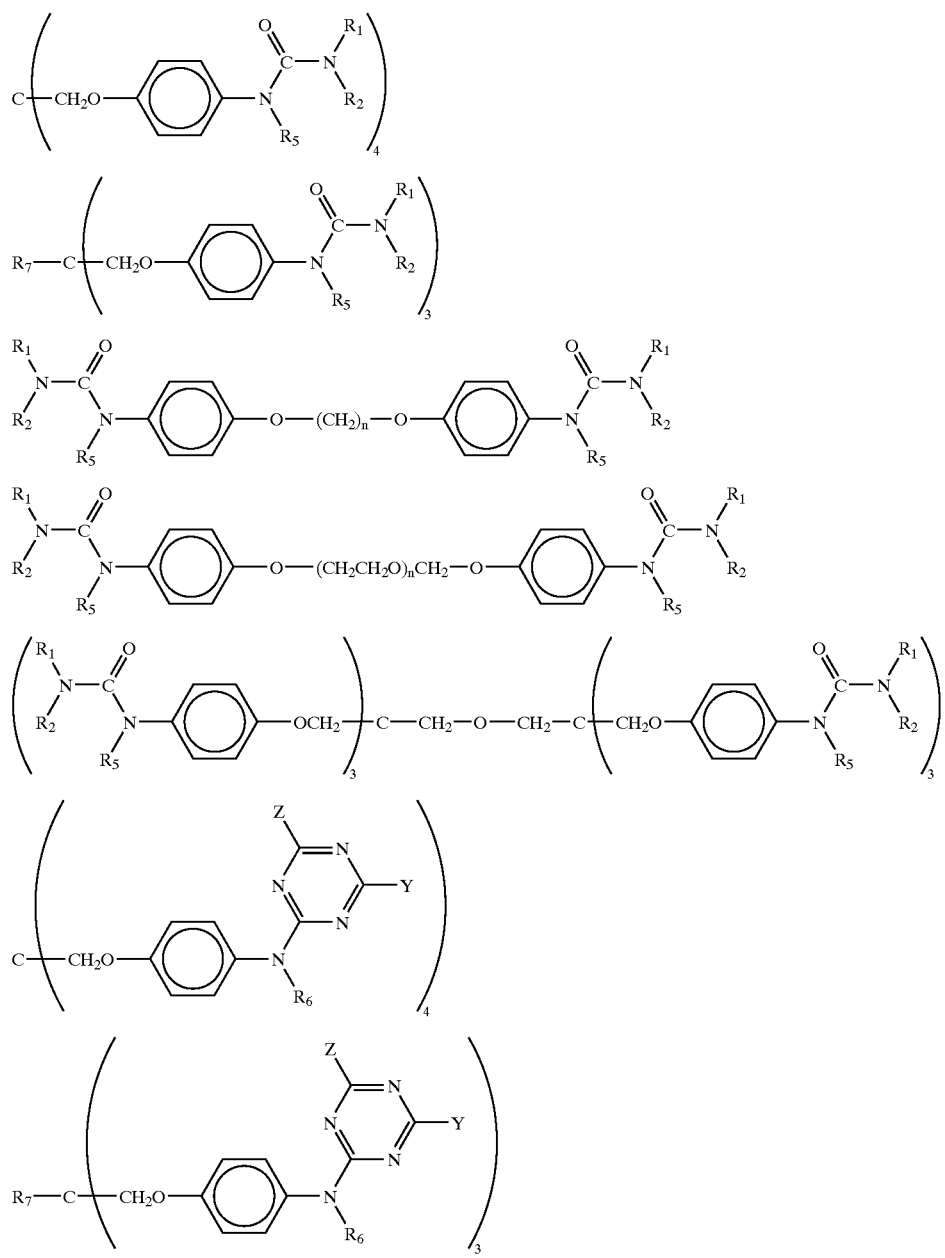

-continued

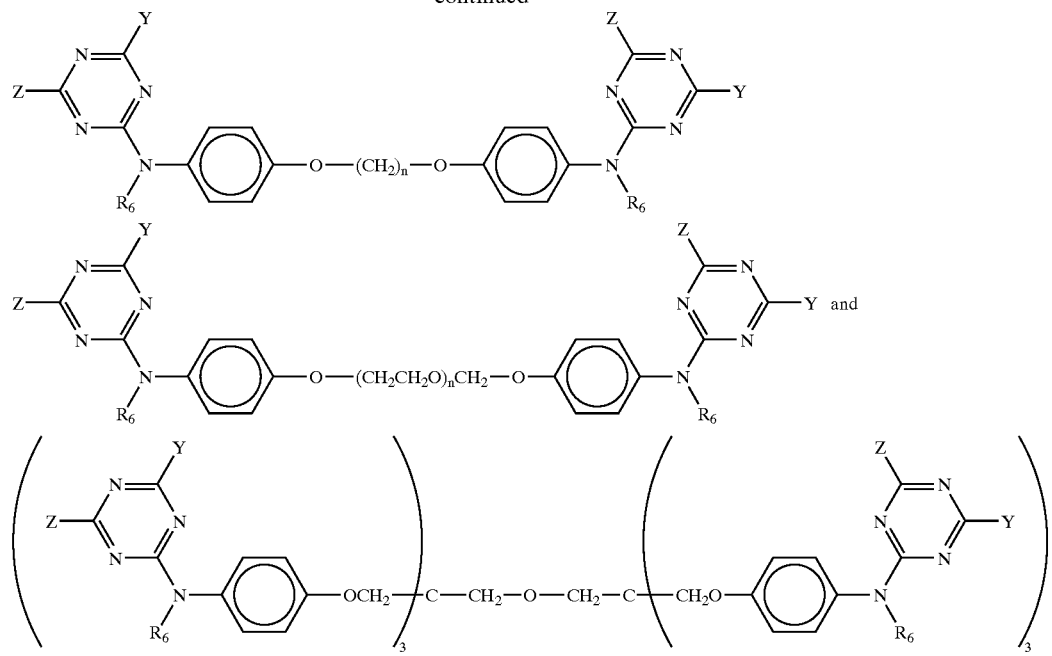

wherein Z is a group of the formula —$OR_1$, a group of the formula —$SR_1$, or a group of the formula —$NR_1R_2$, Y is a group of the formula —$OR_3$, a group of the formula —$SR_3$, or a group of the formula —$NR_3R_4$, n is an integer representing the number of repeat —($CH_2$)— or —($CH_2CH_2O$)— units, wherein, provided that at least one of $R_1$, $R_2$, $R_3$, $R_4$, $R_5$, and $R_6$ is a hydrogen atom, provided that at least one of $R_1$, $R_2$, $R_3$, $R_4$, $R_5$, and $R_6$ is other than a hydrogen atom, and provided that at least one Z or Y within the compound is a group of the formula —$NR_1R_2$ or a group of the formula —$NR_3R_4$, $R_1$, $R_2$, $R_3$, $R_4$, $R_5$, $R_6$, and $R_7$ each, independently of the others, is (i) a hydrogen atom, (ii) an alkyl group, (iii) an aryl group, (iv) an arylalkyl group, or (v) an alkylaryl group, and wherein $R_7$ can also be (vi) an alkoxy group, (vii) an aryloxy group, (viii) an arylalkyloxy group, (ix) an alkylaryloxy group, (x) a polyalkyleneoxy group, (xi) a polyaryleneoxy group, (xii) a polyarylalkyleneoxy group, (xiii) a polyalkylaryleneoxy group, (xiv) a silyl group, (xv) a siloxane group, (xvi) a polysilylene group, (xvii) a polysiloxane group, or (xviii) a group of the formula $$—(CH_2)_r—X—\overset{O}{\overset{\|}{C}}—(CH_2)_sCH_3$$

wherein r is an integer representing a number of repeat —$CH_2$— groups, wherein s is an integer representing a number of repeating —$CH_2$— groups, and wherein X is (a) a direct bond, (b) an oxygen atom, (c) a sulfur atom, (d) a group of the formula —$NR_{40}$— wherein $R_{40}$ is a hydrogen atom, an alkyl group, an aryl group, an arylalkyl group, or an alkylaryl group, or (e) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and wherein $R_6$ can also be

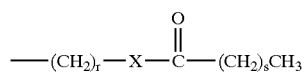

can be employed in these processes. These compounds and inks containing them can be prepared as disclosed in Copending Application U.S. Ser. No. (not yet assigned; Attorney Docket No. D/A2177), filed concurrently herewith, entitled "Alkylated Urea and Triaminotriazine Compounds and Phase Change Inks Containing Same," with the named inventors Marcel P. Breton, Danielle C. Boils-Boissier, Jule W. Thomas, Jr., Donald R. Titterington, H. Bruce Goodbrand, Jeffery H. Banning, James D. Wuest, Dominic Laliberté, and Marie-Ève Perron, the disclosure of which is totally incorporated herein by reference.

The organic gelator is present in the inks of the present invention in any desired or effective amount, in one embodiment at least about 0.01 percent by weight of the ink, in another embodiment at least about 1 percent by weight of the ink, and in yet another embodiment at least about 2 percent by weight of the ink, and in one embodiment no more than about 20 percent by weight of the ink, in another embodiment no more than about 15 percent by weight of the ink, in yet another embodiment no more than about 10 percent by weight of the ink, and in still another embodiment no more than about 5 percent by weight of the ink, although the amount can be outside of these ranges.

Increasing the amount of organic gelator in the ink typically increases the temperature at which the transition from gel state to liquid state occurs; accordingly, it is possible to adjust physical characteristics of the ink such as the gel-liquid transition temperature by adjusting the amount of gelator. It is also possible to adjust the transition from gel to liquid by selecting different conditions for the imaging process, such as shear, stress, and rate of heating or cooling.

Optionally, the inks of the present invention contain a component that, in its pure form, is a liquid at room temperature (typically about 20° C.), but, when incorporated into the inks of the present invention, enable the ink to be a solid at 35° C. or higher. The selected liquid or mixture of liquids are chosen to be compatible with the other ink components, and can be either polar or nonpolar in nature. Specific examples of suitable liquids include aliphatic hydrocarbons, including those with boiling points of about 150° C. or higher, such as squalene, ISOPAR® V, and the like, polar liquids such as glycol ethers, esters, amides, alcohols, and the like, with specific examples including butyl carbitol, tripropylene glycol monomethyl ether, 1-phenoxy-2-propanol, dibutyl phtholate, dibutyl sebacate, 1-dodecanol, and the like, as well as mixtures thereof.

When present, the optional liquid component is present in the ink in any desired or effective amount, in one embodiment at least about 5 percent by weight of the ink, in another embodiment at least about 10 percent by weight of the ink, and in yet another embodiment at least about 20 percent by weight of the ink, and in one embodiment no more than about 50 percent by weight of the ink, and in another embodiment no more than about 30 percent by weight of the ink, although the amount can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512, commercially available from Uniroyal Chemical Company, Oxford, Conn., IRGANOX® 1010, commercially available from Ciba Geigy, and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present invention can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks of the present invention are solid at ambient temperature. In a specific embodiment, during the formation process, the inks in their molten state are poured into molds and then allowed to cool and solidify to form ink sticks.

For the purposes of the present invention, the term "melting point" with respect to the inks of the present invention means the temperature or temperature range at which the ink makes a transition from the solid state to the gel state. The ink is in the solid state at temperatures below the melting point. The ink compositions of the present invention in one embodiment have melting points of no lower than about 35° C., in another embodiment of no lower than about 50° C., in yet another embodiment of no lower than about 70° C., and in still another embodiment of no lower than about 80° C., and have melting points in one embodiment of no higher than about 160° C., in another embodiment of no higher than about 140° C., and in yet another embodiment of no higher than about 110° C., although the melting point can be outside of these ranges.

The inks of the present invention generally form gels at a temperature above the melting point of the ink but below the temperature at which the ink is jetted in the liquid state. For the purposes of the present invention, the term "gel point" with respect to the inks of the present invention means the temperature or temperature range at which the ink makes a transition from the gel state to the liquid state. The ink is in the gel state at temperatures between the melting point and the gel point. The ink is in the liquid state at temperatures above the gel point. The ink compositions of the present invention in one embodiment have gel points of no lower than about 50° C., in another embodiment of no lower than about 60° C., and in yet another embodiment of no lower than about 90° C., and have gel points in one embodiment of no higher than about 130° C., in another embodiment of no higher than about 120° C., and in yet another embodiment of no higher than about 100° C., although the gel point can be outside of these ranges.

When the inks of the present invention are in the gel state, the viscosity of the ink in one embodiment is at least about 1,000 centipoise, in another embodiment at least about 3,000 centipoise, and in yet another embodiment at least about 10,000 centipoise, and the viscosity of the ink in one embodiment is no more than about 500,000 centipoise, in another embodiment no more than about 200,000 centipoise, and in yet another embodiment no more than about 100,000 centipoise, although the viscosity can be outside of these ranges. Preferred viscosity values in the gel state are in the range of from about $10^3$ to about $10^5$ centipoise, and more preferably from about $10^{3.5}$ to about $10^{4.5}$ centipoise, although the viscosity can be outside of these ranges.

The ink-compositions of the present invention are jetted at temperatures above the gel point while they are in the liquid state, and generally have melt viscosities at the jetting temperature (in one embodiment no lower than about 55° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

Another embodiment of the present invention is directed to a process which comprises incorporating an ink of the present invention into an ink jet printing apparatus, melting the ink, and causing droplets of the melted ink to be ejected in an imagewise pattern onto a recording substrate. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, and the like. Phase change inks of the present invention can also be used in printing processes other than hot melt ink jet printing processes, including thermal transfer printing processes.

The inks of the present invention can be employed in apparatus for direct printing ink jet processes, wherein when droplets of the melted ink are ejected in an imagewise pattern onto a recording substrate, the recording substrate is a final recording substrate. The inks of the present invention can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. Offset or indirect printing processes are also disclosed in, for example, U.S. Pat. No. 5,389,958, U.S. Pat. No. 5,099,256, and U.S. Pat. No. 4,538,156, the disclosures of each of which are totally incorporated herein by reference.

In one embodiment of the present invention, subsequent to placement of the ink image onto the final substrate, either by a direct printing process or by an indirect printing process, the image thus formed is subjected to fusing by applying to the image a fusing member at a temperature at which the ink is in the gel state, i.e., at a temperature between the gel point and the melting point of the ink. This embodiment is particularly suitable when the final recording substrate is porous, such as paper or the like, since it enables control of the degree of penetration of the ink into the final substrate and can help to reduce showthrough of the ink image on the opposite surface of the final recording substrate. In a specific embodiment, the printing process is a direct printing process, wherein the droplets of the melted ink are ejected directly from the printing apparatus onto the final substrate, followed by fusing the image to the final substrate at a temperature lower than the gel point of the ink but greater than the melting point of the ink. Direct printing processes are disclosed in, for example, U.S. Pat. No. 5,195,430, U.S. Pat. No. 4,745,420, U.S. Pat. No. 4,889,761, and U.S. Pat. No. 5,761,597, the disclosures of each of which are totally incorporated herein by reference.

In another embodiment of the present invention, subsequent to placement of the ink image onto the final substrate, either by a direct printing process or by an indirect printing process, the image thus formed is subjected to fusing at a temperature at which the ink is in the liquid state, i.e., at a temperature above the gel point of the ink. This embodiment is particularly suitable when the final recording substrate is nonporous, such as transparency stock or the like, since fusing at a temperature above the gel point of the ink can enable the ink to flow and/or absorb properly onto the nonporous final recording substrate. In a specific embodiment, the printing process is a direct printing process, wherein the droplets of the melted ink are ejected directly from the printing apparatus onto the final substrate, followed by fusing the image to the final substrate at a temperature greater than the gel point of the ink. Direct printing processes are disclosed in, for example, U.S. Pat. No. 5,195,430, U.S. Pat. No. 4,745,420, U.S. Pat. No. 4,889,761, and U.S. Pat. No. 5,761,597, the disclosures of each of which are totally incorporated herein by reference.

Fusing can be by any desired or effective method, such a those commonly known in the art of electrophotography. One method entails application of a fusing member to the image to be fused. In a specific embodiment, the fusing member is heated. The fusing member can be of any desired or suitable configuration, such as a drum or roller, a belt or web, a flat surface or platen, or the like. The fusing member can be heated by any desired or suitable method, such as by situating heaters in or near the fusing member, or the like. Optionally, a layer of a liquid such as a fuser oil can be applied to the fuser member prior to fusing. The fusing member can be applied to the image by any desired or suitable method, such as by passing the final recording substrate through a nip formed by the fusing member and a back member, which can be of any desired or effective configuration, such as a drum or roller, a belt or web, a flat surface or platen, or the like. Fusing can be effected at any desired or effective nip pressure, in one embodiment at least about 5 pounds per square inch, in another embodiment at least about 250 pounds per square inch, and in yet another embodiment at least about 500 pounds per square inch, and in one embodiment no more than about 2,000 pounds per square inch, in another embodiment no more than about 1,000 pounds per square inch, and in yet another embodiment no more than about 850 pounds per square inch, although the pressure can be outside of these ranges.

Other methods of fusing, such as radiant fusing (wherein heat is applied without pressure), microwave irradiation, flash fusing (as described in, for example, U.S. Pat. No. 4,788,123, the disclosure of which is totally incorporated herein by reference), cold pressure fusing followed by application of heat by any desired method, or the like, can also be employed.

While not being limited to any particular theory, it is believed that the inks of the present invention exhibit specific rheological/mechanical properties that are advantageous and enabling in printing processes using a transfuse subsystem and in printing processes using a fusing and/or post-fusing process. It is believed that many embodiments of the inks of the present invention are tough solids at room temperature or near room temperature, thereby enabling excellent image robustness. It is also believed that many embodiments of the inks of the present invention are thixotropic soft or rigid gels at a higher temperature, above the melting point of the solid, said gels being deformable under stress, such as pressure. It is further believed that many embodiments of the inks of the present invention are Newtonian or near Newtonian liquids of low viscosity at even high temperatures, above the gel transition point.

In one embodiment, the ink of the present invention is in a gel state in the temperature range used for transfuse. Under these conditions, the ink image can be fused to the final recording substrate with low pile height and minimum showthrough. In another embodiment, the ink of the present invention is in a gel state in the temperature range used for fusing or post-fusing the image. The fusing and/or transfuse latitude of the ink of the present invention is greatly increased compared to the latitude of conventional wax-based solid inks, since gel inks can be fused over a wider temperature range, typically from below the temperature defined as the gel point down to the melting point of the ink, and at lower pressure compared to conventional wax-based inks. On the other hand, waxed-based inks have a sharp melting transition to give low viscosity liquids that penetrate deeply into porous substrates such as paper, producing images with unacceptable showthrough. They cannot be fused at temperatures much above the melting point of the wax, and may require high transfuse pressures to help in fusing the solid wax to the paper. Such pressures, while they can be used with the inks of the present invention, are not needed to produce robust images.

In another embodiment of the present invention, the recording substrate onto which droplets of the melted ink are ejected in an imagewise pattern, whether it is the final recording substrate (in a direct printing process) or an intermediate transfer member (in an indirect printing process), is maintained at a temperature at which the ink is in the gel state, i.e., at a temperature between the gel point and the melting point of the ink. Without being limited to any specific theory, it is believed that in this embodiment, the substrate temperature (either the final substrate or the intermediate transfer member) is set at an optimum temperature for the formation of a reinforcing gel network. It is believed that the image thus formed will have improved robustness as a result of the reinforcement of the ink vehicle with the gel. Upon cooling or, in the case of an indirect printing method, transfer to the final substrate, the network is frozen within the ink vehicle.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like. Transfer can be effected at any desired or effective nip pressure, in one embodiment at least about 5 pounds per square inch, in another embodiment at least about 250 pounds per square inch, and in yet another embodiment at least about 500 pounds per square inch, and in one embodiment no more than about 2,000 pounds per square inch, in another embodiment no more than about 1,000 pounds per square inch, and in yet another embodiment no more than about 850 pounds per square inch, although the pressure can be outside of these ranges. Subsequent to transfer, if desired, a post-fusing step can be carried out by any desired or effective method, such as by radiant fusing, microwave irradiation, flash fusing, application of a heated fusing member, or the like. Without being limited to any specific theory, it is believed that in this embodiment of the present invention, the ink is transferred to the final recording substrate in a semi-soft state, facilitating penetration of the ink into the final substrate (paper fibers, for example) and enabling improved adhesion, reduced showthrough, and reduced pile height.

Any suitable final substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I 2,3-Di-n-dodecyloxyanthracene, of the formula

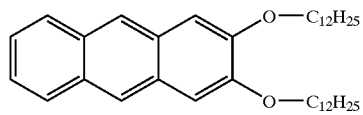

is synthesized by the method described by J.-L. Pozzo et al. in *Tetrahedron*, 1997, 53, 6377, the disclosure of which is totally incorporated herein by reference.

EXAMPLE II

Beta-Cholesteryl 4-(2-anthryloxy) butanoate (CAB), of the formula

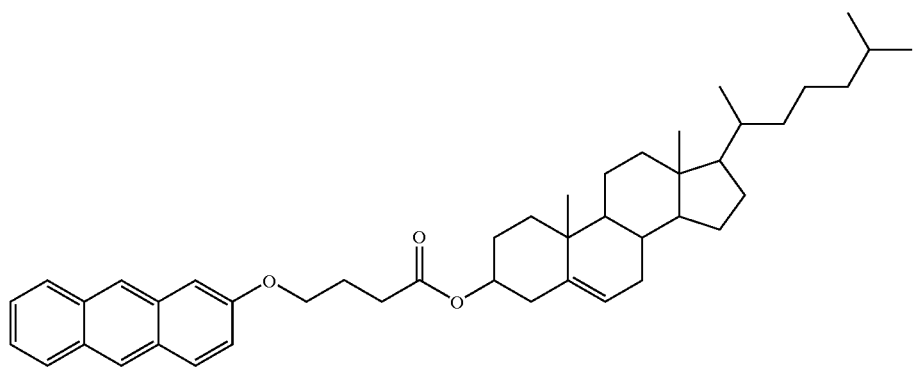

is synthesized by the method described by Weiss R. G. and Lin Y.-C. in U.S. Pat. No. 4,790,961, the disclosure of which is totally incorporated herein by reference.

EXAMPLE III

The semifluorinated n-alkane $F(CF_2)_{12}(CH_2)_8$ is synthesized by the method described Rabolt et al. in *Macromolecules*, Vol. 17, No. 12, 1984, p. 2787, the disclosure of which is totally incorporated herein by reference.

EXAMPLE IV

Trioctadecylamine, of the formula

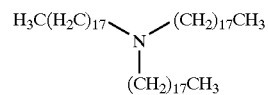

is synthesized by the method described by Ralston et al. in *J. Org. Chem.*, Vol. 9, p. 259 (1944) and references therein, the disclosure of which is totally incorporated herein by reference.

EXAMPLE V

N,N'-dioctadecyl-N,N,N',N'-tetramethyl-1,2-ethanediammonium-D-tartrate, of the formula

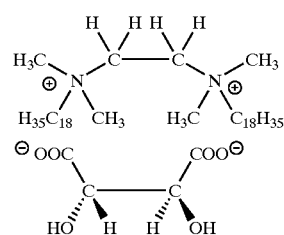

is prepared by preparing a compound of the formula

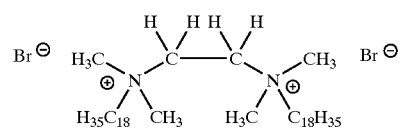

by the method described by V. J. Wotring et al., *Analytical Chemistry*, Vol. 62, No. 14, pp. 1506–1510 (1990), the disclosure of which is totally incorporated herein by reference, except that the starting material containing iodine atoms is substituted for the same material containing bromine atoms. The tartrate salt is subsequently prepared by halide exchange, also called the Finkelstein reaction. It is obtained by mixing, in acetone, the bromide salt with sodium D-tartrate dihydrate (available from Aldrich Chemical Co., Milwaukee, Wis.), precipitating NaBr in the process. In the ink compositions prepared with this material, this tartrate compound is present in the ink in an amount of about 1 percent by weight instead of the amount listed generically in the Examples below.

EXAMPLE VI

N,N'-dihexadecyl-N,N,N',N'-tetramethyl-1,2-ethanediammonium-L-tartrate, of the formula

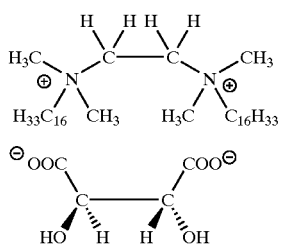

is prepared by preparing a compound of the formula

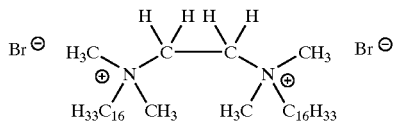

by the method described by H. Schiefer et al., *J. Prakt. Chem.*, Vol. 327, No. 3, pp. 383–398 (1985), the disclosure of which is totally incorporated herein by reference. The tartrate salt is subsequently prepared by halide exchange, also called the Finkelstein reaction. It is obtained by mixing, in acetone, the bromide salt with sodium L-tartrate dihydrate (available from Aldrich Chemical Co., Milwaukee, Wis.), precipitating NaBr in the process.

EXAMPLE VII

The chiral butenolide-based compound (3aS,9aR)-3-{[1R,2S,5R)-2-isopropyl-5-methylcyclohexyl]oxy}-3a-[4-methylphenyl)sulfonyl]-3a,4,9,9a-tetrahydronaphtho[2,3-c]furan-1(3H)-one is synthesized by the method described by Schoonbeek F. in "Making it All Stick Together: the Gelation of Organic Liquids by Small Molecules," chapter 2, Doctoral Thesis, U. of Groningen, Netherlands, April 2001, the disclosure of which is totally incorporated herein by reference.

EXAMPLE VIII

The chiral butenolide-based compound of the formula

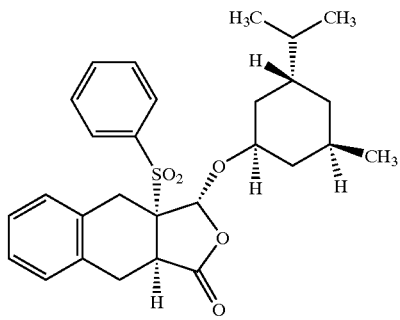

is synthesized by the method described by C. S. Snijder et al., *Chem. Eur. J.*, Vol. 1, No. 9, pp. 594–597 (1995), the disclosure of which is totally incorporated herein by reference.

EXAMPLE IX

The bis-urea compound (-)-(S,S)-dodecyl-3-[2-(3-dodecylureido)cyclohexyl]urea, of the formula

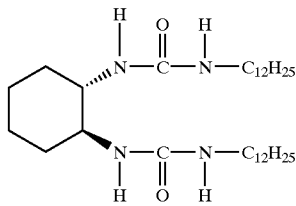

is synthesized by the method described by Schoonbeek F. in "Making it All Stick Together: the Gelation of Organic Liquids by Small Molecules," chapter 3, Doctoral Thesis, U. of Groningen, Netherlands, April 2001, the disclosure of which is totally incorporated herein by reference.

EXAMPLE X

A guanine compound of the formula

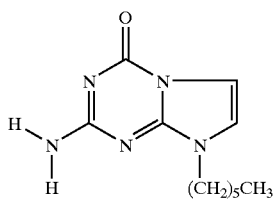

is synthesized by the method described by Bhattacharya et al., *J. Heterocycl. Chem.*, Vol. 30, No. 5, pp. 1341–9 (1993), the disclosure of which is totally incorporated herein by reference. In the ink compositions prepared with this material, this guanine compound is present in the ink in an amount of about 1 percent by weight instead of the amount listed generically in the Examples below.

EXAMPLE XI

A guanine compound of the formula

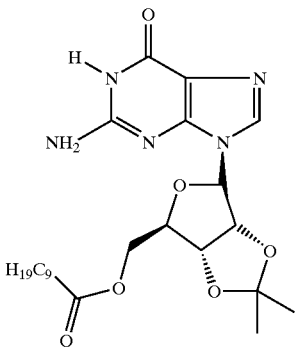

is synthesized by the method described by Giorgi et al., Chem. Eur. J., Vol. 8, No. 9, pp. 2143–2152 (2002) the disclosure of which is totally incorporated herein by reference.

EXAMPLE XII

A barbiturate of the formula

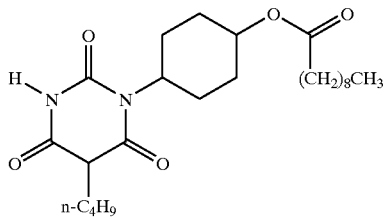

is synthesized by the method described by S. Senda et al., Gifu Coll. Pharm., Gifu, Japan. Yakugaku Zasshi, Vol. 89, No. 2, pp. 254–259 (1969), the disclosure of which is totally incorporated herein by reference.

EXAMPLE XIII

The oxamide compound N,N'-Bis[4,5-di(octyloxy)-2-nitrophenyl]-oxamide, of the formula

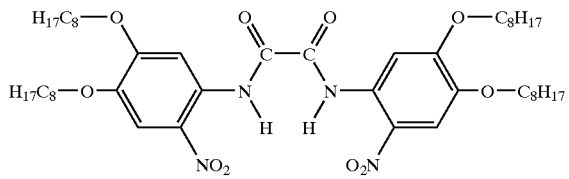

is synthesized by the method described by M. J. Crossley et al, in Aust. J. Chem., Vol. 47, pp. 723–738 (1994), the disclosure of which is totally incorporated herein by reference.

EXAMPLE XIV

Part A

Synthesis of 2(6-Isocyanatohexylaminocarbonylamino)-6-methyl-4[1H]pyrimidinone

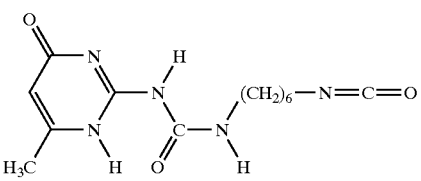

A solution of 0.70 mol 2-amino-4-hydroxy-6-methylpyrimidone in 4.75 mol 1,6-diisocyanatohexane (Aldrich D12,470-2) is heated at 100° C. for 16 hours. Pentane is then added and the resulting precipitate is filtered and washed with pentane. The white powder thus obtained is dried in vacuo at 50° C.

Part B

Synthesis of VORANOL® 335 Difunctional Ureido-4[1H]-pyrimidone Derivative

To a solution of 64 grams (380 meq) of VORANOL® 335 in chloroform, 253 milliequivalents of 2(6-isocyanatohexylaminocarbonylamino)-6-methyl-4[1H]-pyrimidinone is added. After addition of a few drops of dibutyltindilaurate, the reaction is held at reflux (60° C.) for 16 hours. Residual catalyst is then removed by passing the solution over a short silica gel column and solvent is removed in vacuo to yield a mixed product that $^1$H NMR shows to possess an average of 1.8 ureido-4[1H]-pyrimidone groups per molecule.

EXAMPLE XV

Synthesis of VORANOL® 335 Trifunctional Ureido-4[1H]-pyrimidone Derivative

2(6-Isocyanatohexylaminocarbonylamino)-6-methyl-4[1H] pyrimidinone is prepared as described in Part A of Example XIV. The trifunctional VORANOL® 335 derivative is prepared in an analogous fashion to that for the preparation of the difunctional derivative in Example XIV except that 380 milliequivalents of VORANOL® 335 are reacted with 380 milliequivalents of 2(6-isocyanatohexylaminocarbonylamino)-6-methyl-4[1H]-pyrimidinone. $^1$H NMR indicates that the mixed product contains an average of 2.7 ureido-4[1H]-pyrimidone groups per molecule.

EXAMPLE XVI

Synthesis of VORANOL® 370 Trifunctional Ureido-4[1H]-pyrimidone Derivative

2(6-Isocyanatohexylaminocarbonylamino)-6-methyl-4[1H] pyrimidinone is prepared as described in Part A of Example XIV. The trifunctional VORANOL® 370 derivative is prepared in an analogous fashion to that for the preparation of the difunctional derivative in Example XIV except that 104 grams (700 milliequivalents) of VORANOL® 370 are reacted with 300 milliequivalents of 2(6-isocyanatohexylaminocarbonylamino)-6-methyl-4[1H]- pyrimidinone. ¹H NMR indicates that the mixed product contains an average of 2.7 ureido-4[1H]-pyrimidone groups per molecule.

EXAMPLE XVII

Synthesis of VORANOL® 370 Tetrafunctional Ureido-4[1H]-pyrimidone Derivative

2(6-Isocyanatohexylaminocarbonylamino)-6-methyl-4[1H] pyrimidinone is prepared as described in Part A of Example XIV. The tetrafunctional VORANOL® 370 derivative is prepared in an analogous fashion to that for the preparation of the difunctional derivative in Example XIV except that 700 milliequivalents of VORANOL® 370 are reacted with 400 milliequivalents of 2(6-isocyanatohexylaminocarbonylamino)-6-methyl-4[1H]-pyrimidinone. ¹H NMR indicates that the mixed product contains an average of 3.8 ureido-4[1H]-pyrimidone groups per molecule.

EXAMPLE XVIII

Seventeen inks according to the present invention are prepared as follows. In a stainless steel beaker are combined 209.68 grams of polyethylene wax (PE 655, available from Baker Petrolite, Tulsa, Okla., of the formula $CH_3(CH_2)_{50}CH_3$), 95.54 grams of stearyl stearamide wax (KEMAMIDE® S-180, available from Crompton Corporation, Greenwich, Conn.), 114.76 grams of a tetraamide resin obtained from the reaction of one equivalent of dimer diacid with two equivalents of ethylene diamine and UNICID® 700 (a carboxylic acid derivative of a long chain alcohol available from Baker Petrolite, Tulsa, Okla.), prepared as described in Example 1 of U.S. Pat. No. 6,174,937, the disclosure of which is totally incorporated herein by reference, 49.81 grams of a urethane resin obtained from the reaction of two equivalents of ABITOL® E hydroabietyl alcohol (available from Hercules Inc., Wilmington, Del.) and one equivalent of isophorone diisocyanate, prepared as described in Example 1 of U.S. Pat. No. 5,782,966, the disclosure of which is totally incorporated herein by reference, 20.23 grams of a urethane resin that is the adduct of three equivalents of stearyl isocyanate and a glycerol-based alcohol prepared as described in Example 4 of U.S. Pat. No. 6,309,453, the disclosure of which is totally incorporated herein by reference, and 1.01 gram of NAUGUARD® 445 antioxidant (available from Uniroyal Chemical Co., Middlebury, Conn.). The materials are melted together at a temperature of about 135° C. in an oven, then blended by stirring in a temperature controlled mantle at about 135° C. for about 0.2 hour. To this mixture is then added 24.58 grams of NEOPEN YELLOW 075 (obtained from BASF) and 25 grams of one of the organic gelator compounds prepared as described in Examples I through XVI. After stirring for about 2 additional hours, the ink thus formed is filtered through a heated MOTT® apparatus (obtained from Mott Metallurgical) using NAE 0.2 micro filter and Whatman #3 filter paper (on top) under a pressure of about 15 pounds per square inch. The filtered phase change ink is poured into molds and allowed to solidify to form ink sticks. It is believed that the phase change ink thus prepared will exhibit a viscosity of about 13.7 centipoise and a glass transition temperature (Tg) of about 15° C.

EXAMPLE XIX

Seventeen inks according to the present invention are prepared as follows. A solid ink carrier composition is prepared as described in Example 11 of U.S. Pat. No. 5,780,528, the disclosure of which is totally incorporated herein by reference. To this composition is added about 2.0 percent by weight of NEOPEN YELLOW 075 (obtained from BASF) and 4 percent by weight of one of the organic gelator compounds prepared as described in Examples I through XVI. After stirring for about 3 additional hours, the ink thus formed is filtered through a heated MOTT® apparatus (obtained from Mott Metallurgical) using #3 Whatman filter paper and a pressure of about 15 pounds per square inch. The filtered phase change ink is then poured into molds and allowed to solidify to form ink sticks. It is believed that the phase change ink thus prepared will exhibit a viscosity of about 11 to 15 centipoise as measured by a Rheometrics cone-plate viscometer at about 140° C., a melting point of about 80° C. as measured by differential scanning calorimetry using a DSC 7 from Perkin Elmer, and a glass transition temperature ($T_g$) of about 14° C.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising an ink vehicle, a colorant, and a nonpolymeric organic gelator selected from the group consisting of anthracene-based compounds, steroid compounds, partially fluorinated high molecular weight alkanes, high molecular weight alkanes with exactly one hetero atom, chiral tartrate compounds, chiral butenolide-based compounds, bis-urea compounds, guanines, barbiturates, oxamide compounds, ureidopyrimidone compounds, and mixtures thereof, said organic gelator being present in the ink in an amount of no more than about 20 percent by weight of the ink, said ink having a melting point at or below which the ink is a solid, said ink having a gel point at or above which the ink is a liquid, and said ink exhibiting a gel state between the melting point and the gel point, said ink exhibiting reversible transitions between the solid state and the gel state upon heating and cooling, said ink exhibiting reversible transitions between the gel state and the liquid state upon heating and cooling, said melting point being greater than about 35° C. said gel point being greater than said melting point.

2. An ink according to claim 1 wherein the gelator is an anthracene-based compound.

3. An ink according to claim 1 wherein the gelator is an anthracene, a phenazine, an anthraquinone, or a mixture thereof.

4. An ink according to claim 1 wherein the gelator is of the formula

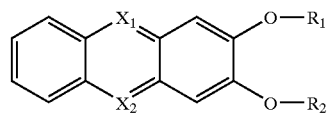

wherein $X_1$ and $X_2$ each, independently of the other, is a nitrogen atom, a —CH— group, or a

group and $R_1$ and $R_2$ each, independently of the other, is an alkyl group, an aryl group, an arylalkyl group, or an alkylaryl group, and wherein $R_2$ can also be a hydrogen atom.

5. An ink according to claim 1 wherein the gelator is of the formula

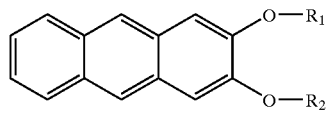

wherein $R_1$ and $R_2$ each, independently of the other, is an alkyl group, an aryl group, an arylalkyl group, or an alkylaryl group, and wherein $R_2$ can also be a hydrogen atom.

6. An ink according to claim 1 wherein the gelator is of the formula

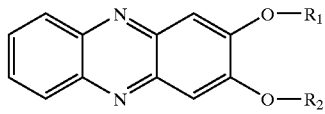

wherein $R_1$ and $R_2$ each, independently of the other, is an alkyl group, an aryl group, an arylalkyl group, or an alkylaryl group, and wherein $R_2$ can also be a hydrogen atom.

7. An ink according to claim 1 wherein the gelator is of the formula

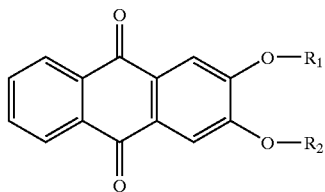

wherein $R_1$ and $R_2$ each, independently of the other, is an alkyl group, an aryl group, an arylalkyl group, or an alkylaryl group, and wherein $R_2$ can also be a hydrogen atom.

8. An ink according to claim 1 wherein the gelator is of the formula

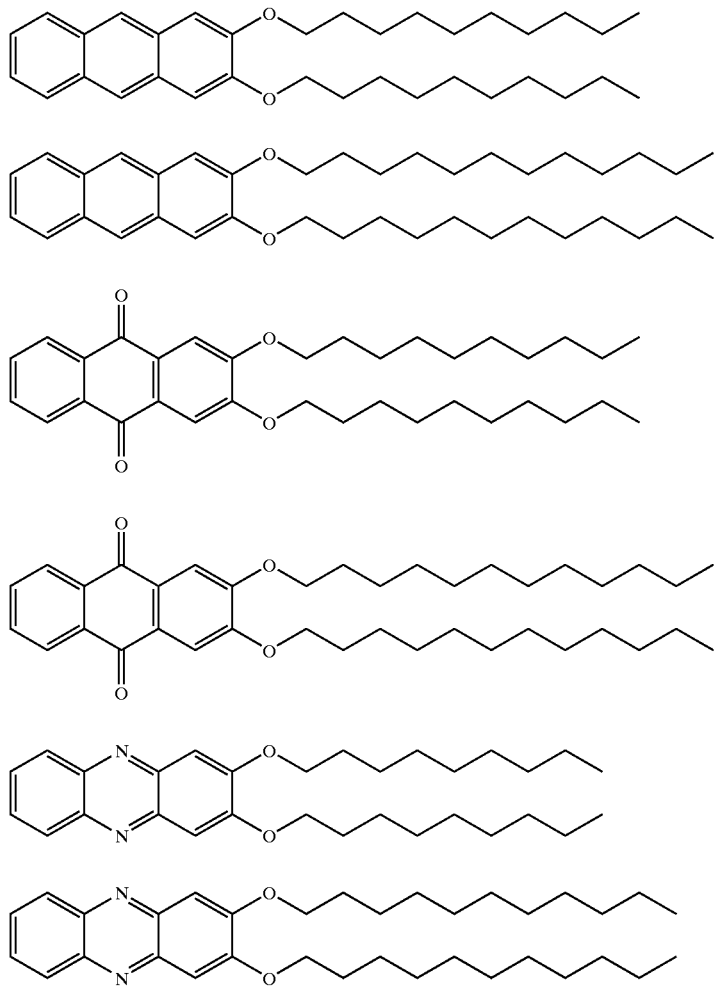

-continued
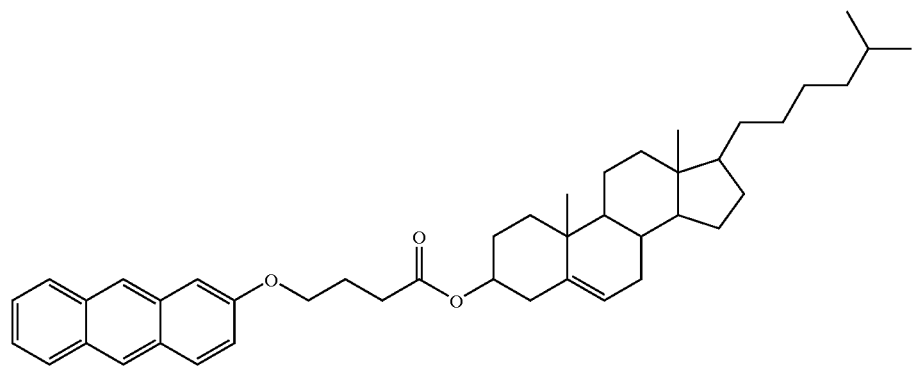
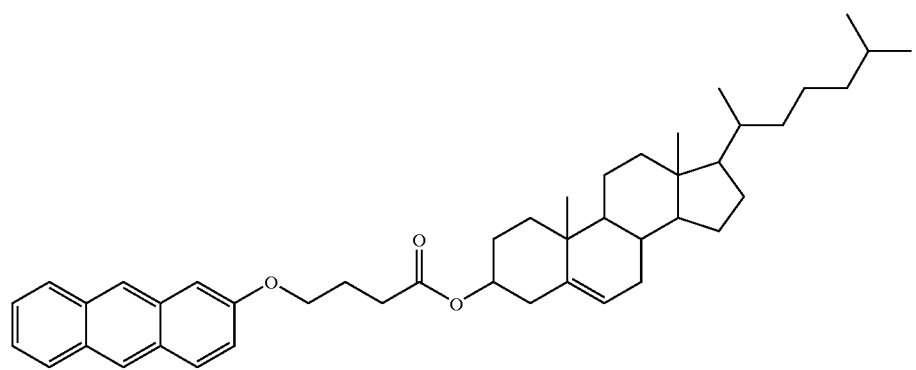
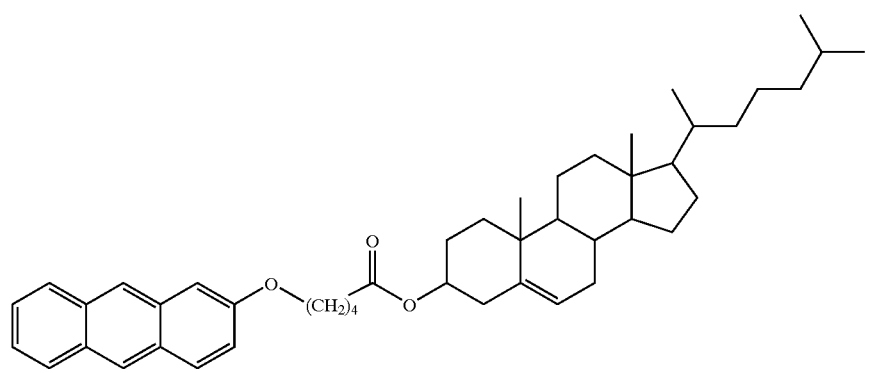
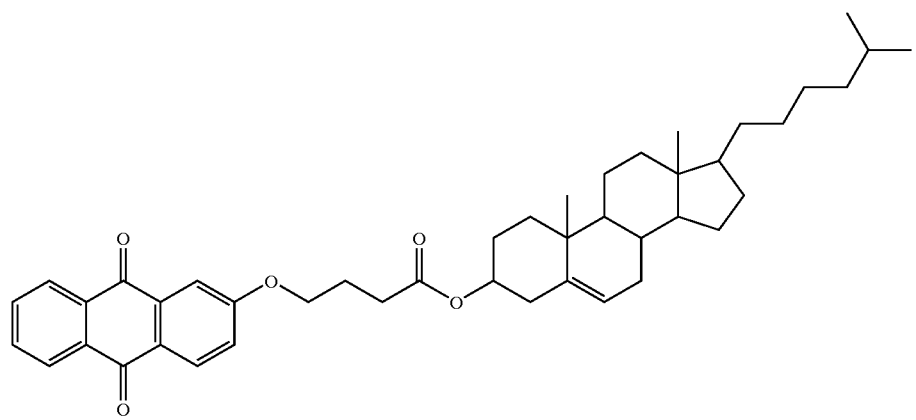

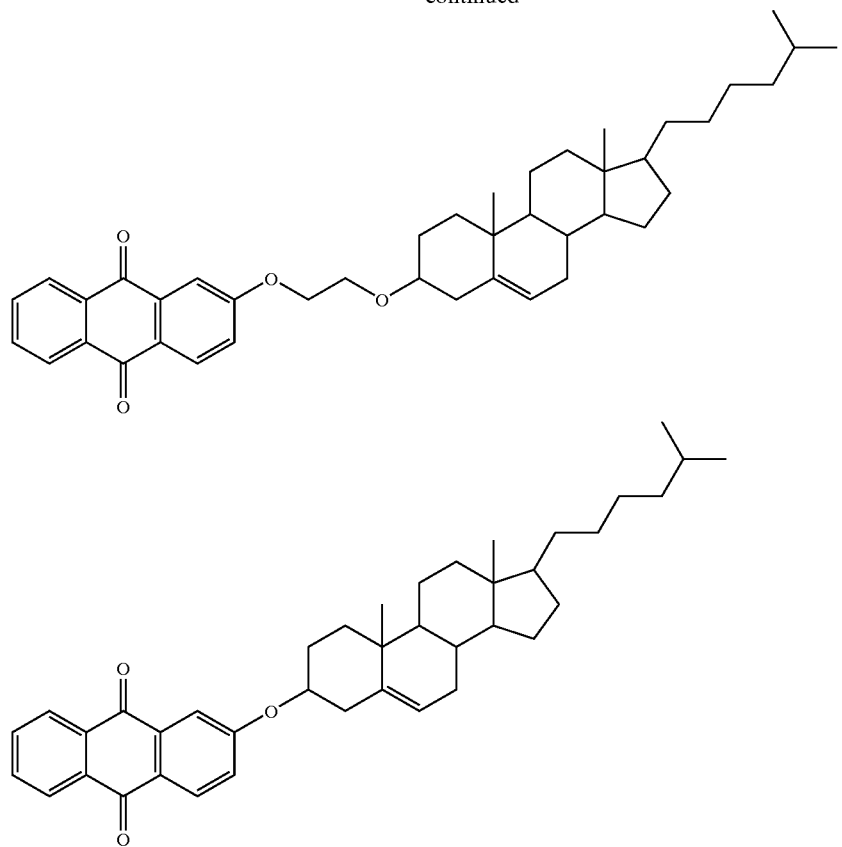
or mixtures thereof.
9. An ink according to claim 1 wherein the gelator is a steroid compound.
10. An ink according to claim 1 wherein the gelator is of the formulae
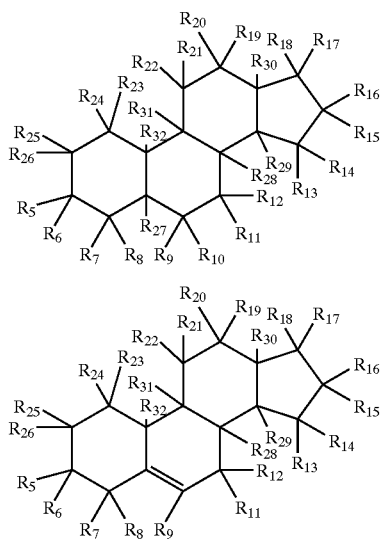
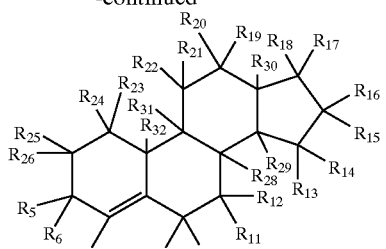
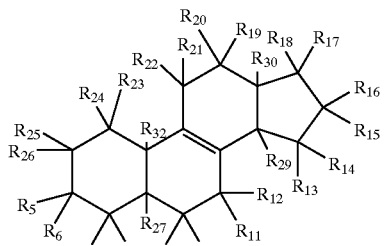
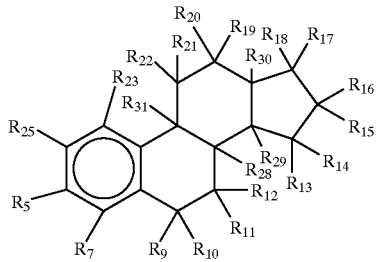

-continued

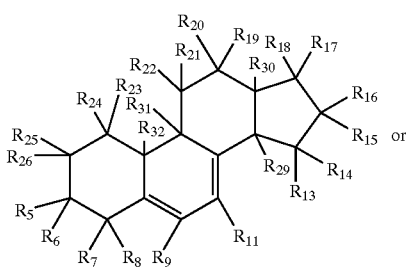

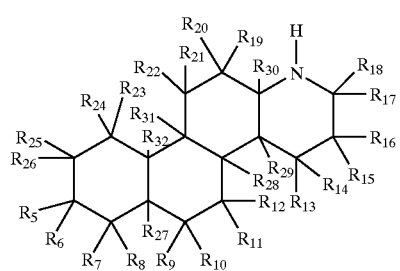

wherein $R_5$ through $R_{32}$ each, independently of the others, is (i) a hydrogen atom, (ii) a hydroxy group, (iii) a carbonyl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) an ester group of the formula

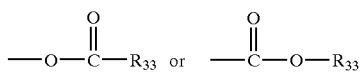

wherein $R_{33}$ is an alkyl group, an aryl group, an arylalkyl group, an alkylaryl group, an alkoxy group, an aryloxy group, an arylalkyloxy group, or an alkylaryloxy group, (xiii) an amine or ammonium group of the formulae

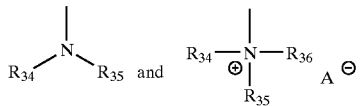

wherein $R_{34}$, $R_{35}$, and $R_{36}$ each, independently of the others, is an alkyl group, an aryl group, an arylalkyl group, an alkylaryl group, an alkoxy group, an aryloxy group, an arylalkyloxy group, or an alkylaryloxy group, and A is an anion.

11. An ink according to claim 1 wherein the gelator is of the formula

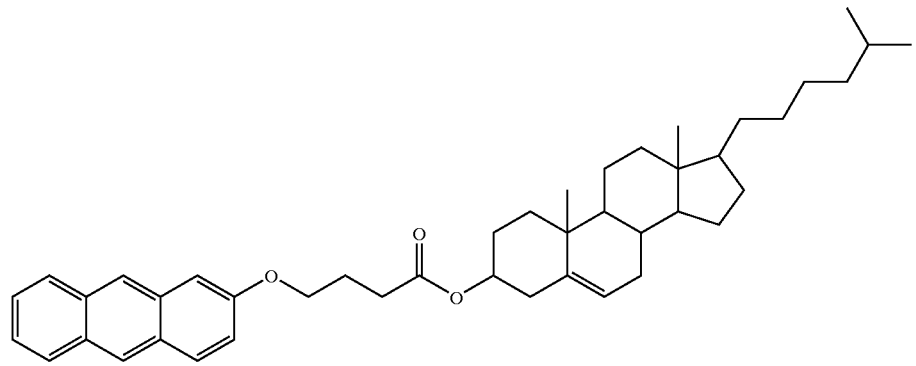

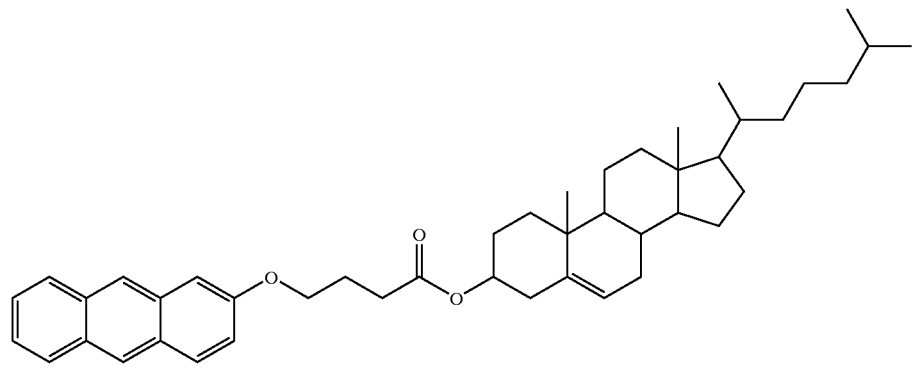

-continued
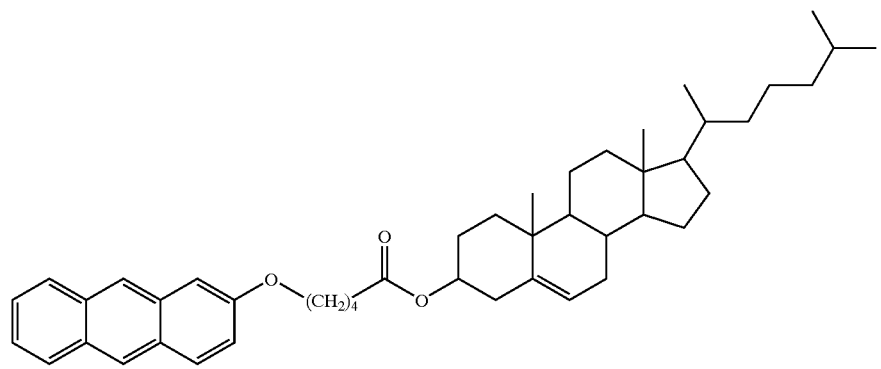
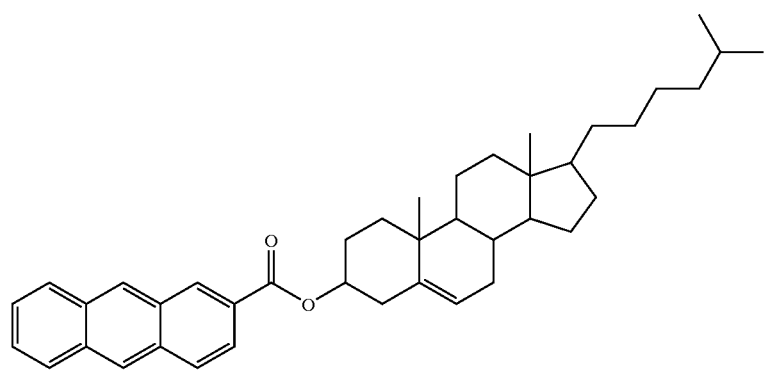
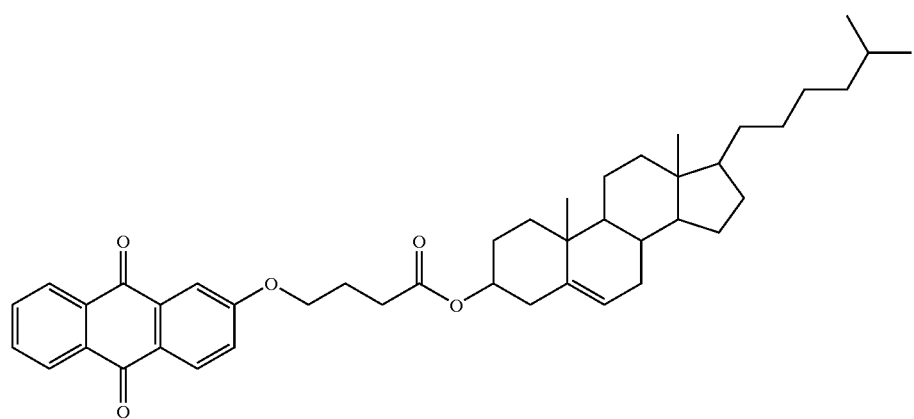
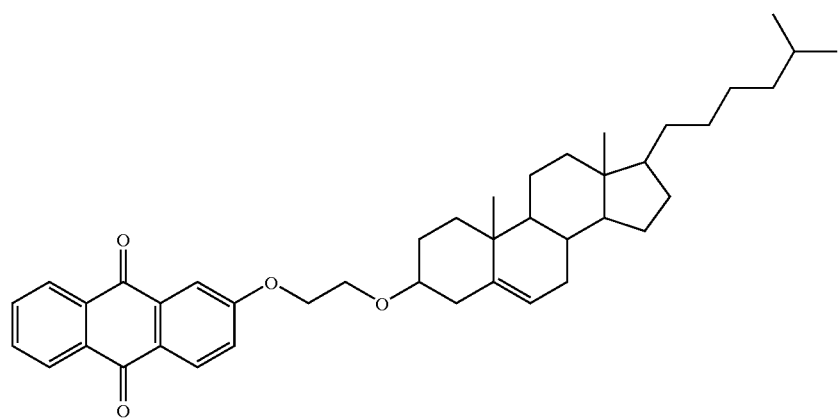

-continued
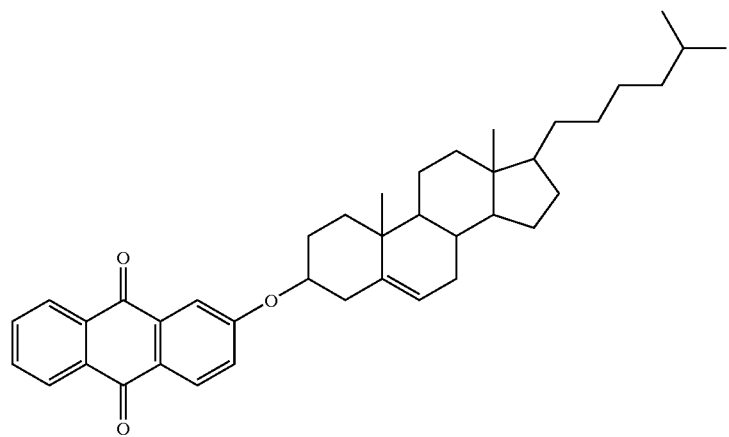
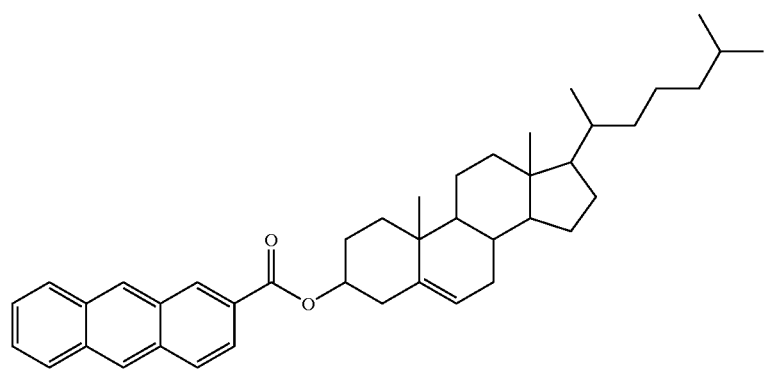
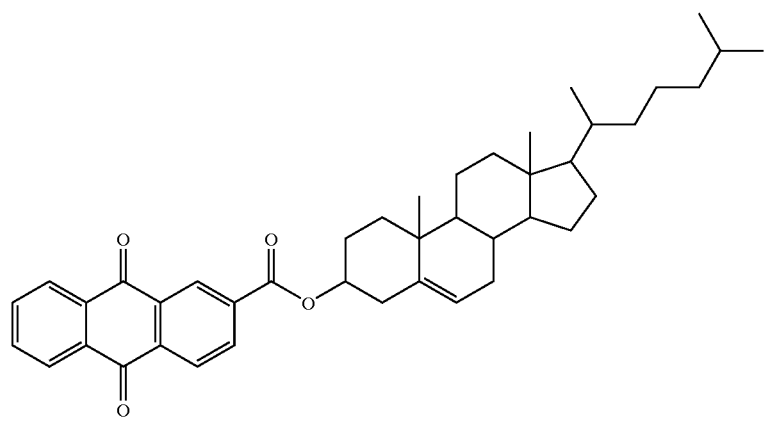
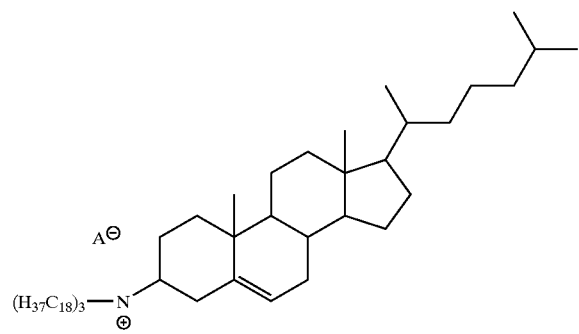

117
wherein A is Cl⁻, Br⁻, I⁻, ClO₄⁻, or a mixture thereof,
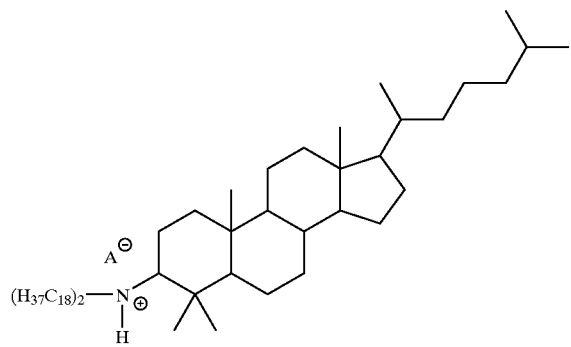
wherein A is Cl⁻, Br⁻, I⁻, ClO₄⁻, or a mixture thereof,
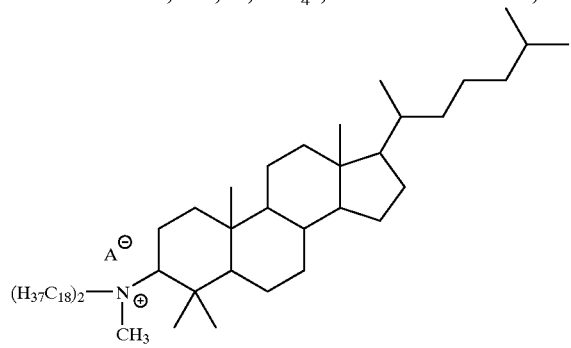
118
wherein A is Cl⁻, I⁻, Br⁻, I⁻, ClO₄⁻, or a mixture thereof,
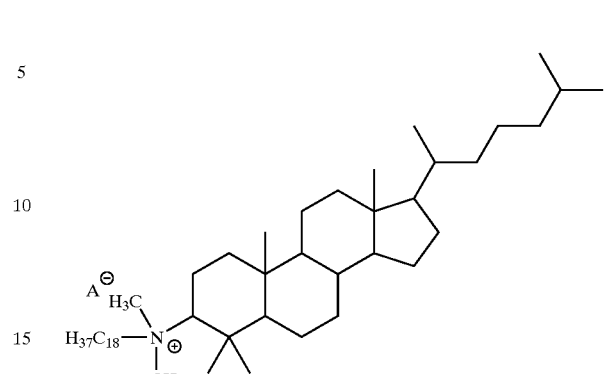
wherein A is Cl⁻, Br⁻, I⁻, ClO₄⁻, or a mixture thereof,
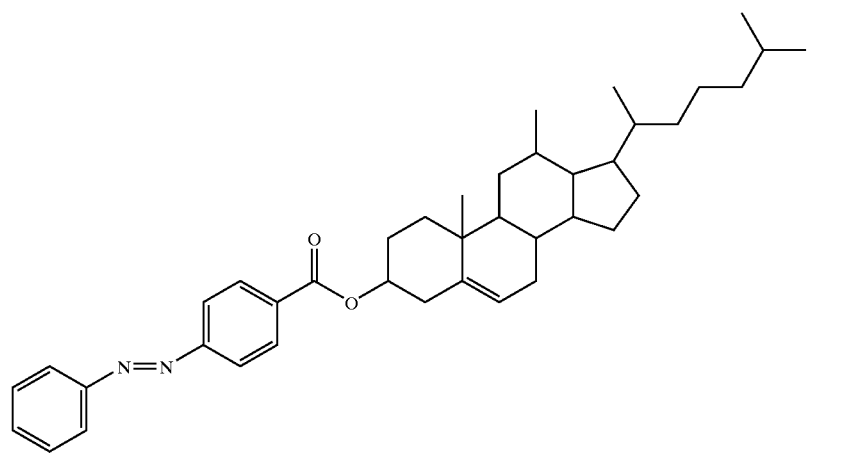
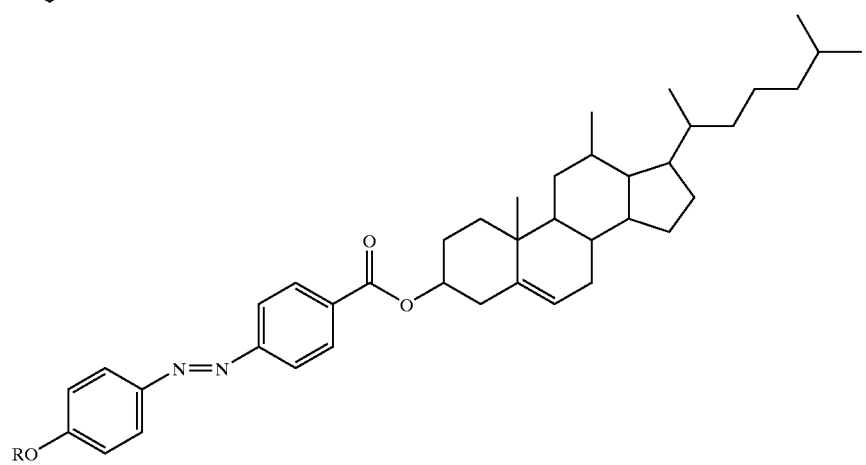

wherein R is a linear or branched alkyl group with from 1 to about 18 carbon atoms,
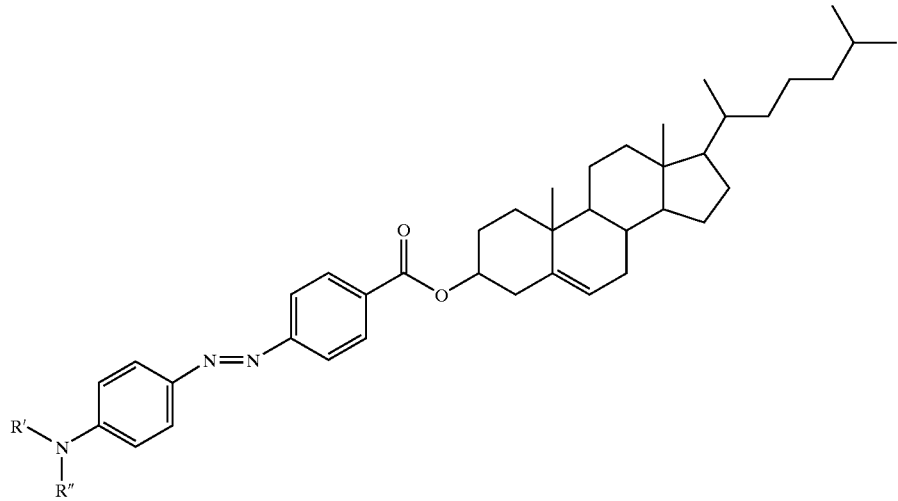
wherein R' and R" each, independently of the other, is a linear or branched alkyl group with from 1 to about 18 carbon atoms,
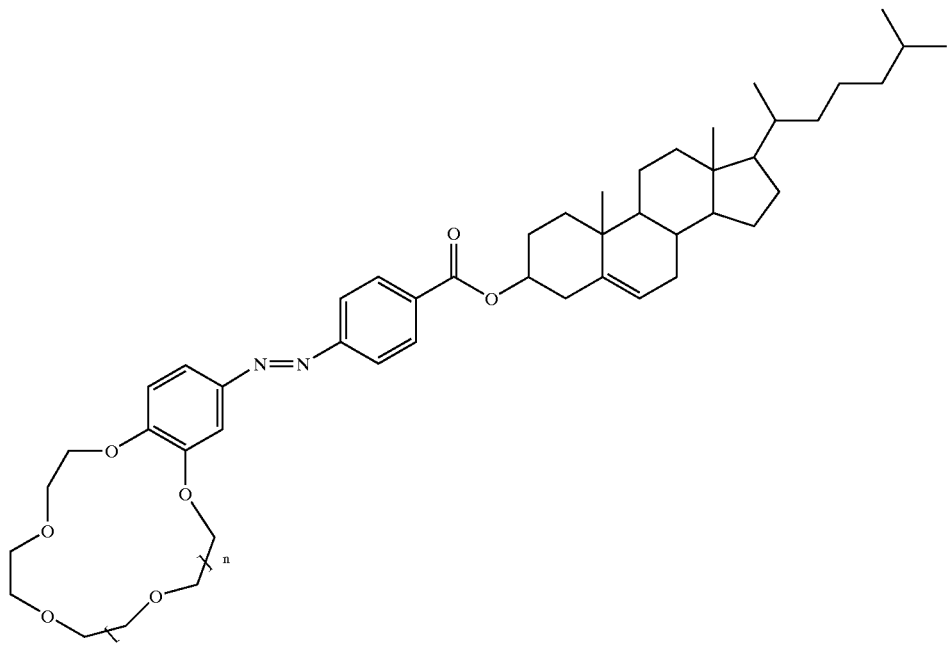
wherein n is an integer of from 1 to about 4,

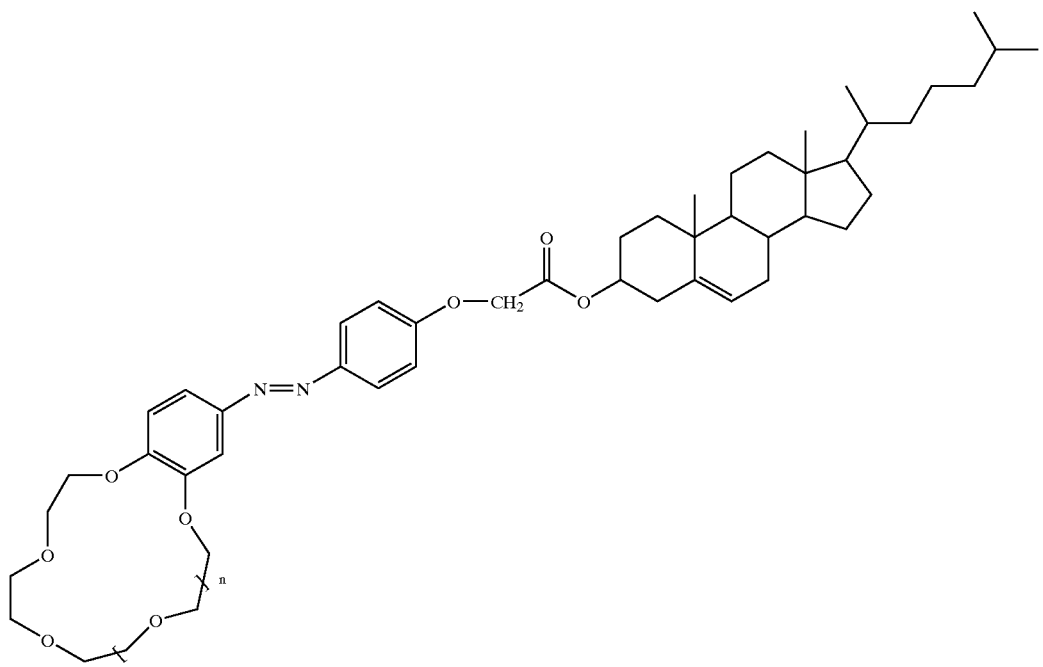

wherein n is an integer of from 1 to about 4,

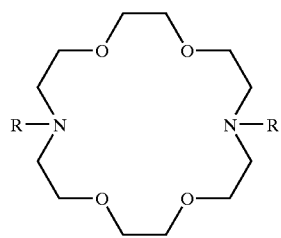

wherein each R is

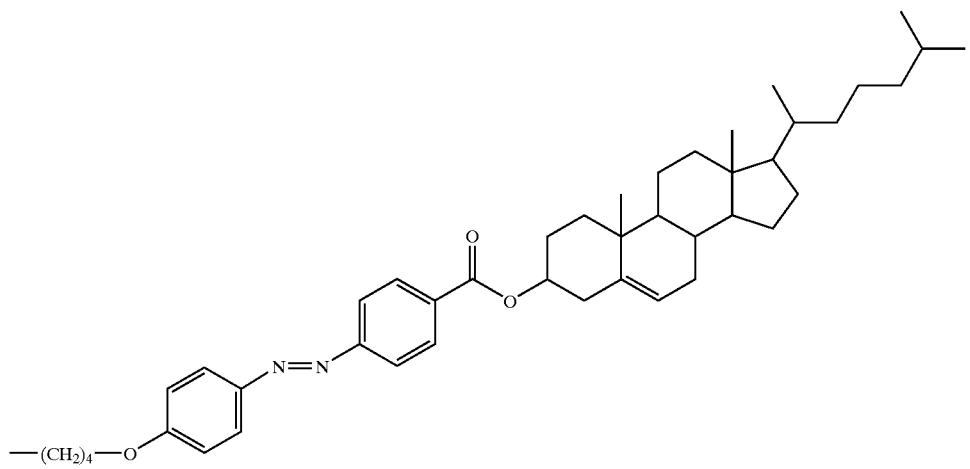

or mixtures thereof.

12. An ink according to claim 1 wherein the gelator is a partially fluorinated high molecular weight alkane having a molecular weight of at least about 400 grams per mole.

13. An ink according to claim 1 wherein the gelator is of the formula $$F(CF_2)_n(CH_2)_mH$$

wherein n is an integer representing the number of repeat —$CF_2$— units, and wherein m is an integer representing the number of repeat —$CH_2$— units.

14. An ink according to claim 1 wherein the gelator is of the formula $$F(CF_2)_8(CH_2)_{12}H$$
$$F(CF_2)_9(CH_2)_{12}H$$
$$F(CF_2)_{10}(CH_2)_{12}H$$
$$F(CF_2)_{11}(CH_2)_{12}H$$
$$F(CF_2)_{12}(CH_2)_{12}H$$
$$F(CF_2)_{13}(CH_2)_{12}H$$
$$F(CF_2)_{14}(CH_2)_{12}H$$

F(CF$_2$)$_{15}$(CH$_2$)$_{12}$H

F(CF$_2$)$_{16}$(CH$_2$)$_{12}$H

F(CF$_2$)$_{17}$(CH$_2$)$_{12}$H

F(CF$_2$)$_{18}$(CH$_2$)$_{12}$H

F(CF$_2$)$_{19}$(CH$_2$)$_{12}$H

F(CF$_2$)$_{20}$(CH$_2$)$_{12}$H

F(CF$_2$)$_{12}$(CH$_2$)$_8$H

F(CF$_2$)$_{12}$(CH$_2$)$_9$H

F(CF$_2$)$_{12}$(CH$_2$)$_{10}$H

F(CF$_2$)$_{12}$(CH$_2$)$_{11}$H

F(CF$_2$)$_{12}$(CH$_2$)$_{12}$H

F(CF$_2$)$_{12}$(CH$_2$)$_{13}$H

F(CF$_2$)$_{12}$(CH$_2$)$_{14}$H

F(CF$_2$)$_{12}$(CH$_2$)$_{15}$H

F(CF$_2$)$_{12}$(CH$_2$)$_{16}$H

F(CF$_2$)$_{12}$(CH$_2$)$_{17}$H

F(CF$_2$)$_{12}$(CH$_2$)$_{18}$H

F(CF$_2$)$_{12}$(CH$_2$)$_{19}$H

F(CF$_2$)$_{12}$(CH$_2$)$_{20}$H or mixtures thereof.

15. An ink according to claim 1 wherein the gelator is a high molecular weight alkanes with exactly one hetero atom and having at least about 10 carbon atoms.

16. An ink according to claim 1 wherein the gelator is of the formulae

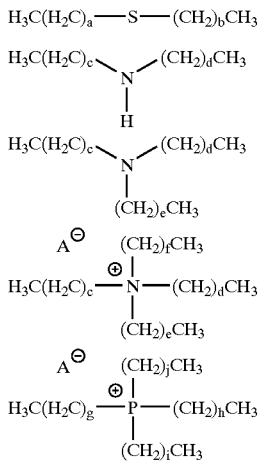

wherein a, b, c, d, e, f, g, h, i, and j each, independently of each other, are integers representing numbers of repeat —CH$_2$— units, provided that at least one of a, b, c, d, e, f, g, h, i, and j is equal to at least about 8, and wherein A is an anion.

17. An ink according to claim 1 wherein the gelator is of the formulae

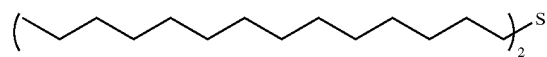

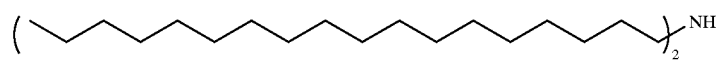

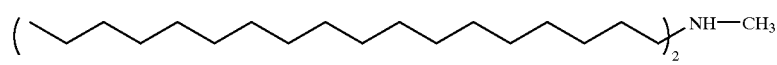

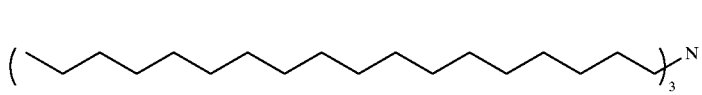 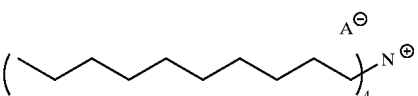

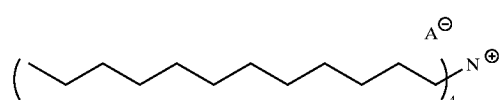 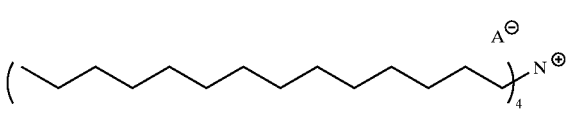

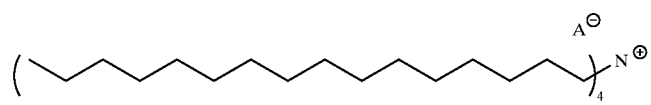

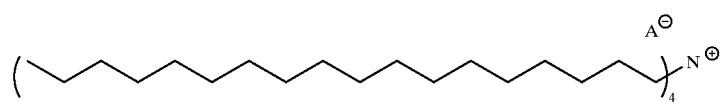

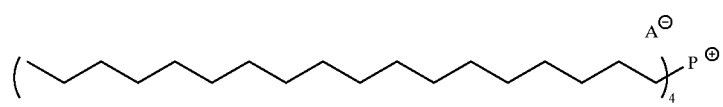

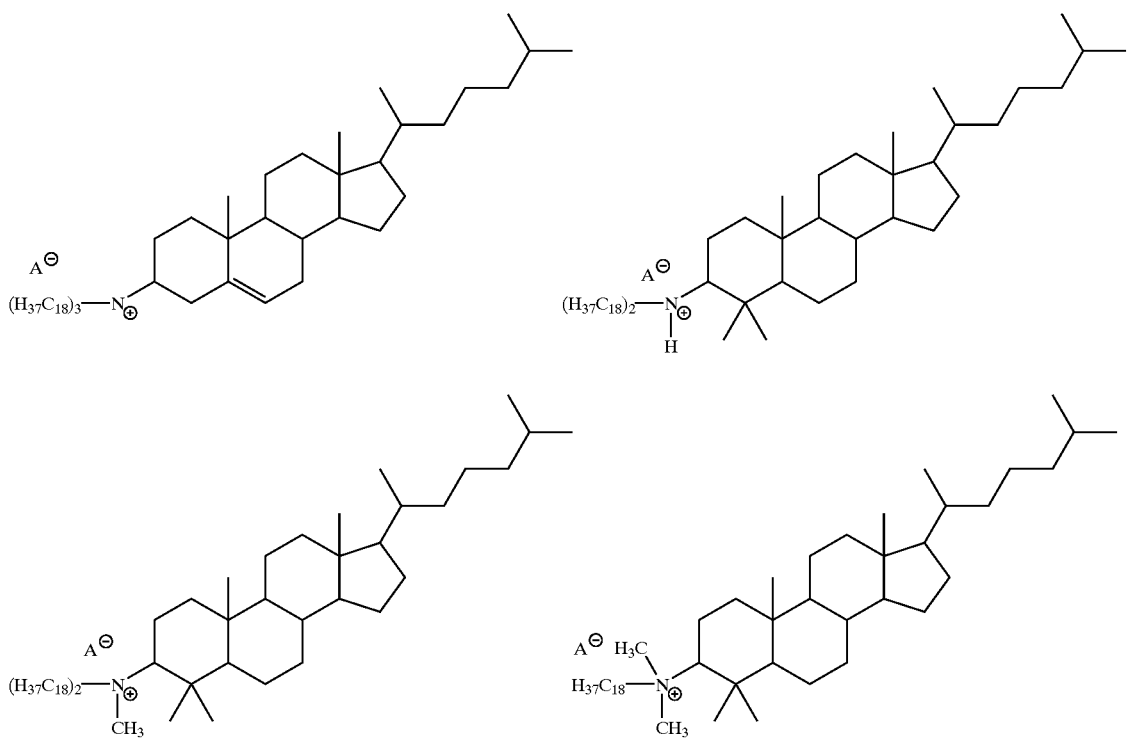
or a mixture thereof, wherein A is Cl⁻, Br⁻, I⁻, ClO₄⁻, or a mixture thereof.
18. An ink according to claim 1 wherein the gelator is a chiral tartrate compound.
19. An ink according to claim 1 wherein the gelator is of the formulae
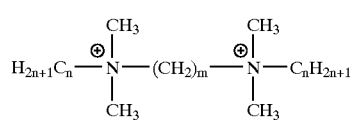
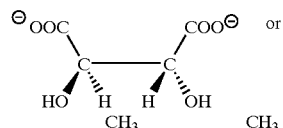
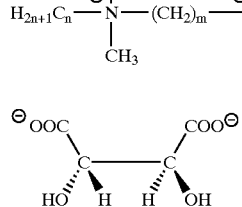
wherein n is an integer of from about 2 to about 20 and m is an integer of from about 2 to about 6.
20. An ink according to claim 1 wherein the gelator is of the formulae
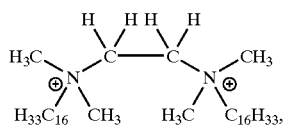
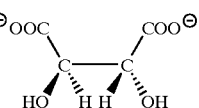
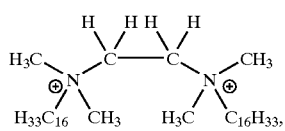
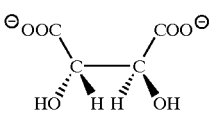
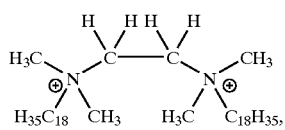
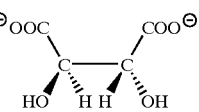

-continued
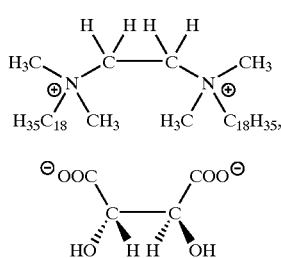
or mixtures thereof.
21. An ink according to claim 1 wherein the gelator is a chiral butenolide-based compound.
22. An ink according to claim 1 wherein the gelator is of the formula
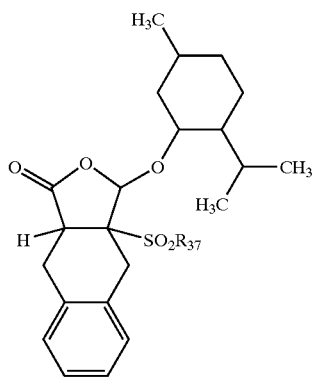
wherein $R_{37}$ is
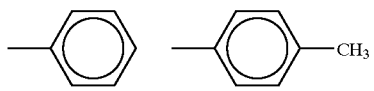
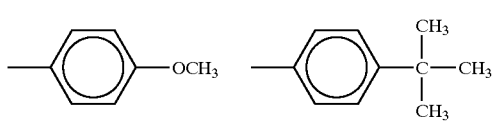
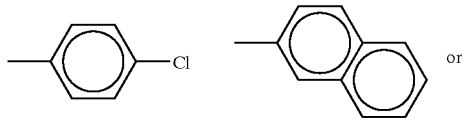
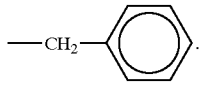
23. An ink according to claim 1 wherein the gelator is of the formulae
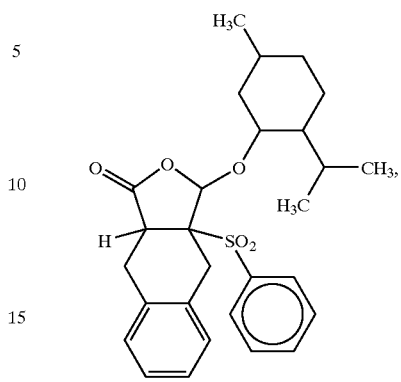
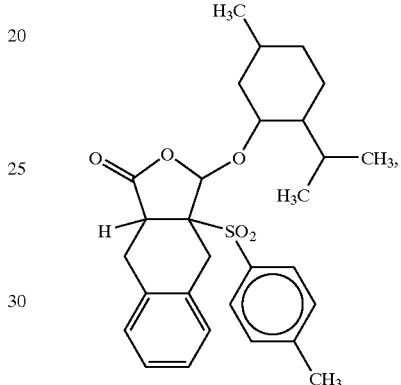
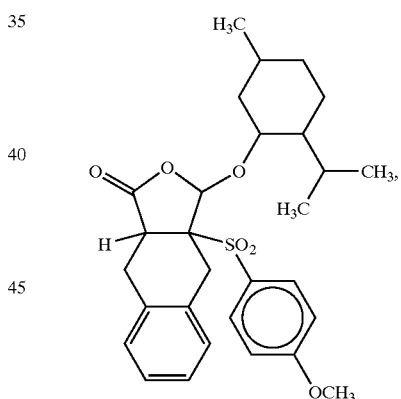
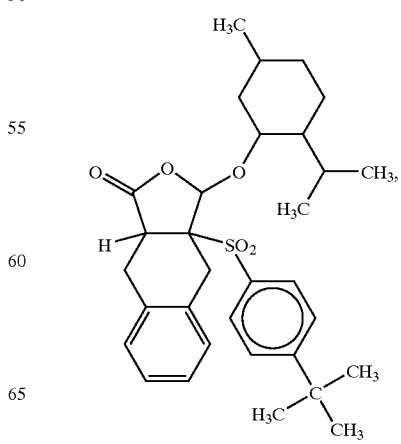

-continued

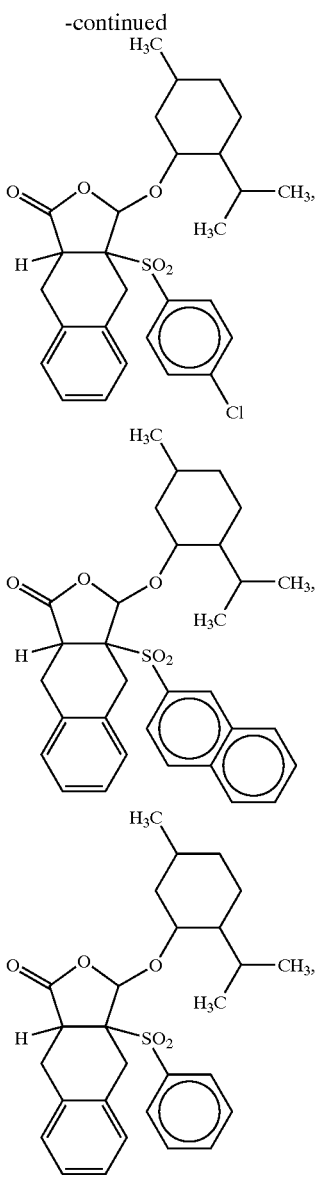

or mixtures thereof.

24. An ink according to claim 1 wherein the gelator is a bis-urea compound.

25. An ink according to claim 1 wherein the gelator is of the formulae

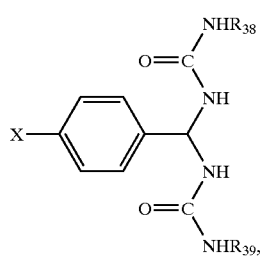

-continued

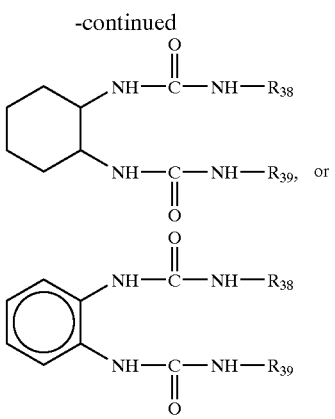

wherein X is a hydrogen atom, a halogen atom, a nitro group, an alkoxy group of the formula —$OR_{90}$, or an amino group of the formula —$NR_{91}R_{92}$, and wherein $R_{38}$, $R_{39}$, $R_{90}$, $R_{91}$, and $R_{92}$ each, independently of the other, is hydrogen atom, an alkyl group, an aryl group, an arylalkyl group, or an alkylaryl group.

26. An ink according to claim 1 wherein the gelator is of the formulae

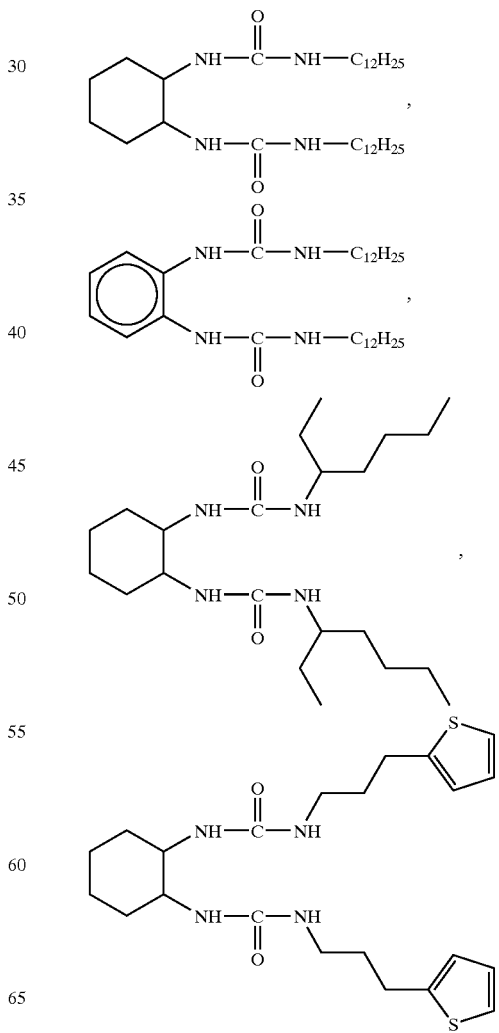

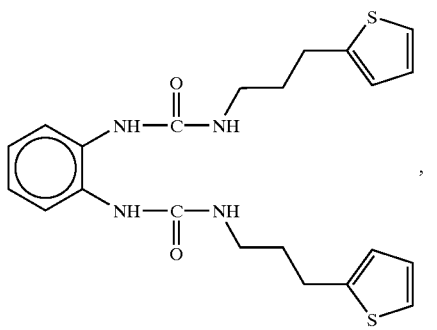
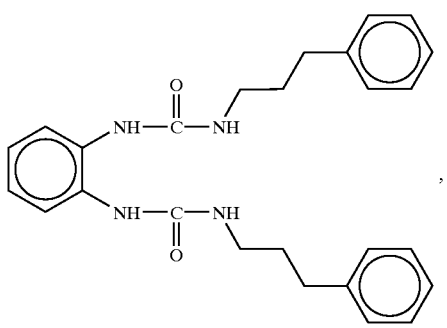
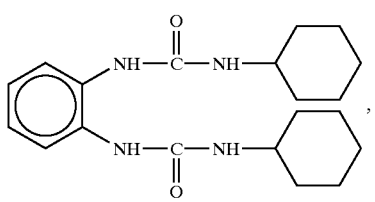
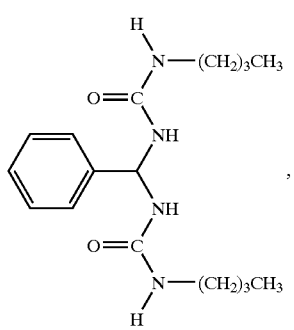
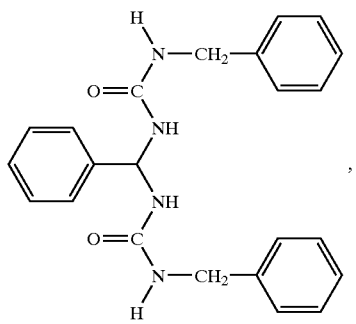
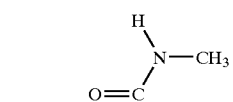
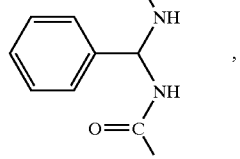
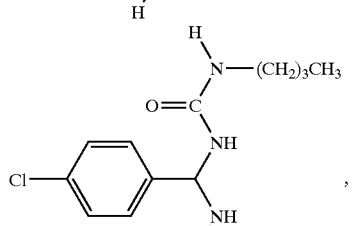
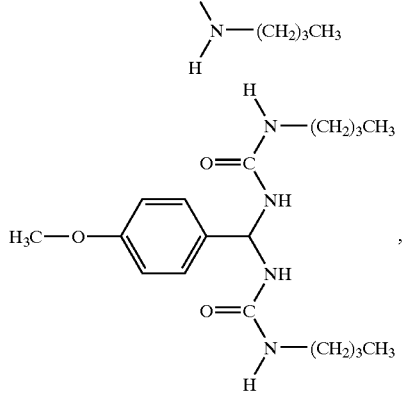
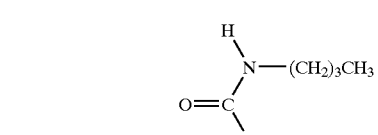
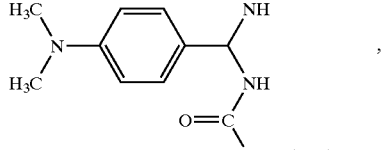
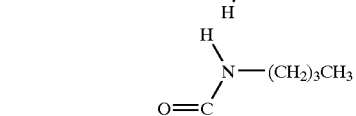
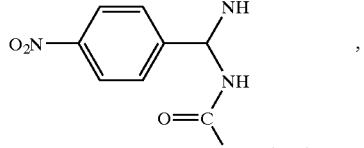
or mixtures thereof.

27. An ink according to claim 1 wherein the gelator is a guanine compound.

28. An ink according to claim 1 wherein the gelator is of the formulae

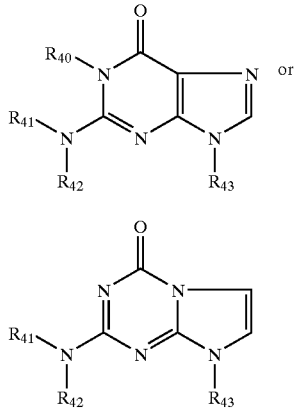

wherein, provided that in compound I at least one of $R_{40}$, $R_{41}$, $R_{42}$, and $R_{43}$ is hydrogen and in compound II at least one of $R_{41}$, $R_{42}$, and $R_{43}$ is hydrogen, $R_{40}$, $R_{41}$, $R_{42}$, and $R_{43}$ each, independently of the others, is a hydrogen atom, an alkyl group, an aryl group, an arylalkyl group, or an alkylaryl group.

29. An ink according to claim 1 wherein the gelator is of the formulae

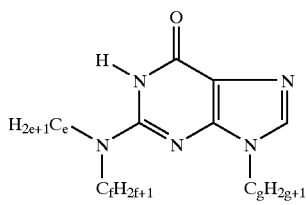

wherein e, f, and g each, independently of the others, are integers of from about 5 to about 22,

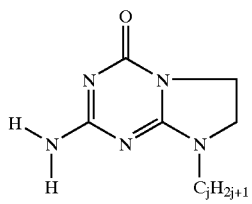

wherein j is an integer of from about 5 to about 22,

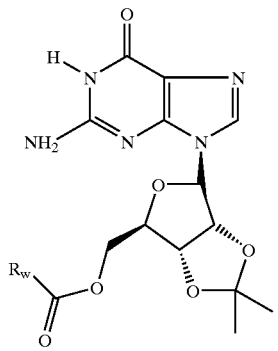

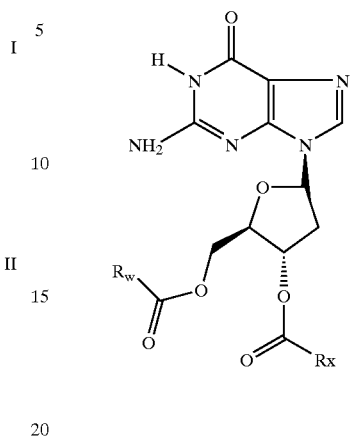

wherein $R_w$ is an alkyl group or an aryl group having a para-substituent which is an alkyl group or an alkoxy group wherein $R_w$ and $R_x$ each, independently of the other, is an alkyl group or an aryl group having a para-substituent which is an alkyl group or an alkoxy group, or mixtures thereof.

30. An ink according to claim 1 wherein the gelator is a barbiturate.

31. An ink according to claim 1 wherein the gelator is of the formula

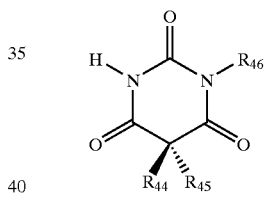

wherein $R_{44}$, $R_{45}$, and $R_{46}$ each, independently of the others, is a hydrogen atom, an alkyl group, an aryl group, an arylalkyl group, or an alkylaryl group.

32. An ink according to claim 1 wherein the gelator is of the formulae

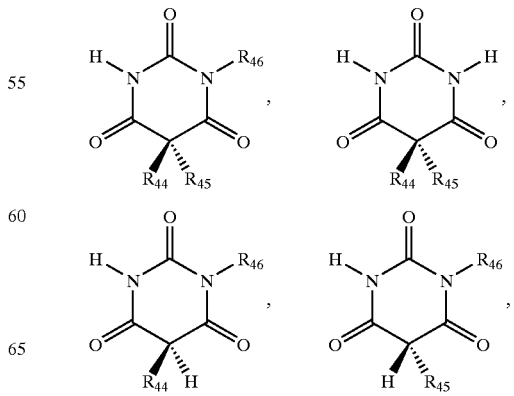

-continued

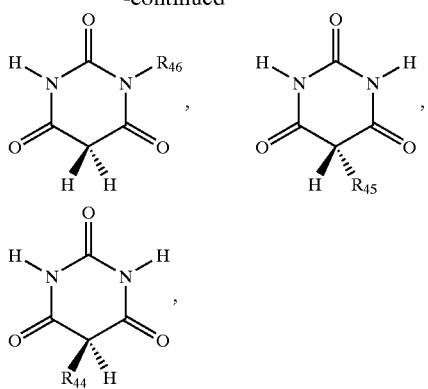

wherein $R_{44}$, $R_{45}$, and $R_{46}$ each, independently of the others, is an alkyl group with from 1 to about 12 carbon atoms,

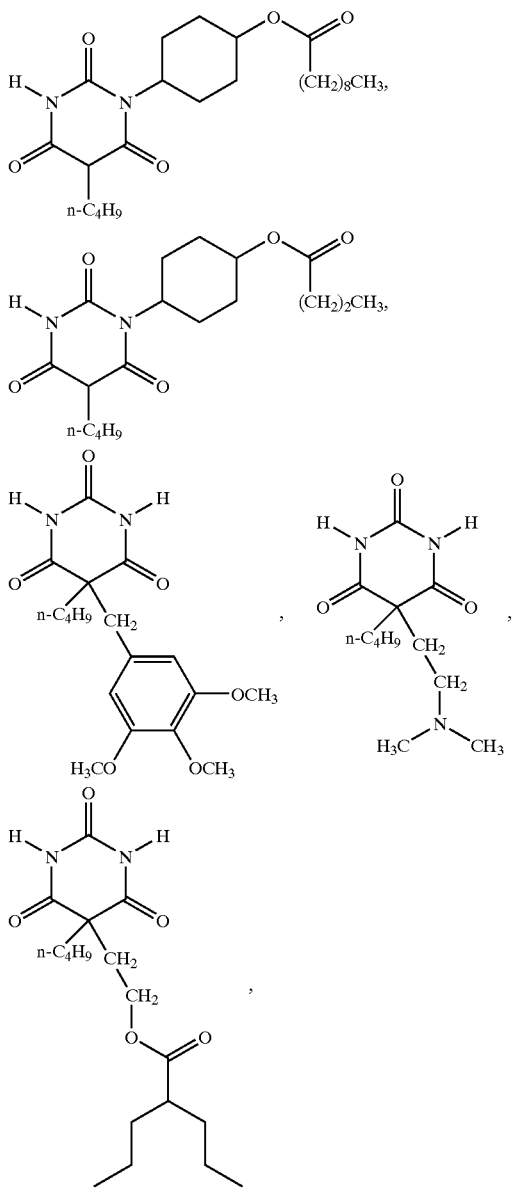

or a mixture thereof.

33. An ink according to claim 1 wherein the gelator is an oxamide compound.

34. An ink according to claim 1 wherein the gelator is of the formula

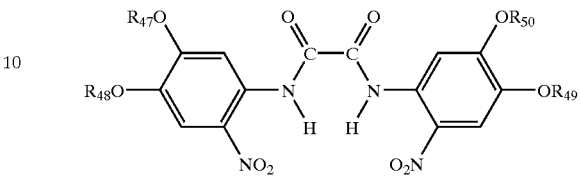

wherein $R_{47}$, $R_{48}$, $R_{49}$, and $R_{50}$ each, independently of the others, is a hydrogen atom, an alkyl group, an aryl group, an arylalkyl group, or an alkylaryl group.

35. An ink according to claim 1 wherein the gelator is of the formulae

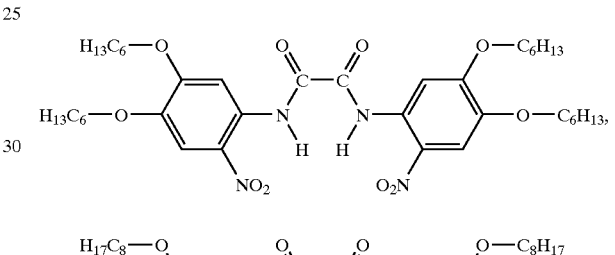

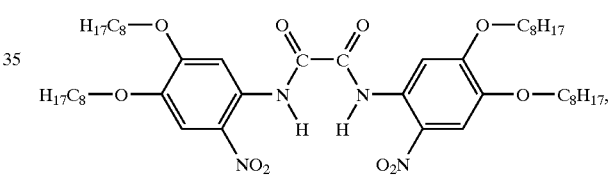

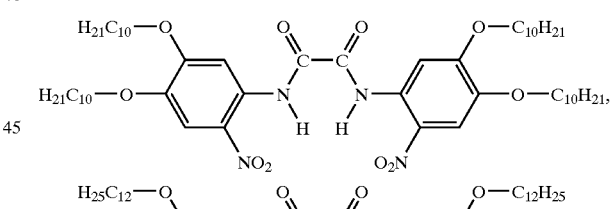

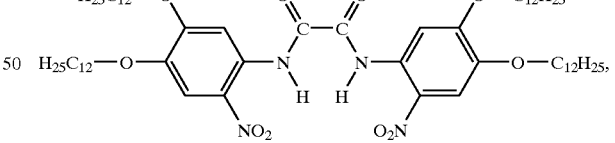

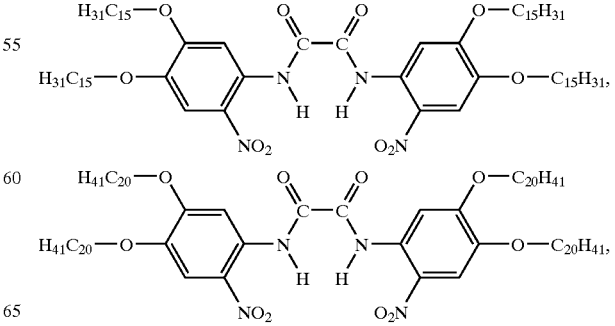

compounds of the formula

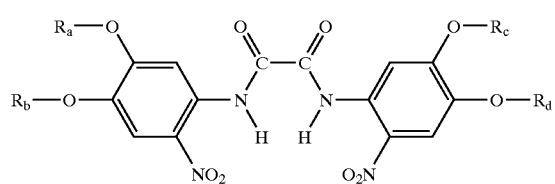

wherein $R_a$, $R_b$, $R_c$, and $R_d$ each, independently of the others, is hexyl, octyl, decyl, dodecyl, pentadecyl, or eicosyl, provided that $R_a$, $R_b$, $R_c$, and $R_d$ are not all the same, or mixtures thereof.

36. An ink according to claim 1 wherein the gelator is a ureidopyrimidone compound.

37. An ink according to claim 1 wherein the gelator is of the formulae

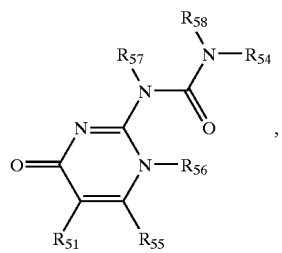

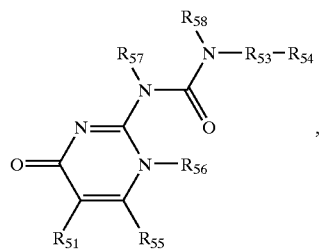

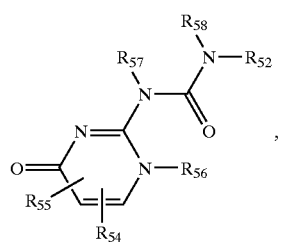

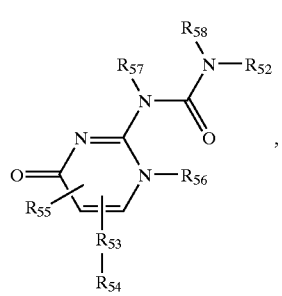

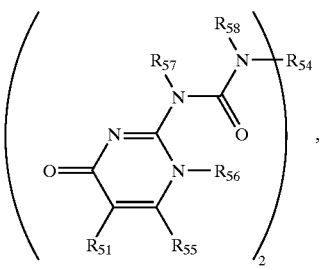

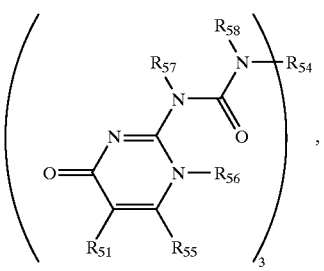

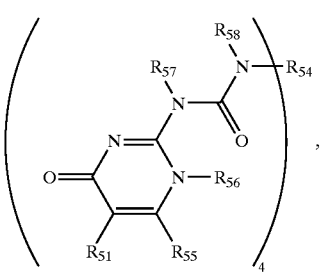

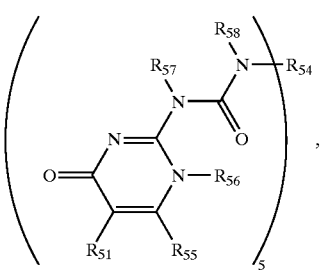

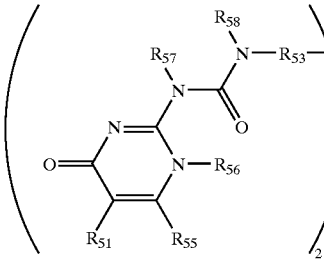

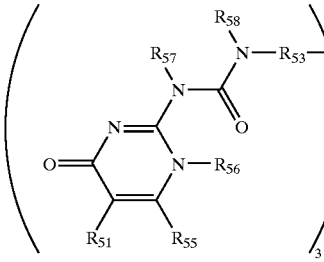

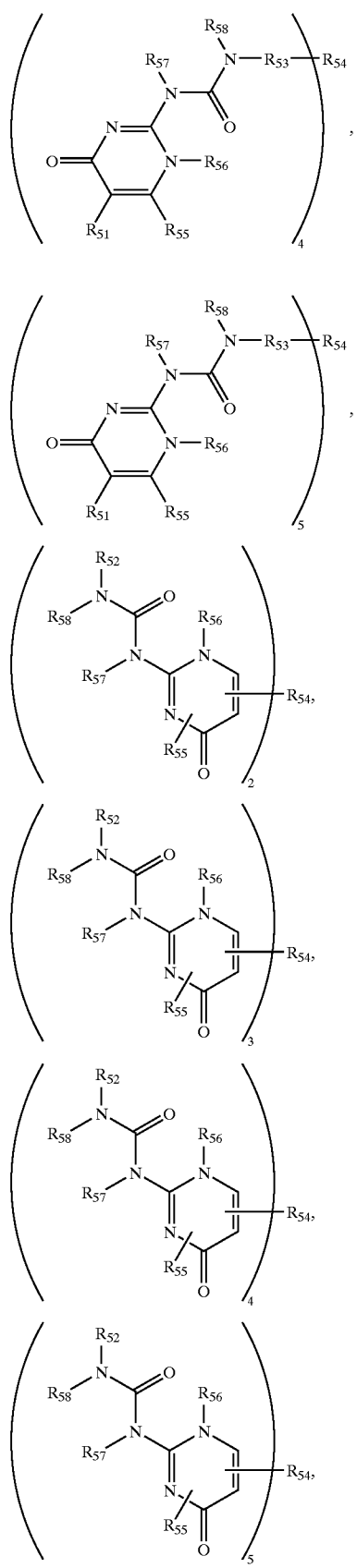

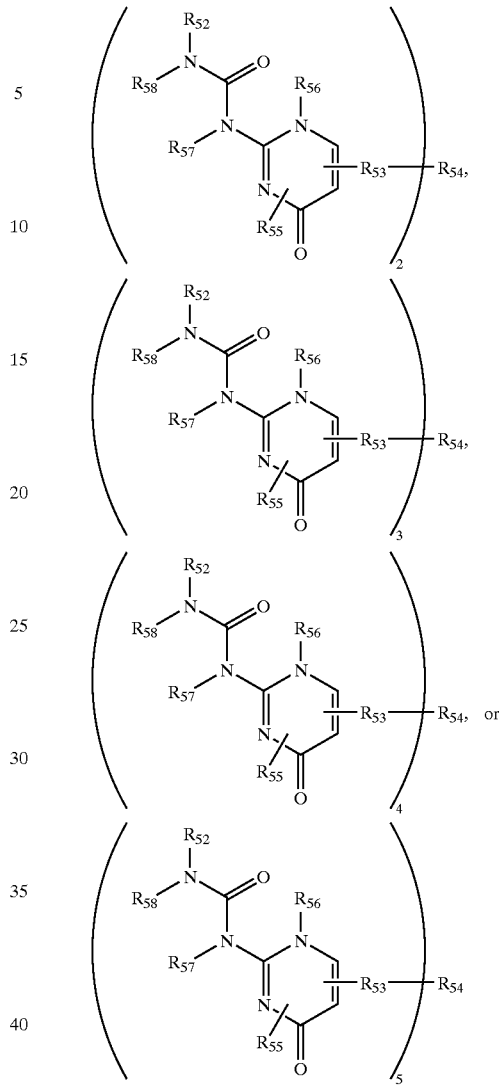

wherein, provided that at least one of $R_{52}$, $R_{56}$, $R_{57}$, and $R_{58}$ is a hydrogen atom, $R_{51}$, $R_{52}$, $R_{55}$, $R_{56}$, $R_{57}$, and $R_{58}$ each, independently of the other, is a hydrogen atom, on alkyl group, an aryl group, an arylalkyl group, or an alkylaryl group, $R_{53}$ is an alkylene group, an arylene group, an arylalkylene group, an alkylarylene group, an alkyleneoxy group, an aryleneoxy group, an arylalkyleneoxy group, an alkylaryleneoxy group, a polyalkyleneoxy group, a polyaryleneoxy group, a polyarylalkyleneoxy group, or a polyalkylaryleneoxy group, and $R_{54}$ is an alkyl or alkylene group, an aryl or arylene group, an arylalkyl or arylalkylene group, an alkylaryl or alkylarylene group, an alkoxy or alkyleneoxy group, an aryloxy or aryleneoxy group, an arylalkyloxy or arylalkyleneoxy group, an alkylaryloxy or alkylaryleneoxy group, a polyalkyleneoxy group, a polyaryleneoxy group, a polyarylalkyleneoxy group, a polyalkylaryleneoxy group, a silyl or silylene group, a siloxane group, a polysilylene group, or a polysiloxane group.

38. An ink according to claim 37 wherein the gelator is a ureidopyrimidone compound having attached to the $R_{54}$ group one or more moieties of the formulae

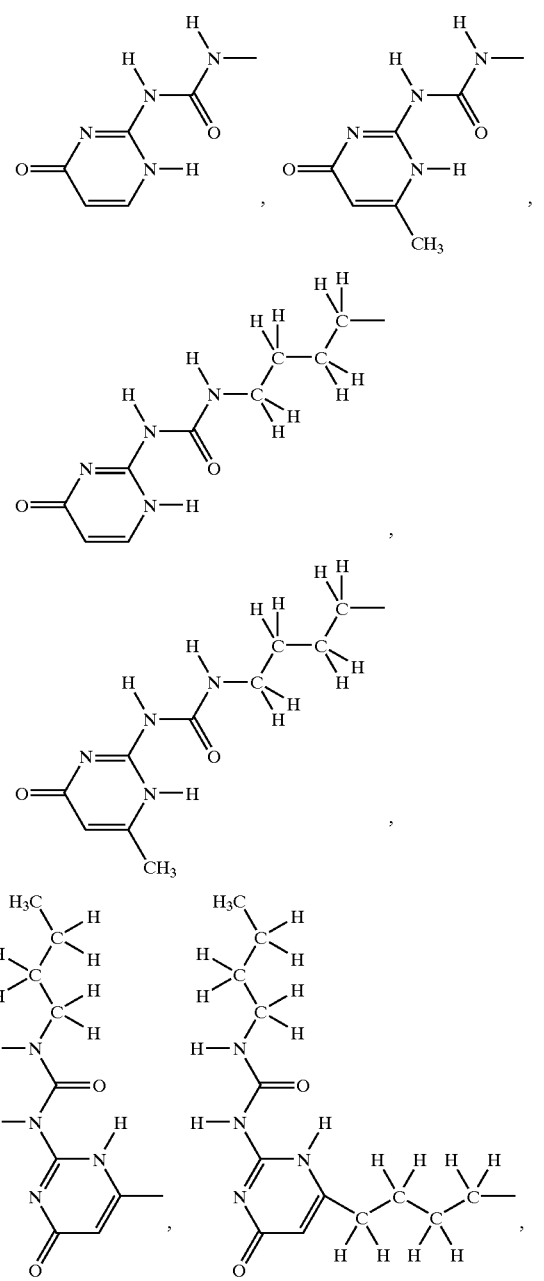
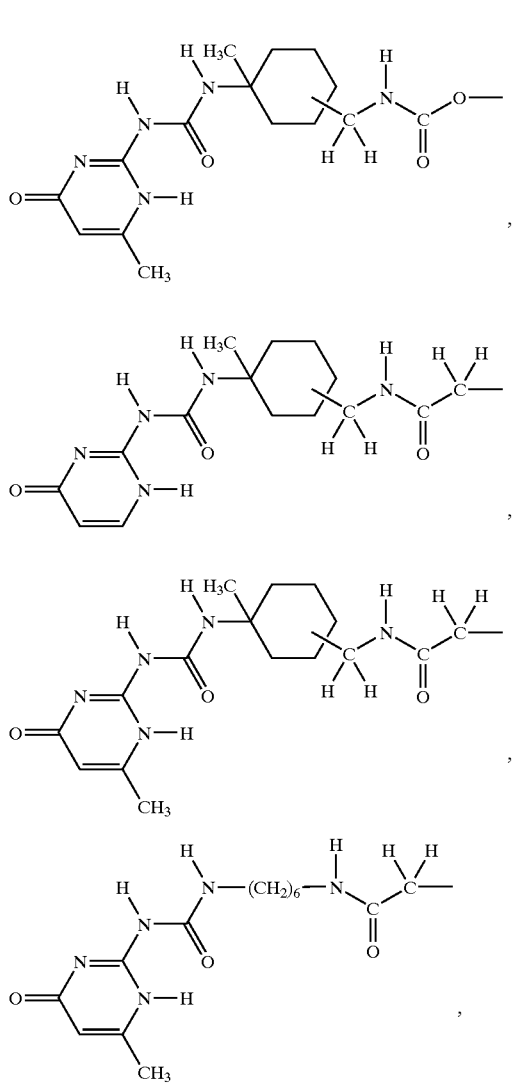
or mixtures thereof.
39. An ink according to claim 1 wherein the gelator is of the formulae
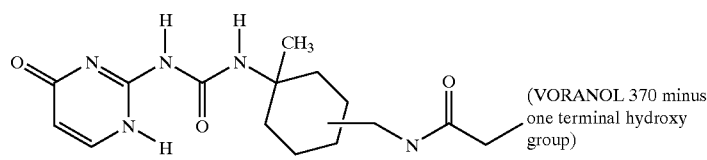
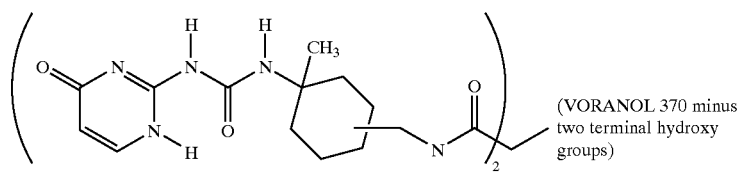

-continued
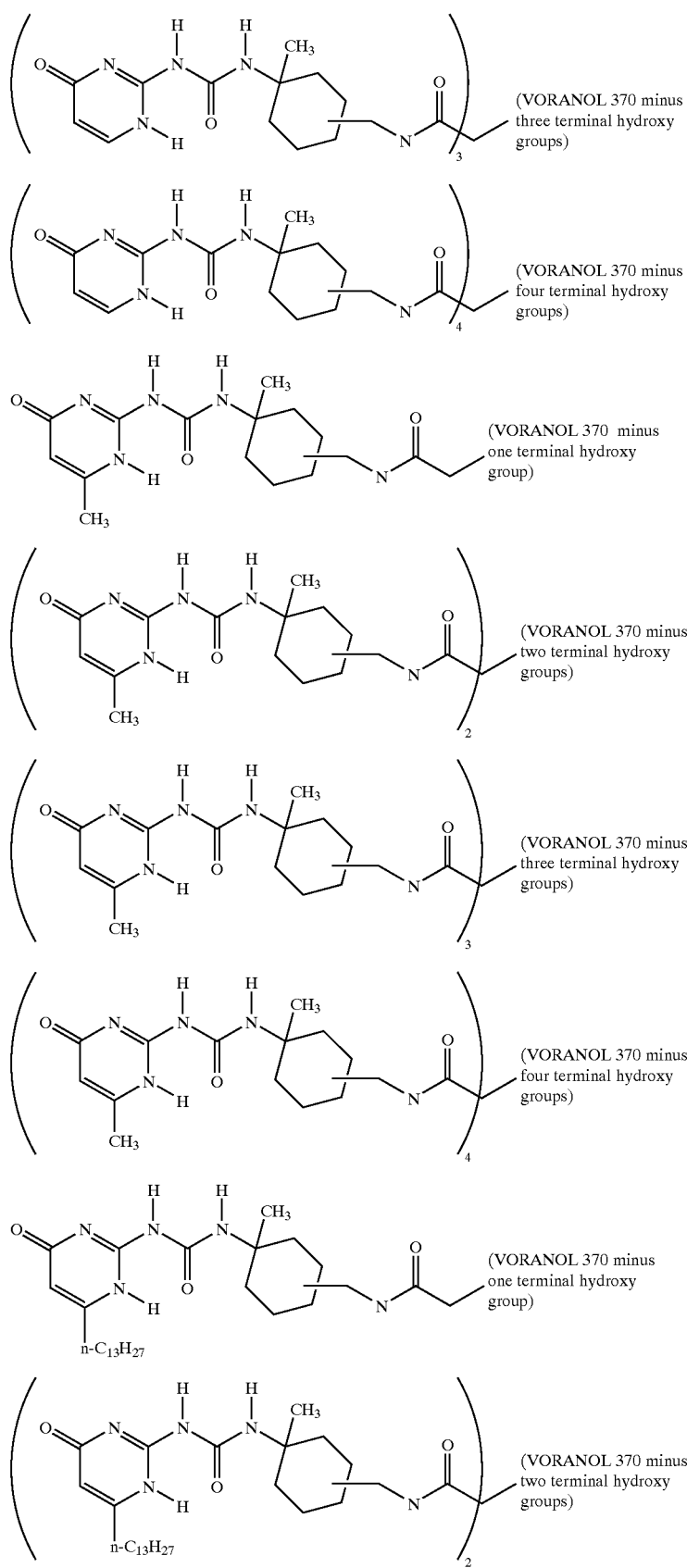

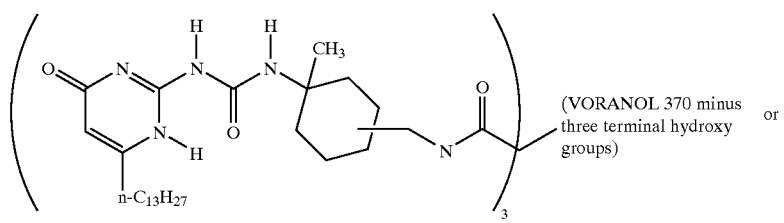
(VORANOL 370 minus three terminal hydroxy groups) or
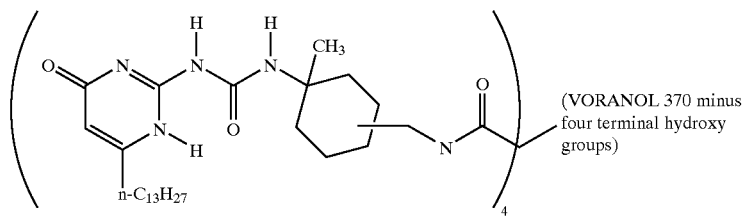
(VORANOL 370 minus four terminal hydroxy groups)
wherein VORANOL 370 represents
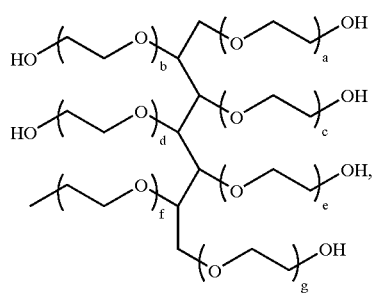
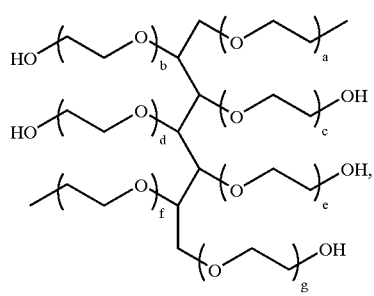
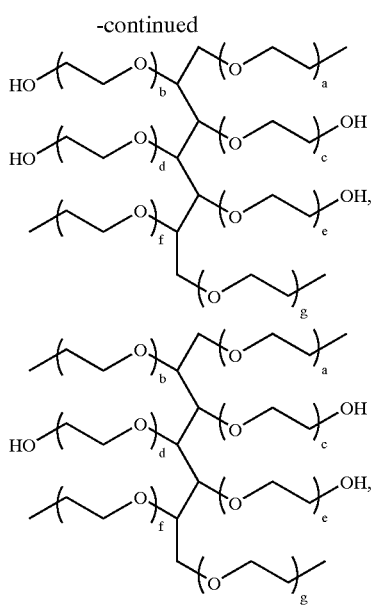
wherein a, b, c, d, e, f, and g are each integers representing the number of ethylene oxide repeat units and the molecular weight of the starting material (wherein all end groups are terminated by hydroxy groups) is about 1.040,
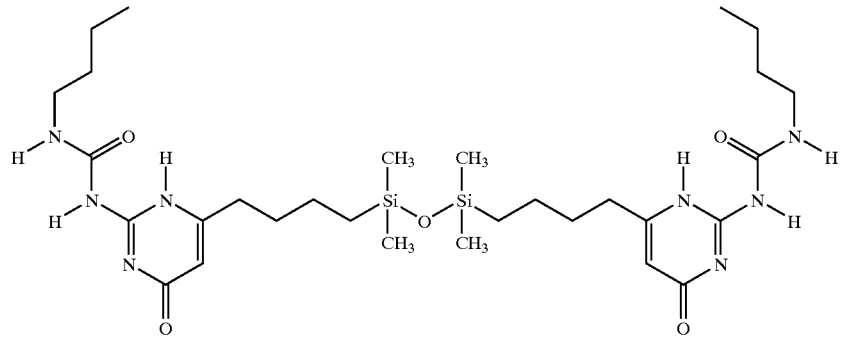

-continued

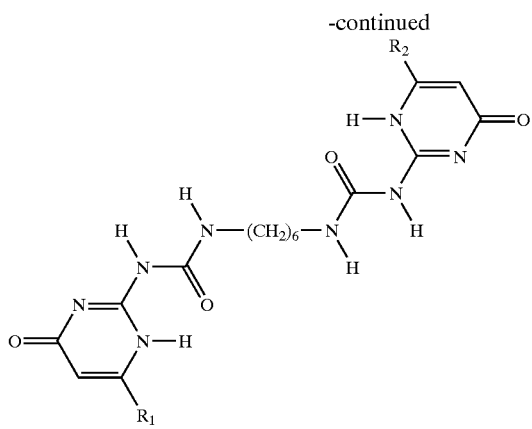

wherein $R_1$ and $R_2$ each, independently of the other, is an alkyl group with from 1 to about 18 carbon atoms,

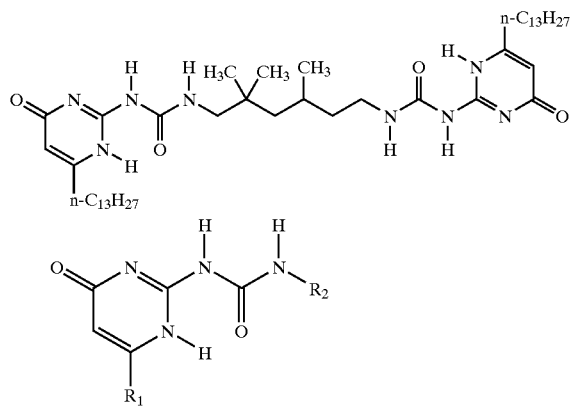

wherein $R_1$ and $R_2$ each, independently of the other, is an alkyl group with from 1 to about 18 carbon atoms, or mixtures thereof.

40. A process which comprises (1) incorporating into an ink jet printing apparatus a phase change ink composition according to claim 1, (2) melting the ink, and (3) causing droplets of the melted ink to be ejected in an imagewise pattern onto a recording substrate.

41. A process according to claim 40 wherein the printing apparatus employs a piezoelectric printing process wherein droplets of the ink are caused to be ejected in imagewise pattern by oscillations of piezoelectric vibrating elements.

42. A process according to claim 40 wherein the substrate is a final recording sheet and droplets of the melted ink are ejected in an imagewise pattern directly onto the final recording sheet.

43. A process according to claim 40 wherein the substrate is an intermediate transfer member and droplets of the melted ink are ejected in an imagewise pattern onto the intermediate transfer member followed by transfer of the imagewise pattern from the intermediate transfer member to a final recording sheet.

44. A process according to claim 43 wherein the intermediate transfer member is heated to a temperature above that of the final recording sheet and below that of the melted ink in the printing apparatus.

45. A process which comprises (1) incorporating into an ink jet printing apparatus a phase change ink composition comprising an ink vehicle, a colorant, and a nonpolymeric organic gelator, said ink having a melting point at or below which the ink is a solid, said ink having a gel point at or above which the ink is a liquid, and said ink exhibiting a gel state between the melting point and the gel point, said ink exhibiting reversible transitions between the solid state and the gel state upon heating and cooling, said ink exhibiting reversible transitions between the gel state and the liquid state upon heating and cooling, said melting point being greater than about 35° C. said gel point being greater than said melting point, (2) melting the ink to a temperature above the gel point, and (3) causing droplets of the melted ink to be ejected at a temperature above the gel point in an imagewise pattern onto a recording substrate, wherein the substrate is maintained at a temperature between the gel point and the melting point of the ink.

46. A process according to claim 45 wherein the printing apparatus employs a piezoelectric printing process wherein droplets of the ink are caused to be ejected in imagewise pattern by oscillations of piezoelectric vibrating elements.

47. A process according to claim 45 wherein the substrate is a final recording sheet and droplets of the melted ink are ejected in an imagewise pattern directly onto the final recording sheet, wherein the final substrate is maintained at a temperature between the gel point and the melting point of the ink.

48. A process according to claim 45 wherein the substrate is an intermediate transfer member and droplets of the melted ink are ejected in an imagewise pattern onto the intermediate transfer member followed by transfer of the imagewise pattern from the intermediate transfer member to a final recording sheet, wherein the intermediate transfer member is maintained at a temperature between the gel point and the melting point of the ink.

49. A process which comprises (1) incorporating into an ink jet printing apparatus a phase change ink composition comprising an ink vehicle, a colorant, and a nonpolymeric organic gelator, said ink having a melting point at or below which the ink is a solid, said ink having a gel point at or above which the ink is a liquid, and said ink exhibiting a gel state between the melting point and the gel point, said ink exhibiting reversible transitions between the solid state and the gel state upon heating and cooling, said ink exhibiting reversible transitions between the gel state and the liquid state upon heating and cooling, said melting point being greater than about 35° C. said gel point being greater than said melting point, (2) melting the ink to a temperature above the gel point, and (3) causing droplets of the melted ink to be ejected in an imagewise pattern at a temperature above the gel point onto a recording substrate, wherein either (a) the substrate is a final recording sheet and droplets of the melted ink are ejected in an imagewise pattern directly onto the final recording sheet, or (b) the substrate is an intermediate transfer member and droplets of the melted ink are ejected in an imagewise pattern onto the intermediate transfer member followed by transfer of the imagewise pattern from the intermediate transfer member to a final recording sheet, and wherein subsequent to placement of the imagewise pattern of ink onto the final substrate, the imagewise pattern of ink is subjected to fusing at a temperature above the melting point of the ink.

50. A process according to claim 49 wherein the imagewise pattern of ink, is subjected to fusing at a temperature between the gel point and the melting point of the ink.

51. A process according to claim 49 wherein the imagewise pattern of ink is subjected to fusing at a temperature above the gel point of the ink.

52. A process according to claim 49 wherein fusing is effected by applying a heated fusing member to the imagewise pattern of ink.

53. A process according to claim 49 wherein fusing is effected by radiant fusing.

54. A process according to claim 49 wherein the printing apparatus employs a piezoelectric printing process wherein droplets of the ink are caused to be ejected in imagewise pattern by oscillations of piezoelectric vibrating elements.

55. A process according to claim 49 wherein the substrate is a final recording sheet and droplets of the melted ink are ejected in an imagewise pattern directly onto the final recording sheet.

56. A process according to claim 49 wherein the substrate is an intermediate transfer member and droplets of the melted ink are ejected in an imagewise pattern onto the intermediate transfer member followed by transfer of the imagewise pattern from the intermediate transfer member to a final recording sheet.

57. A process according to claim 56 wherein the intermediate transfer member also functions as a fusing member and fusing of the imagewise pattern is simultaneous with transfer of the imagewise pattern from the intermediate transfer member to the final recording sheet.

58. An ink according to claim 1 wherein the ink vehicle comprises a monoamide, a tetra-amide, or a mixture thereof.

59. An ink according to claim 1 wherein the ink vehicle comprises (a) stearyl stearamide, (b) a dimer acid based tetra-amide that is the reaction product of dimer acid, ethylene diamine and stearic acid, or (c) mixtures thereof.

60. An ink according to claim 1 wherein the ink vehicle comprises (a) stearyl stearamide, (b) a dimer acid based tetra-amide that is the reaction product of dimer acid, ethylene diamine, and a carboxylic acid having at least about 36 carbon atoms, or (c) mixtures thereof.

61. An ink according to claim 60 wherein the carboxylic acid has at least about 40 carbon atoms, and wherein the carboxylic acid has no more than about 200 carbon atoms.

62. An ink according to claim 1 wherein the ink vehicle comprises an isocyanate-derived material.

63. An ink according to claim 1 wherein the ink vehicle comprises a urethane isocyanate-derived material, a urea isocyanate-derived material, a urethane/urea isocyanate-derived material, or mixtures thereof.

64. An ink according to claim 1 wherein the ink vehicle comprises a mixture of one or more amides and one or more isocyanate-derived materials.

65. An ink according to claim 1 wherein the ink vehicle comprises one or more materials selected from paraffins, microcrystalline waxes, polyethylene waxes, ester waxes, amide waxes, fatty acids, fatly alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

66. An ink according to claim 1 wherein the ink vehicle comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

67. An ink according to claim 1 wherein the ink vehicle comprises (a) a polyethylene wax in an amount of at least about 25 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

68. An ink according to claim 1 wherein the ink vehicle is present in the ink in an amount of at least about 0.1 percent by weight of the ink.

69. An ink according to claim 1 wherein the ink vehicle is present in the ink in an amount of at least about 50 percent by weight of the ink.

70. An ink according to claim 1 wherein the ink vehicle is present in the ink in an amount of at least about 90 percent by weight of the ink.

71. An ink according to claim 1 wherein the ink vehicle is present in the ink in an amount of no more than about 99 percent by weight of the ink.

72. An ink according to claim 1 wherein the ink vehicle is present in the ink in an amount of no more than about 98 percent by weight of the ink.

73. An ink according to claim 1 wherein the ink vehicle is present in the ink in an amount of no more than about 95 percent by weight of the ink.

74. An ink according to claim 1 wherein the colorant is present in the ink in an amount of at least about 0.1 percent by weight of the ink.

75. An ink according to claim 1 wherein the colorant is present in the ink in an amount of at least about 0.2 percent by weight of the ink.

76. An ink according to claim 1 wherein the colorant is present in the ink in an amount of at least about 0.5 percent by weight of the ink.

77. An ink according to claim 1 wherein the colorant is present in the ink in on amount of more than about 50 percent by weight of the ink.

78. An ink according to claim 1 wherein the colorant is present in the ink in an amount of more than about 20 percent by weight of the ink.

79. An ink according to claim 1 wherein the colorant is present in the ink in an amount of more than about 10 percent by weight of the ink.

80. An ink according to claim 1 wherein the ink further comprises a liquid component that, in its pure form, is in a liquid state at room temperature, but, when incorporated into the ink, enables the ink to be a solid at 35° C. or higher.

81. An ink according to claim 80 wherein the liquid component is an aliphatic hydrocarbon, a glycol ether, an ester, an amide, an alcohol, or a mixture thereof.

82. An ink according to claim 80 wherein the liquid component is squalene, butyl carbitol, tripropylene glycol monomethyl ether, 1-phenoxy-2-propanol, dibutyl phtholate, dibutyl sebacate, 1-dodecanol, or mixtures thereof.

83. An ink according to claim 80 wherein the liquid component is present in the ink in an amount of at least about 5 percent by weight of the ink.

84. An ink according to claim 80 wherein the liquid component is present in the ink in an amount of no more than about 50 percent by weight of the ink.

85. An ink according to claim 1 wherein the ink has a melting point of no lower than about 35° C.

86. An ink according to claim 1 wherein the ink has a melting point of no lower than about 50° C.

87. An ink according to claim 1 wherein the ink has a melting point of no lower than about 70° C.

88. An ink according to claim 1 wherein the ink has a melting point of no higher than about 160° C.

89. An ink according to claim 1 wherein the ink has a melting point of no higher than about 140° C.

90. An ink according to claim 1 wherein the ink has a melting point of no higher than about 110° C.

91. An ink according to claim 1 wherein the ink has a gel point of no lower than about 50° C.

92. An ink according to claim 1 wherein the ink has a gel point of no lower than about 60° C.

93. An ink according to claim 1 wherein the ink has a gel point of no lower than about 90° C.

94. An ink according to claim 1 wherein the ink has a gel point of no higher than about 130° C.

95. An ink according to claim 1 wherein the ink has a gel point of no higher than about 120° C.

96. An ink according to claim 1 wherein the ink has a gel point of no higher than about 100° C.

97. An ink according to claim 1 wherein the ink has a viscosity in the gel state of at least about 3,000 centipoise.

98. An ink according to claim 1 wherein the ink has a viscosity in the gel state of at least about 10,000 centipoise.

99. An ink according to claim 1 wherein the ink has a viscosity in the gel state of no more than about 500,000 centipoise.

100. An ink according to claim 1 wherein the ink has a viscosity in the gel state of no more than about 200,000 centipoise.

101. An ink according to claim 1 wherein the ink has a viscosity in the get state of no more than about 100,000 centipoise.

102. An ink according to claim 1 wherein the ink has a viscosity in the gel state of from about $10^3$ to about $10^5$ centipoise.

103. An ink according to claim 1 wherein the ink has a viscosity in the gel state of from about $10^{3.5}$ to about $10^{4.5}$ centipoise.

104. An ink according to claim 1 wherein the ink has a viscosity at jetting temperatures of no more than about 30 centipoise.

105. An ink according to claim 1 wherein the ink has a viscosity at jetting temperatures of no more than about 20 centipoise.

106. An ink according to claim 1 wherein the ink has a viscosity at jetting temperatures of no more than about 15 centipoise.

107. An ink according to claim 1 wherein the ink has a viscosity at jetting temperatures of no less than about 2 centipoise.

108. An ink according to claim 1 wherein the ink has a viscosity at jetting temperatures of no less than about 5 centipoise.

109. An ink according to claim 1 wherein the ink has a viscosity at jetting temperatures of no less than about 7 centipoise.

* * * * *